(12) United States Patent
Sun et al.

(10) Patent No.: US 10,615,080 B2
(45) Date of Patent: Apr. 7, 2020

(54) METHODS OF MANUFACTURING SEMICONDUCTOR DEVICES BY ETCHING ACTIVE FINS USING ETCHING MASKS

(71) Applicant: Samsung Electronics Co., Ltd., Suwon-si, Gyeonggi-do (KR)

(72) Inventors: Min-Chul Sun, Yongin-si (KR); Myeong-Cheol Kim, Suwon-si (KR); Kyoung-Sub Shin, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 16/144,232

(22) Filed: Sep. 27, 2018

(65) Prior Publication Data

US 2019/0027411 A1 Jan. 24, 2019

Related U.S. Application Data

(62) Division of application No. 15/658,964, filed on Jul. 25, 2017, now Pat. No. 10,109,532.

(30) Foreign Application Priority Data

Mar. 6, 2017 (KR) .................. 10-2017-0028130

(51) Int. Cl.
*H01L 21/8238* (2006.01)
*H01L 29/66* (2006.01)
(Continued)

(52) U.S. Cl.
CPC ...... *H01L 21/823807* (2013.01); *G06F 7/505* (2013.01); *G06F 17/5068* (2013.01);
(Continued)

(58) Field of Classification Search
CPC ........... H01L 21/823807; H01L 21/308; H01L 23/535; H01L 29/0653; H01L 29/0847; H01L 29/1037; H01L 27/0924; H01L 21/30608; H01L 29/66545; H01L 21/823871; H01L 21/823878; H01L 21/823818; H01L 21/823821; G06F 7/505; G06F 2217/84; G06F 17/5081
See application file for complete search history.

(56) References Cited

U.S. PATENT DOCUMENTS 7,323,375 B2 1/2008 Yoon et al.
8,741,776 B2 6/2014 De et al.
(Continued)

*Primary Examiner* — Laura M Menz
*Assistant Examiner* — Candice Chan
(74) *Attorney, Agent, or Firm* — Sughrue Mion, PLLC

(57) ABSTRACT

In a method of manufacturing a semiconductor device, first to third active fins are formed on a substrate. Each of the first to third active fins extends in a first direction, and the second active fin, the first active fin, and the third active fin are disposed in this order in a second direction crossing the first direction. The second active fin is removed using a first etching mask covering the first and third active fins. The third active fin is removed using a second etching mask covering the first active fin and a portion of the substrate from which the second active fin is removed. A first gate structure is formed on the first active fin. A first source/drain layer is formed on a portion of the first active fin adjacent the first gate structure.

7 Claims, 83 Drawing Sheets

(51) Int. Cl.
*H01L 21/306* (2006.01)
*H01L 21/308* (2006.01)
*H01L 27/092* (2006.01)
*H01L 29/10* (2006.01)
*H01L 29/08* (2006.01)
*H01L 29/06* (2006.01)
*H01L 23/535* (2006.01)
*G06F 7/505* (2006.01)
*G06F 17/50* (2006.01)
*H01L 29/417* (2006.01)
*H01L 21/8234* (2006.01)
*H01L 27/088* (2006.01)

(52) U.S. Cl.
CPC ........ *G06F 17/5081* (2013.01); *H01L 21/308* (2013.01); *H01L 21/30608* (2013.01); *H01L 21/823412* (2013.01); *H01L 21/823418* (2013.01); *H01L 21/823431* (2013.01); *H01L 21/823814* (2013.01); *H01L 21/823821* (2013.01); *H01L 21/823871* (2013.01); *H01L 21/823878* (2013.01); *H01L 23/535* (2013.01); *H01L 27/0886* (2013.01); *H01L 27/0924* (2013.01); *H01L 29/0653* (2013.01); *H01L 29/0847* (2013.01); *H01L 29/1037* (2013.01); *H01L 29/41791* (2013.01); *H01L 29/66545* (2013.01); *G06F 2217/84* (2013.01)

(56) References Cited

U.S. PATENT DOCUMENTS

| | | |
|---|---|---|
| 9,425,106 B1 | 8/2016 | Xie et al. |
| 9,437,415 B2 | 9/2016 | Shieh et al. |
| 9,564,340 B2 | 2/2017 | Lee et al. |
| 2015/0294979 A1 | 10/2015 | Choi et al. |
| 2016/0155741 A1 | 6/2016 | Yoo et al. |
| 2016/0163701 A1 | 6/2016 | Cheng et al. |
| 2016/0225635 A1* | 8/2016 | Lee .................... H01L 21/3086 |
| 2016/0233298 A1* | 8/2016 | Webb .................. H01L 23/535 |
| 2016/0254195 A1 | 9/2016 | Jacob et al. |
| 2016/0351411 A1 | 12/2016 | Xie et al. |

* cited by examiner

FIG. 3
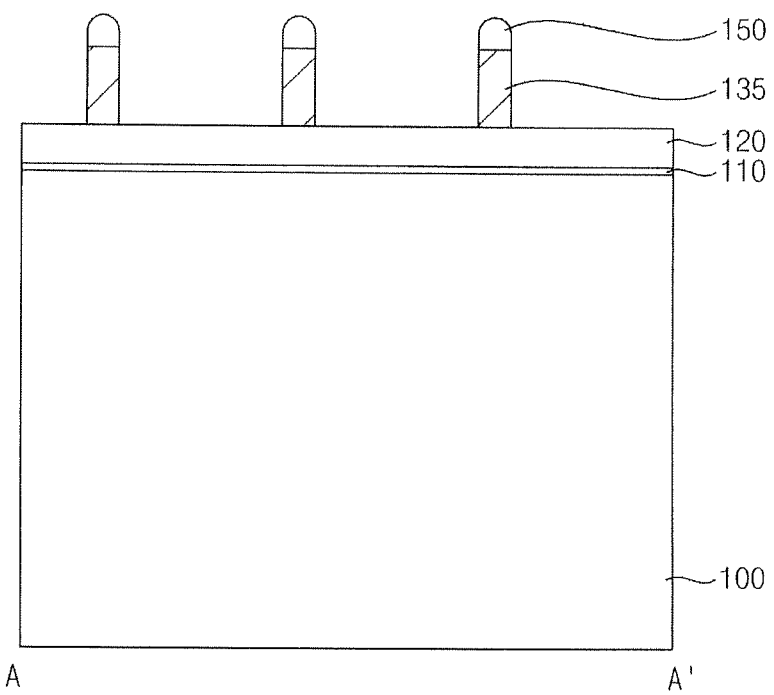
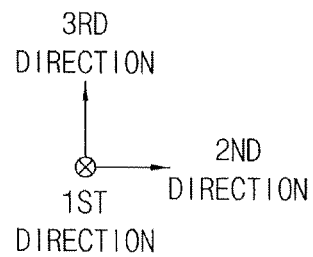

FIG. 4
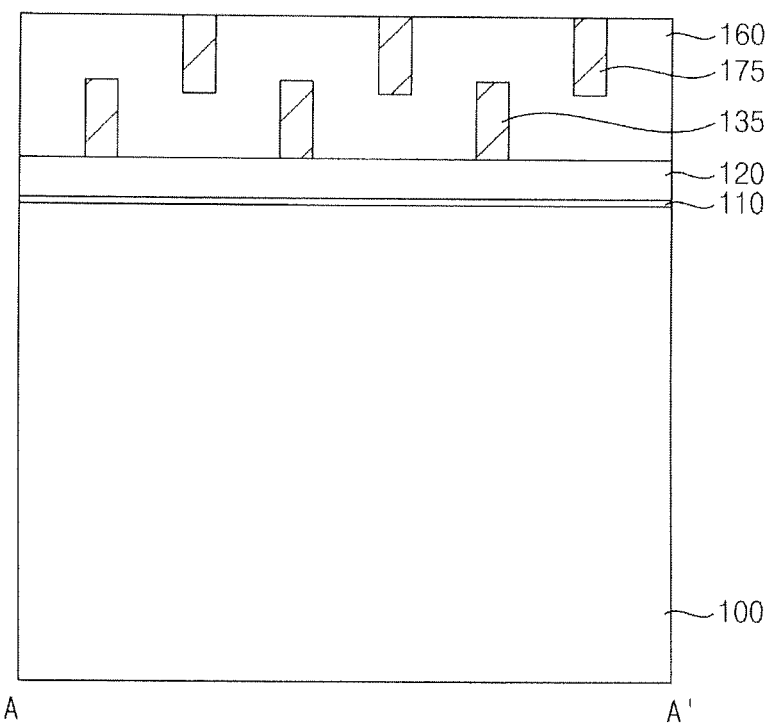
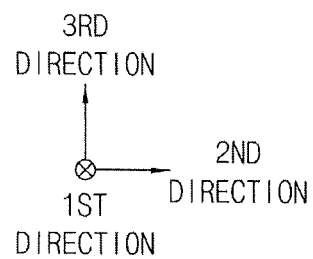

FIG. 7
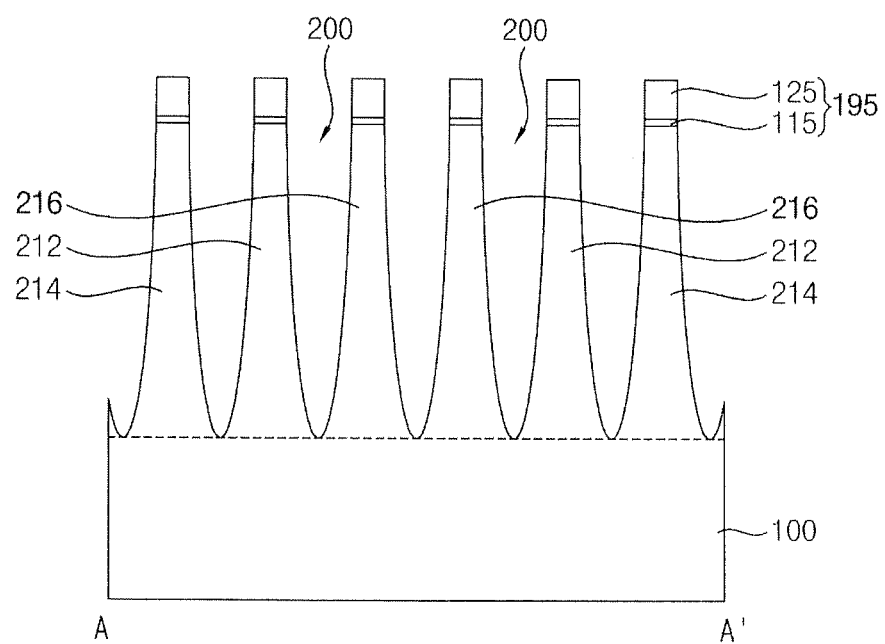
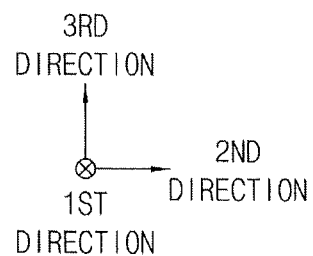

FIG. 17
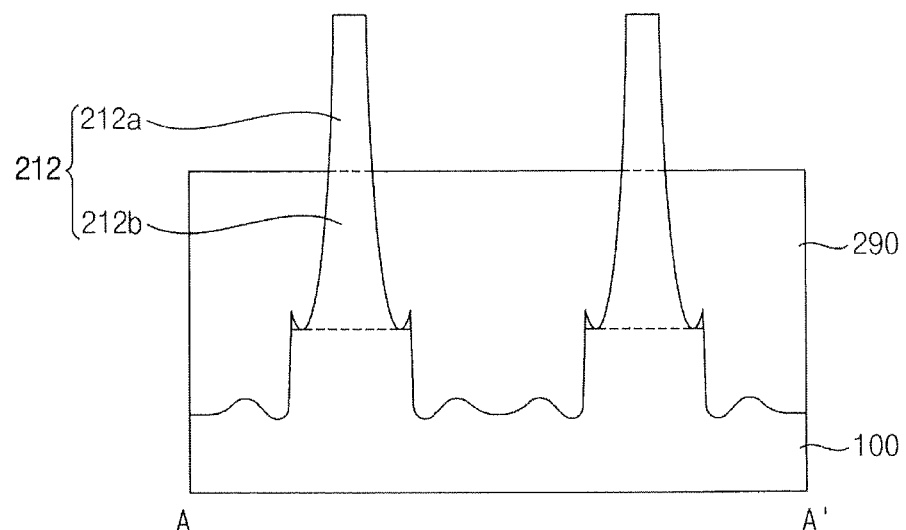
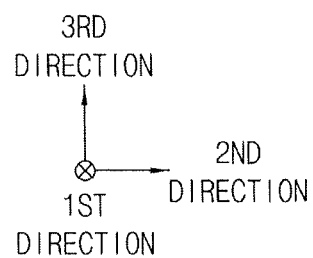

FIG. 18
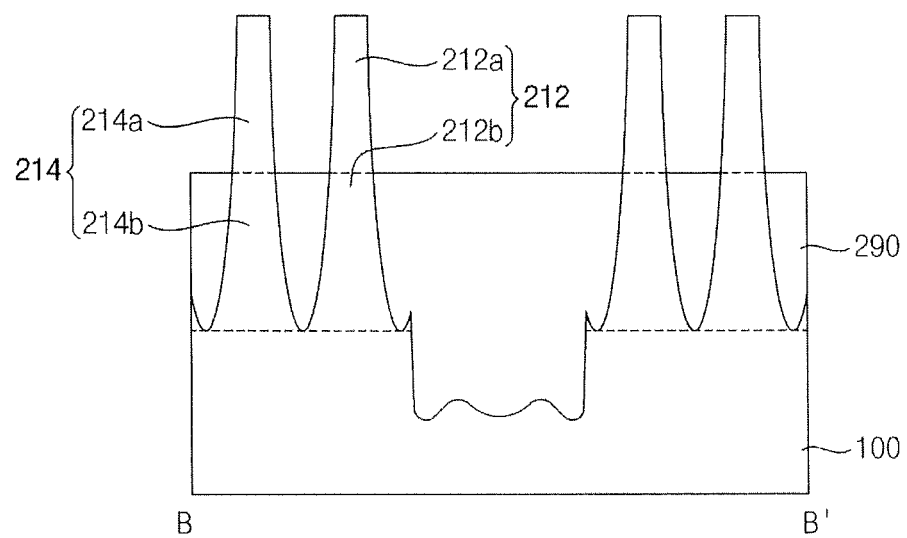
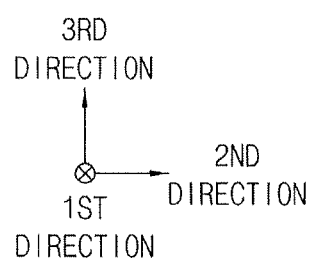

FIG. 20
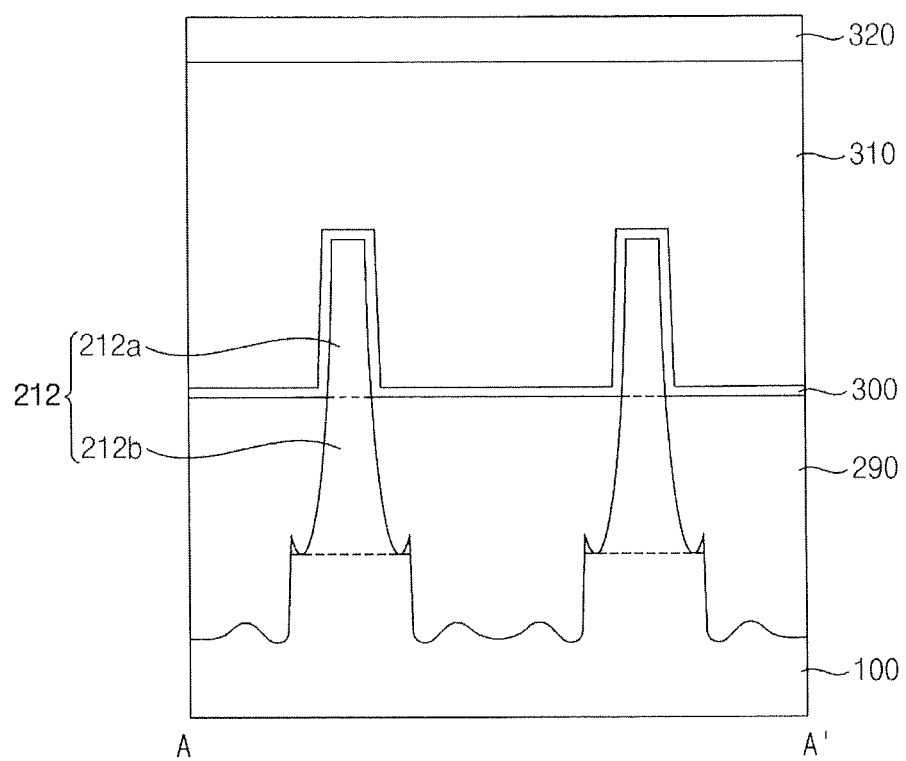
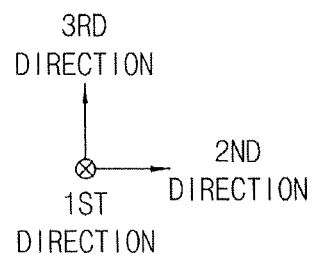

FIG. 22
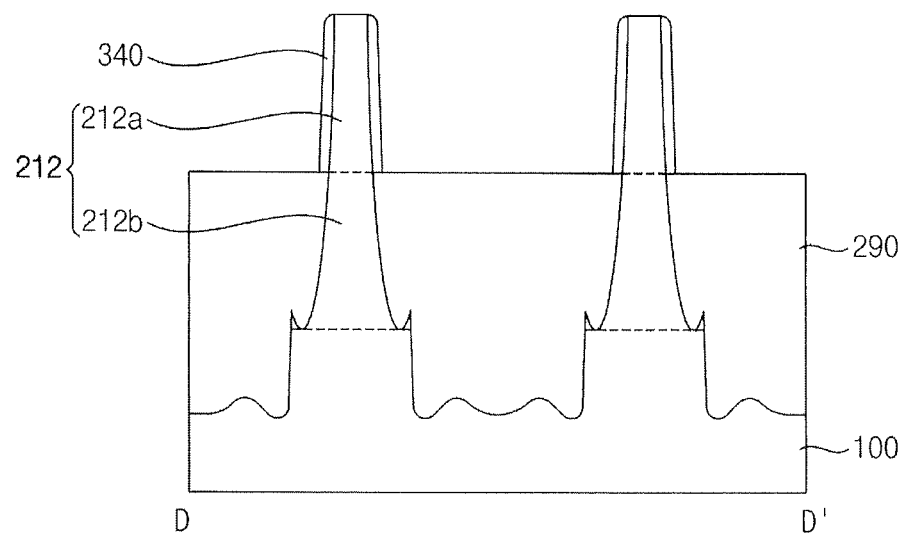
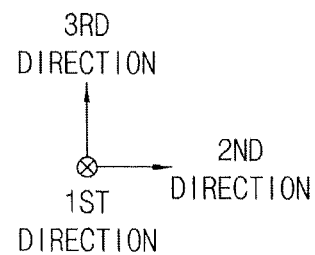

FIG. 24
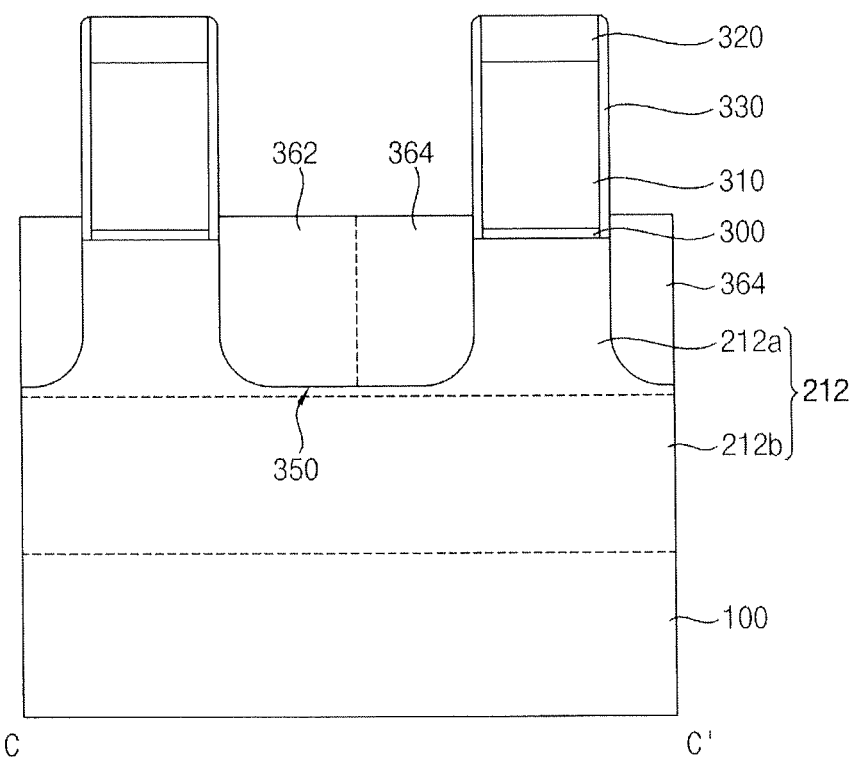
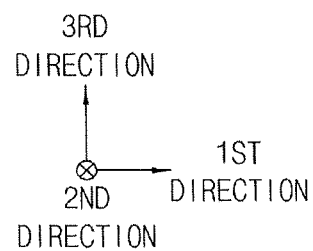

FIG. 25
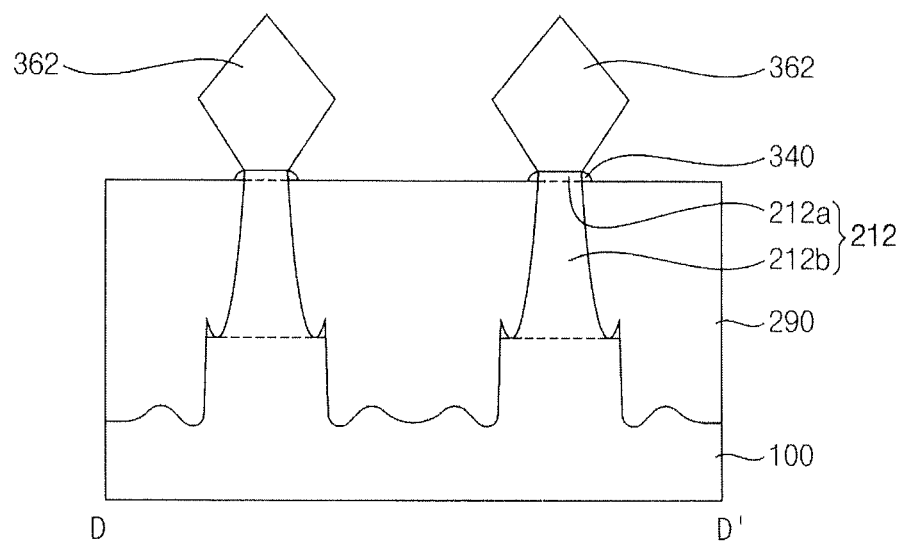
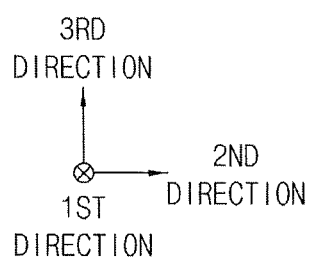

FIG. 26
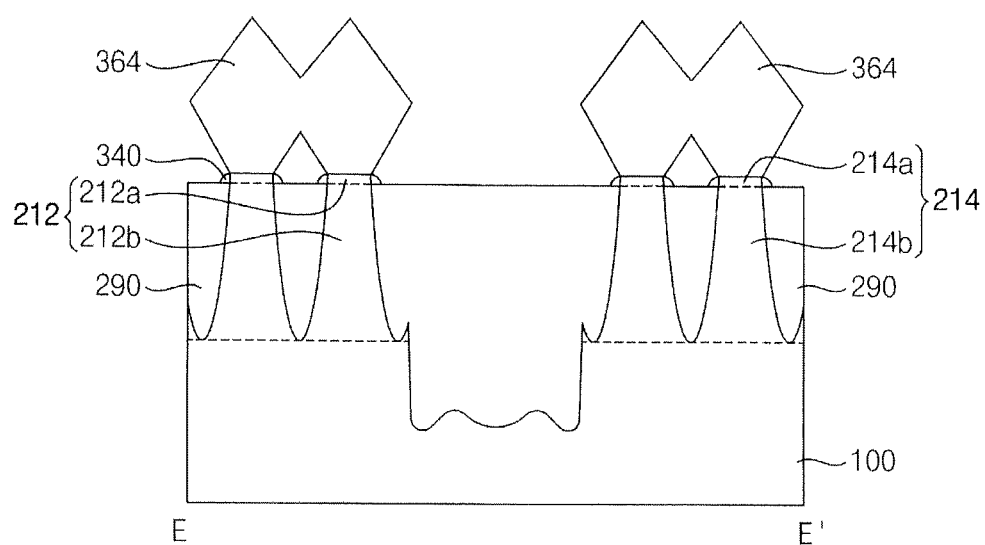
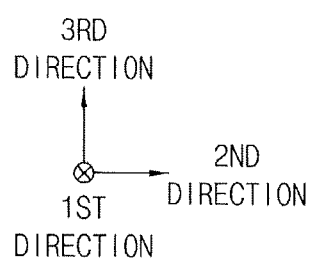

FIG. 28
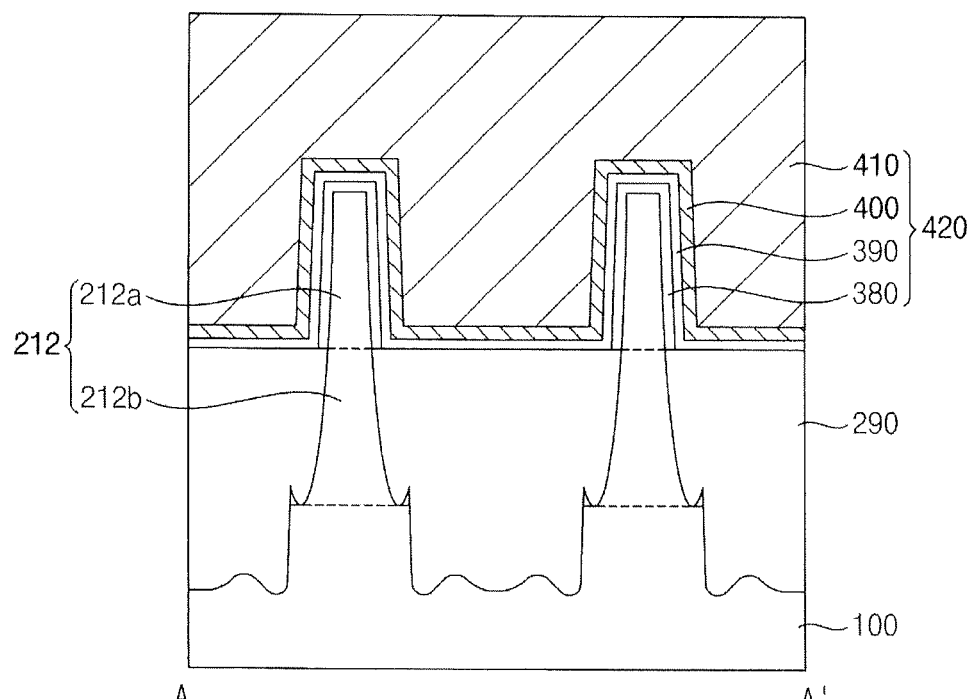
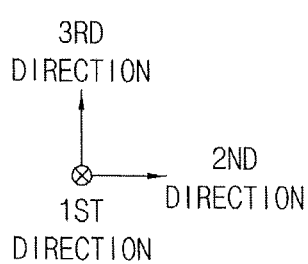

FIG. 29
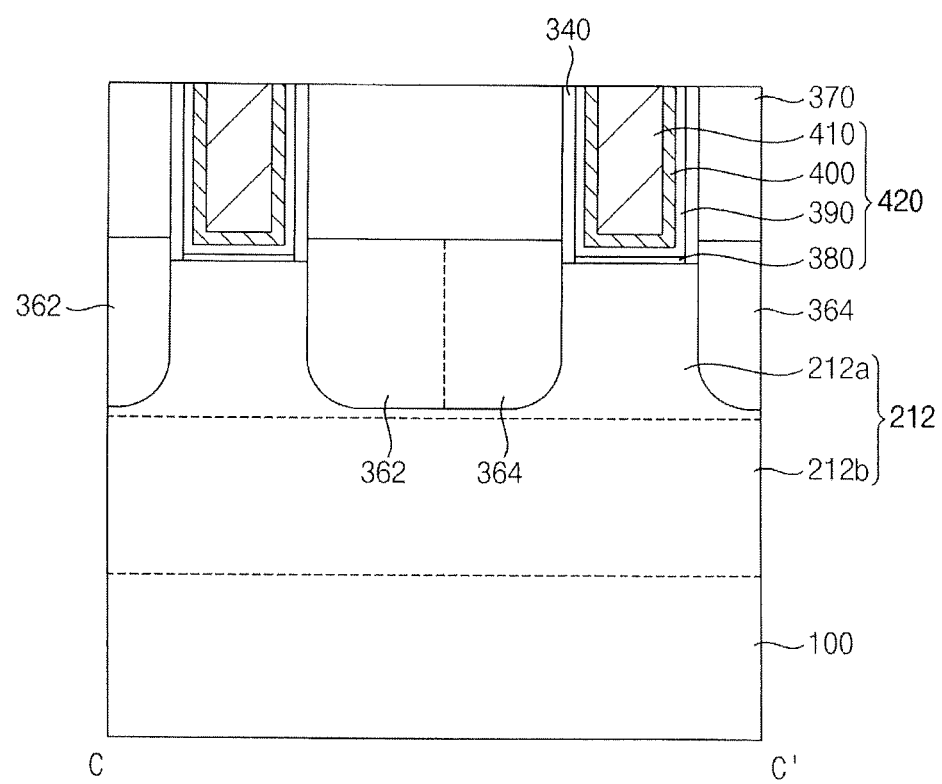
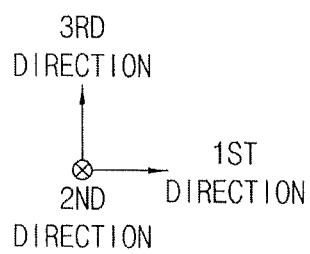

FIG. 30
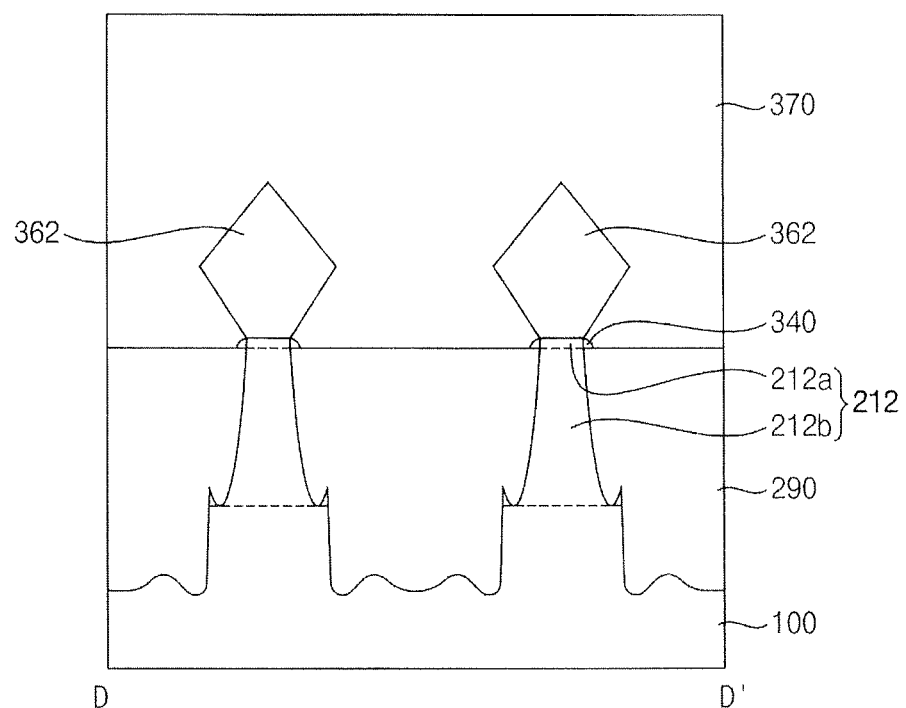
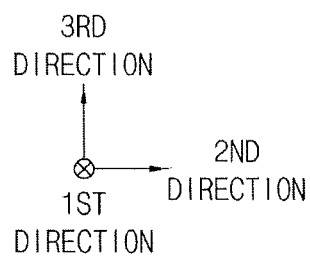

FIG. 32
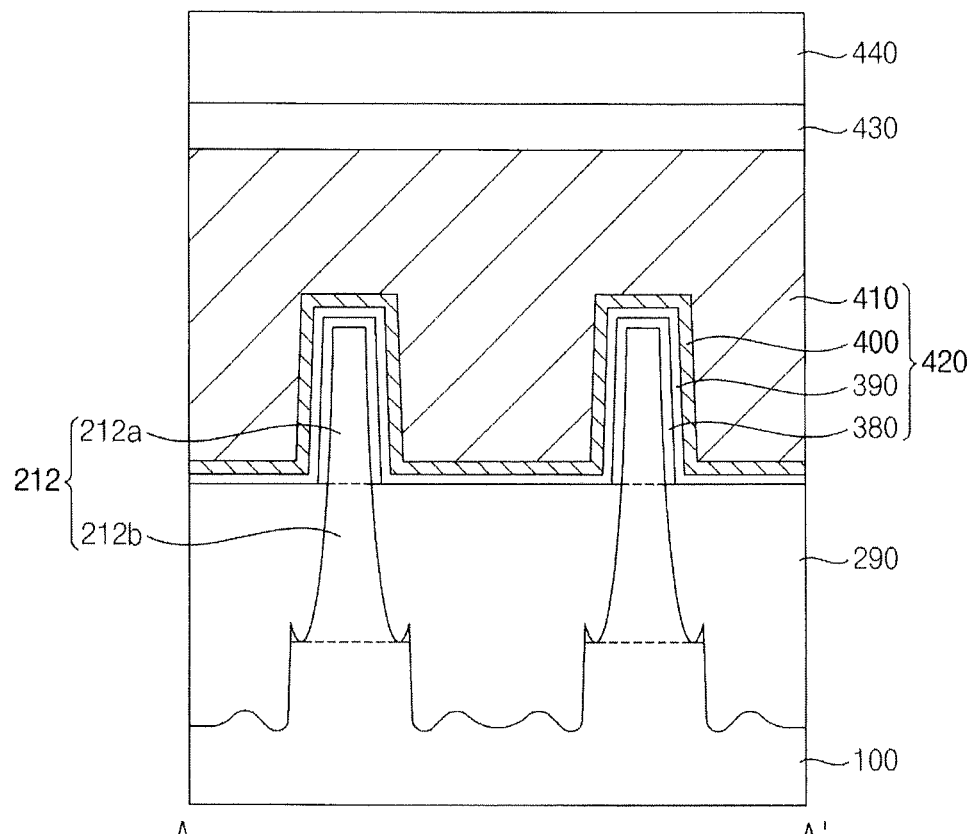
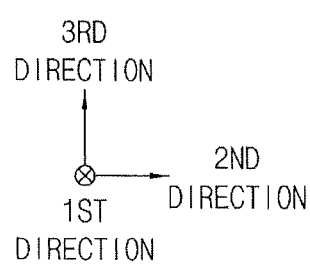

FIG. 33
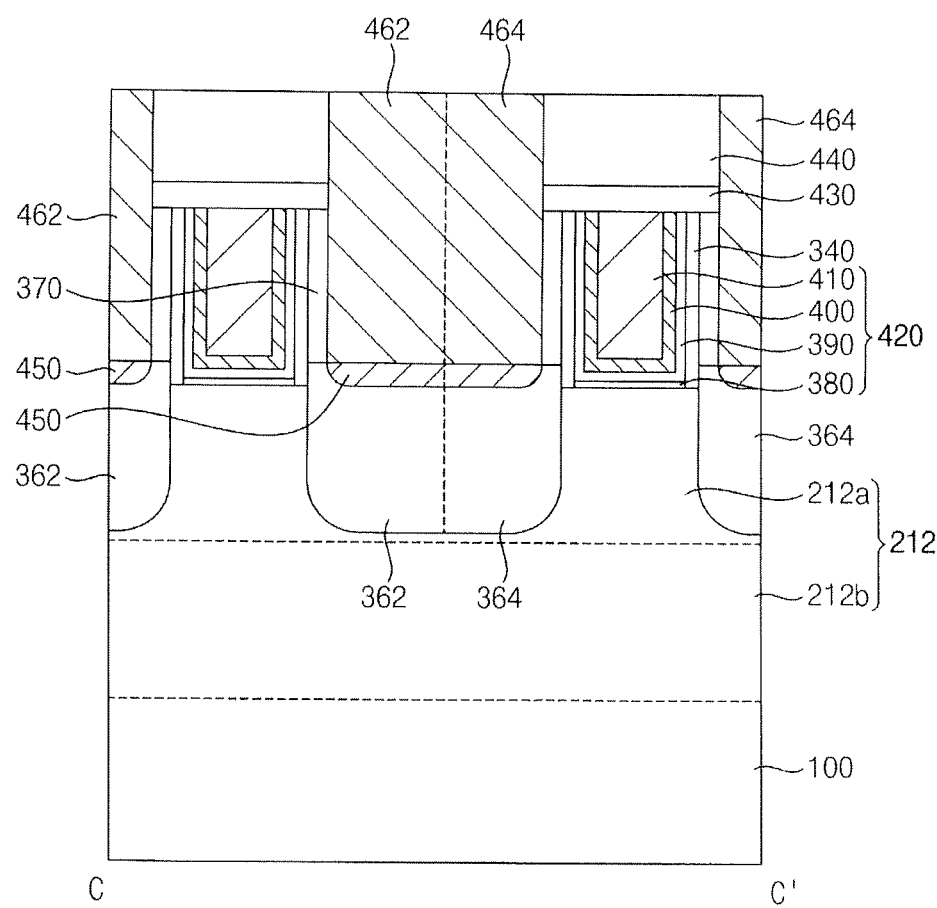
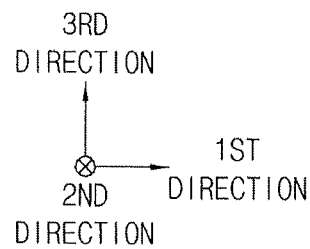

FIG. 34
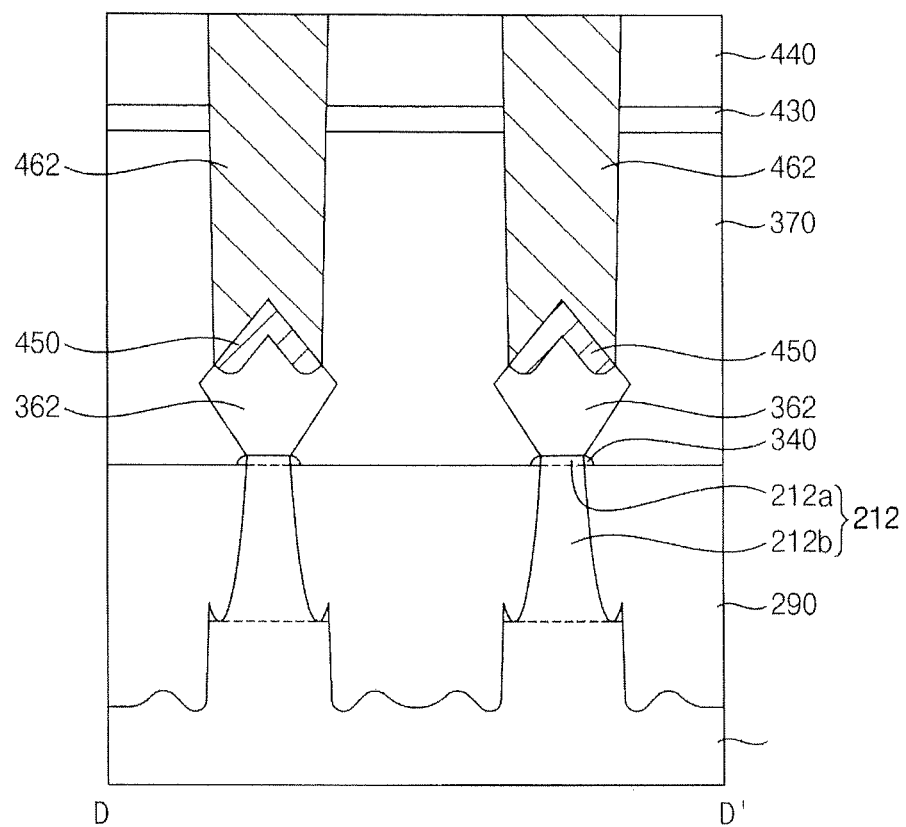
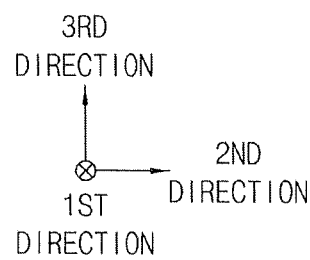

FIG. 35
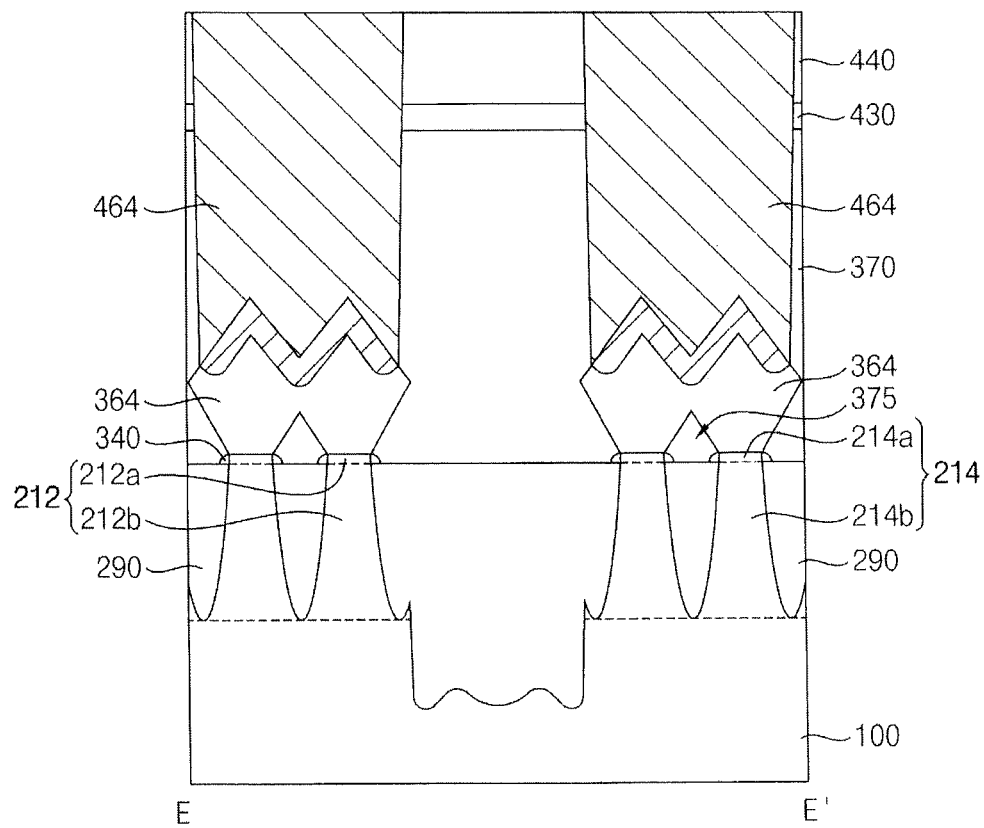
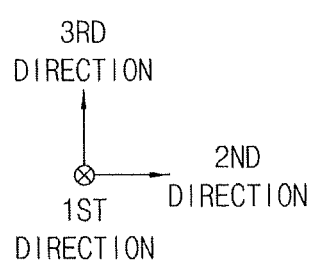

FIG. 36
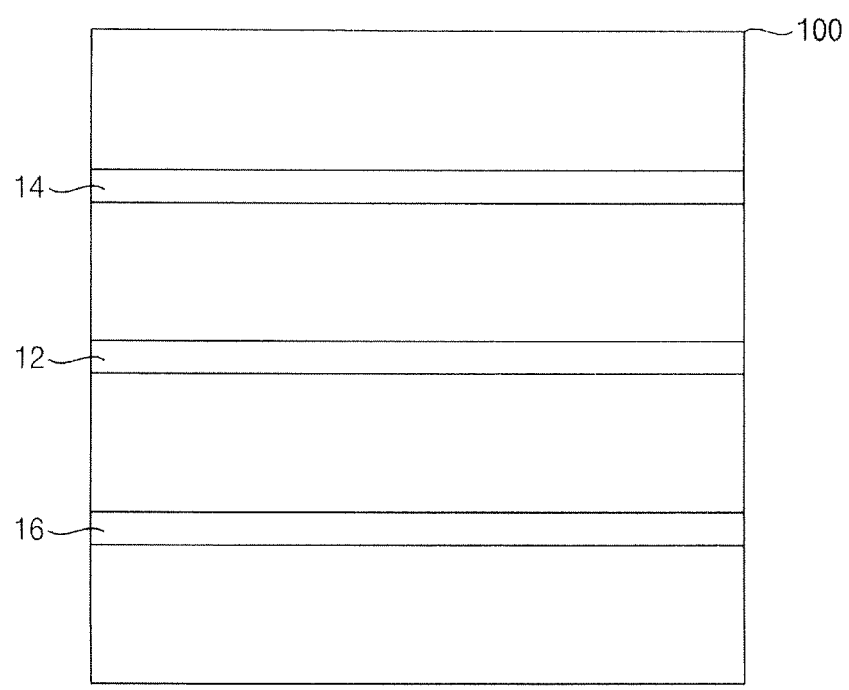
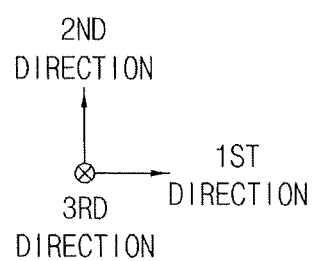

FIG. 37
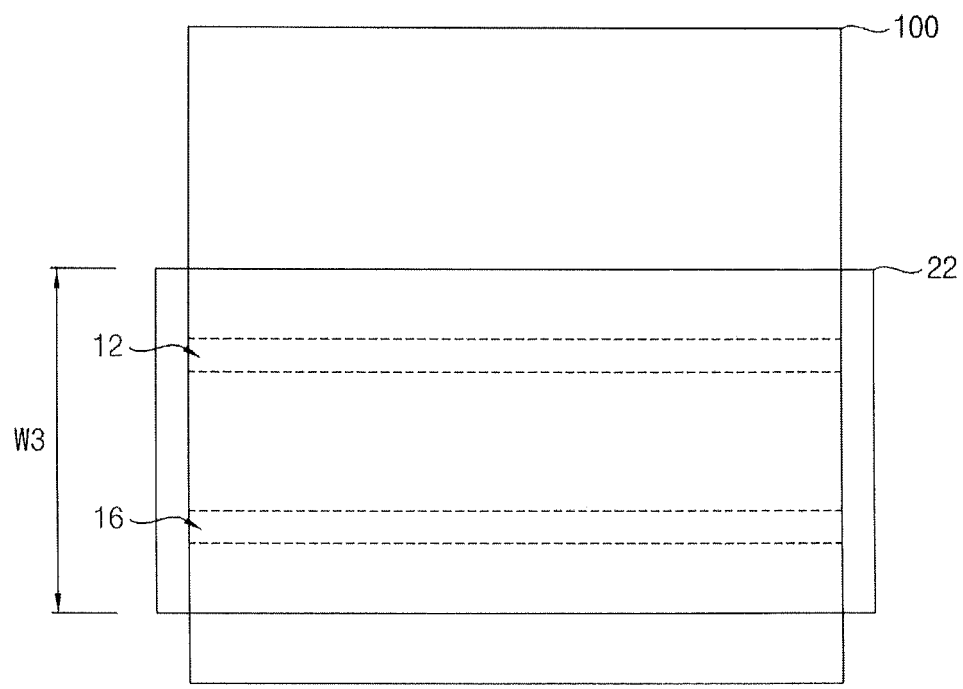
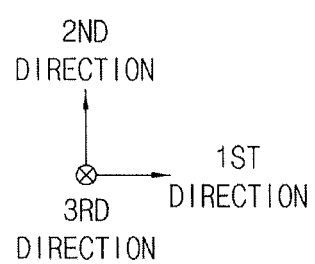

FIG. 38
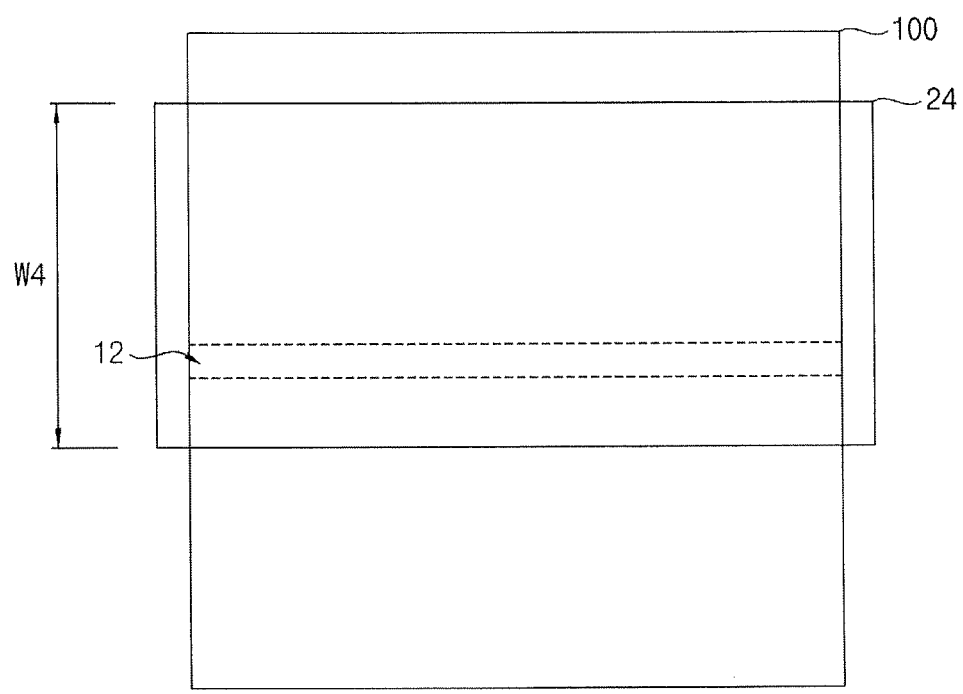
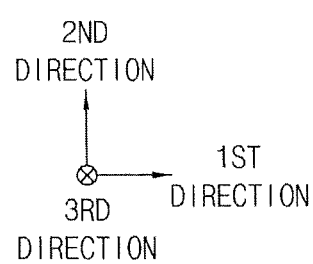

FIG. 47
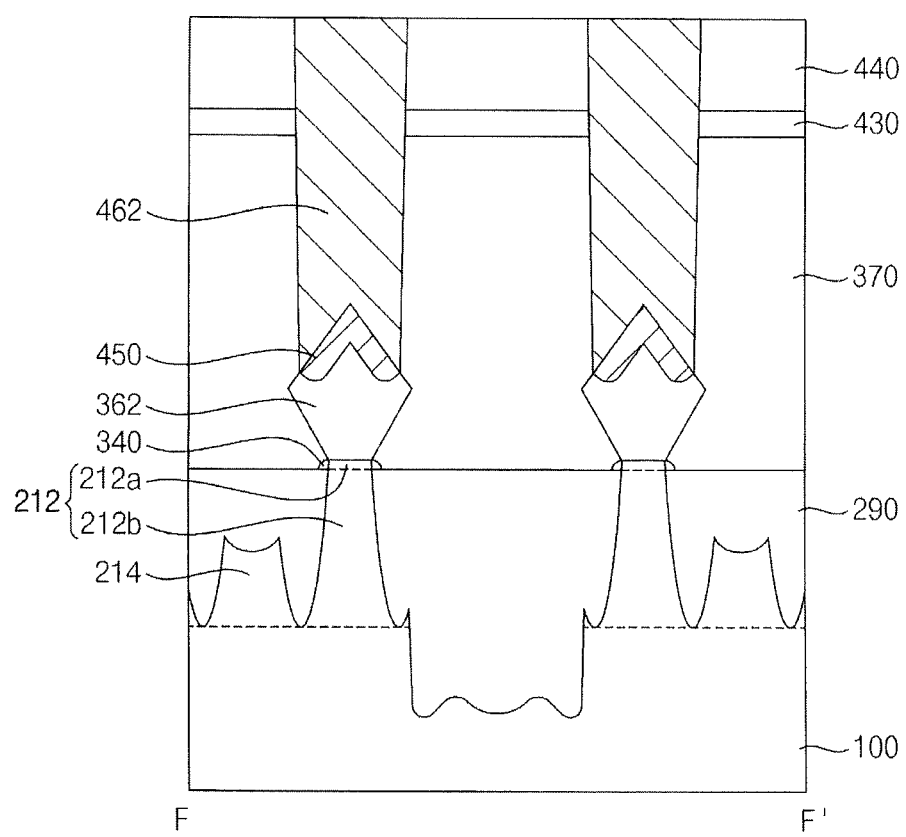
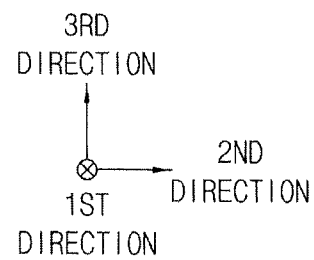

FIG. 55
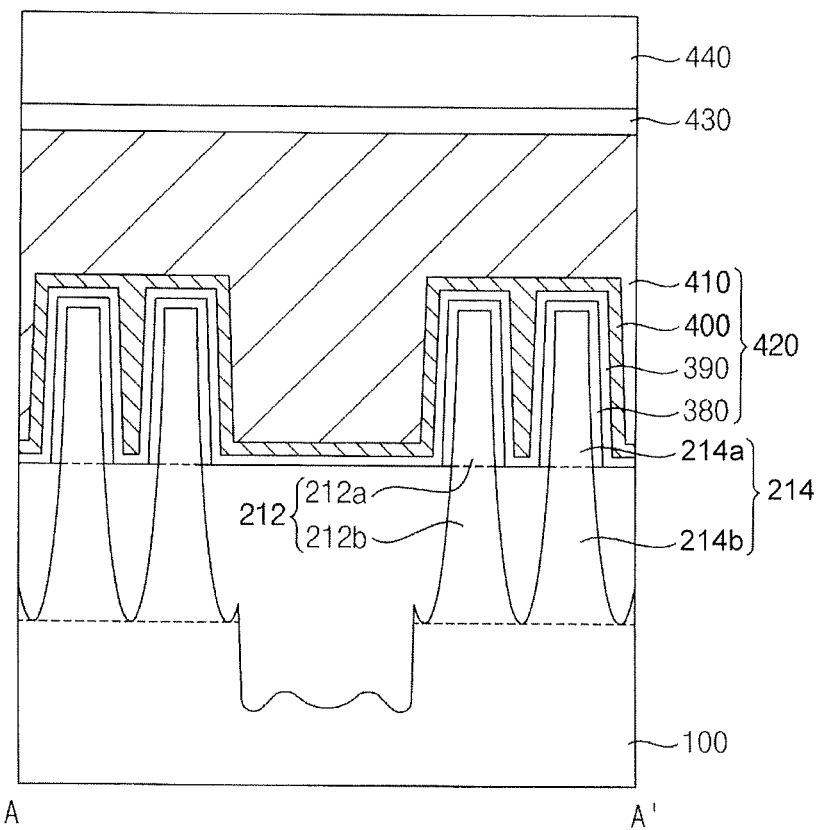
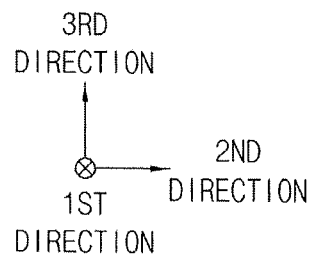

FIG. 56
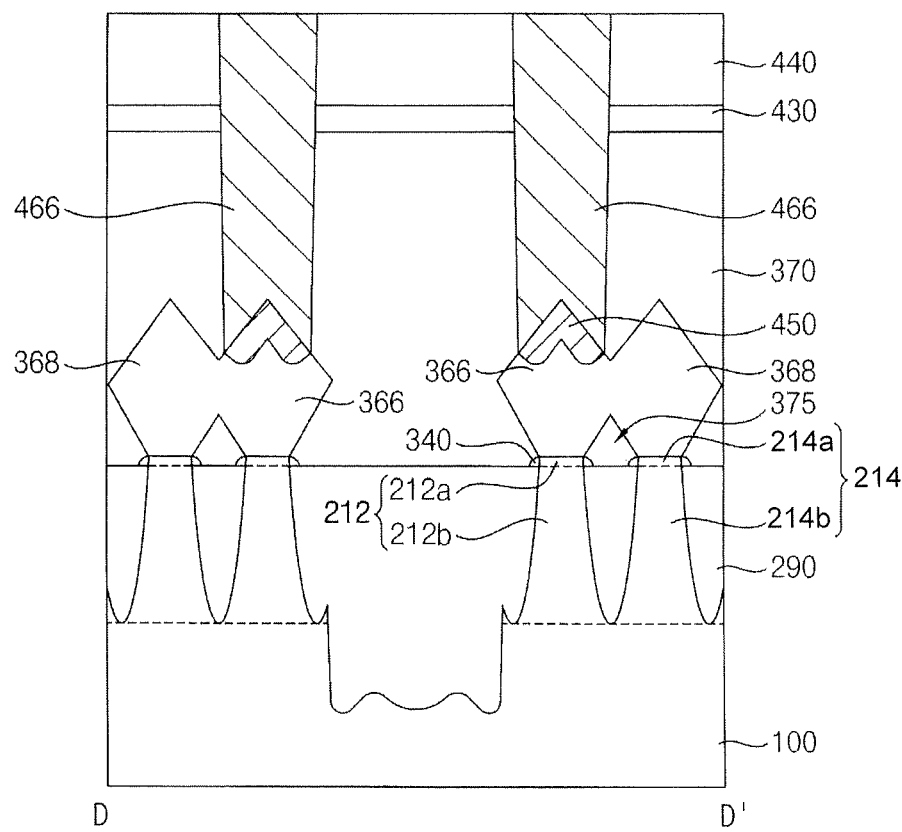
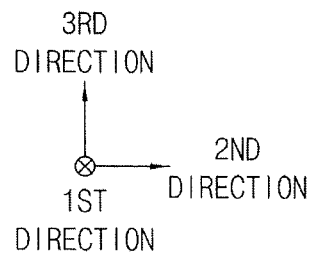

FIG. 57
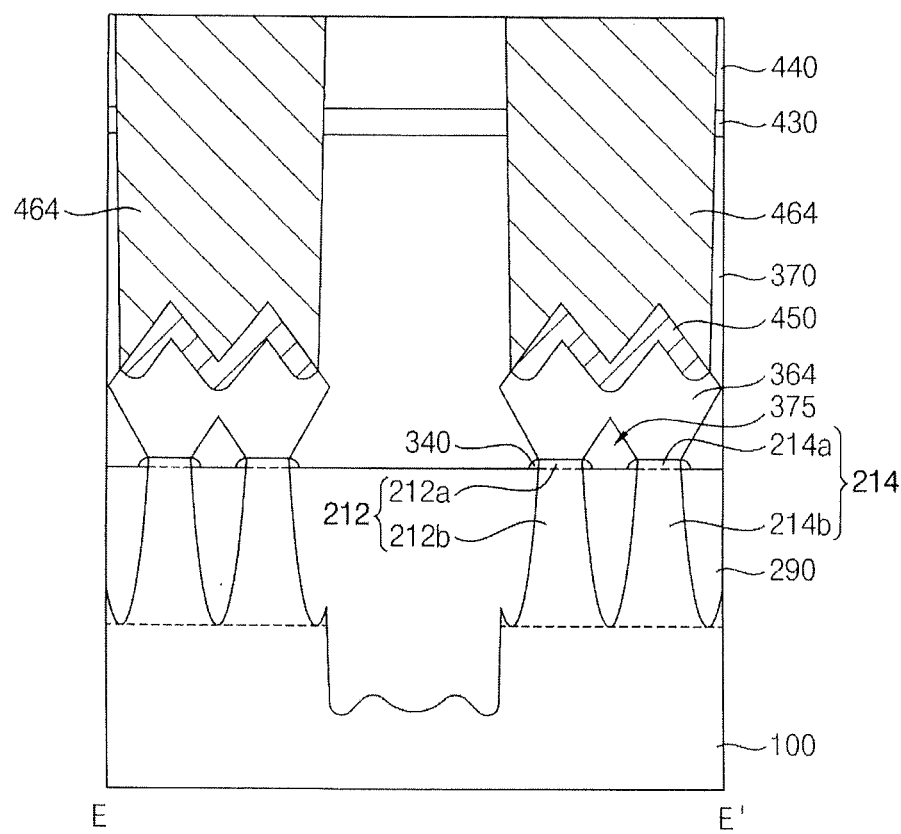
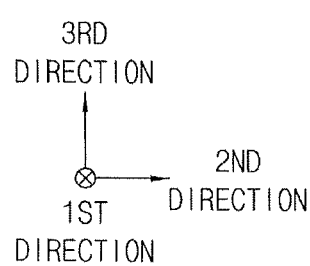

FIG. 58
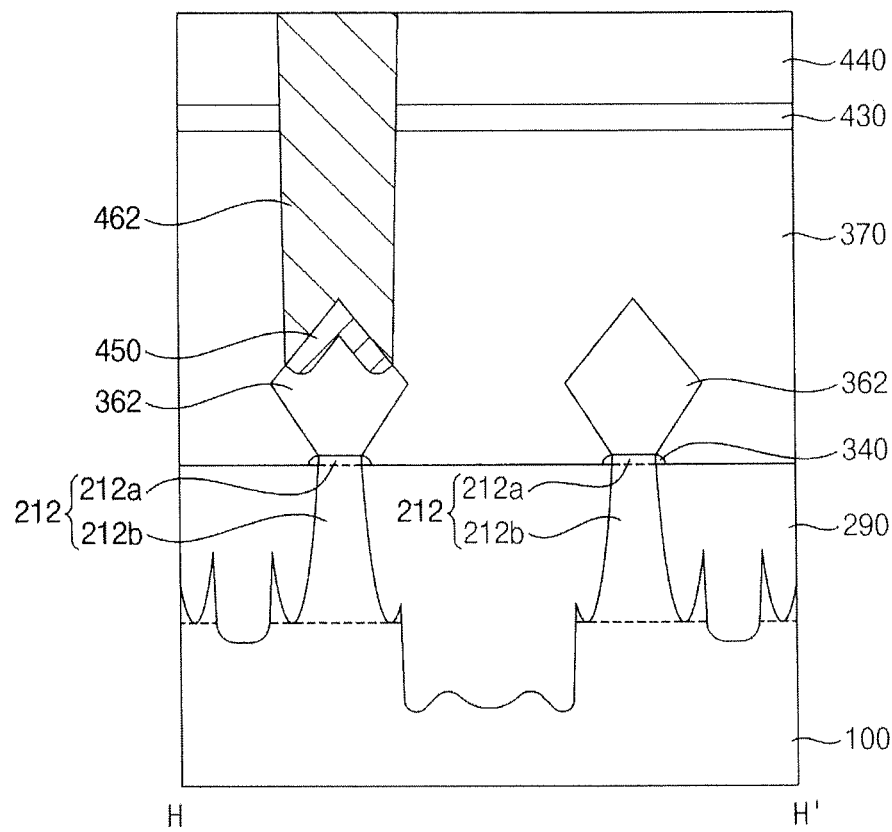
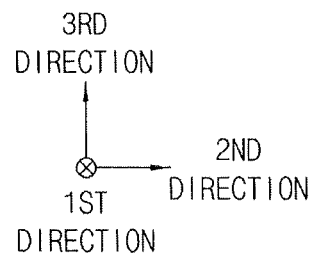

FIG. 60
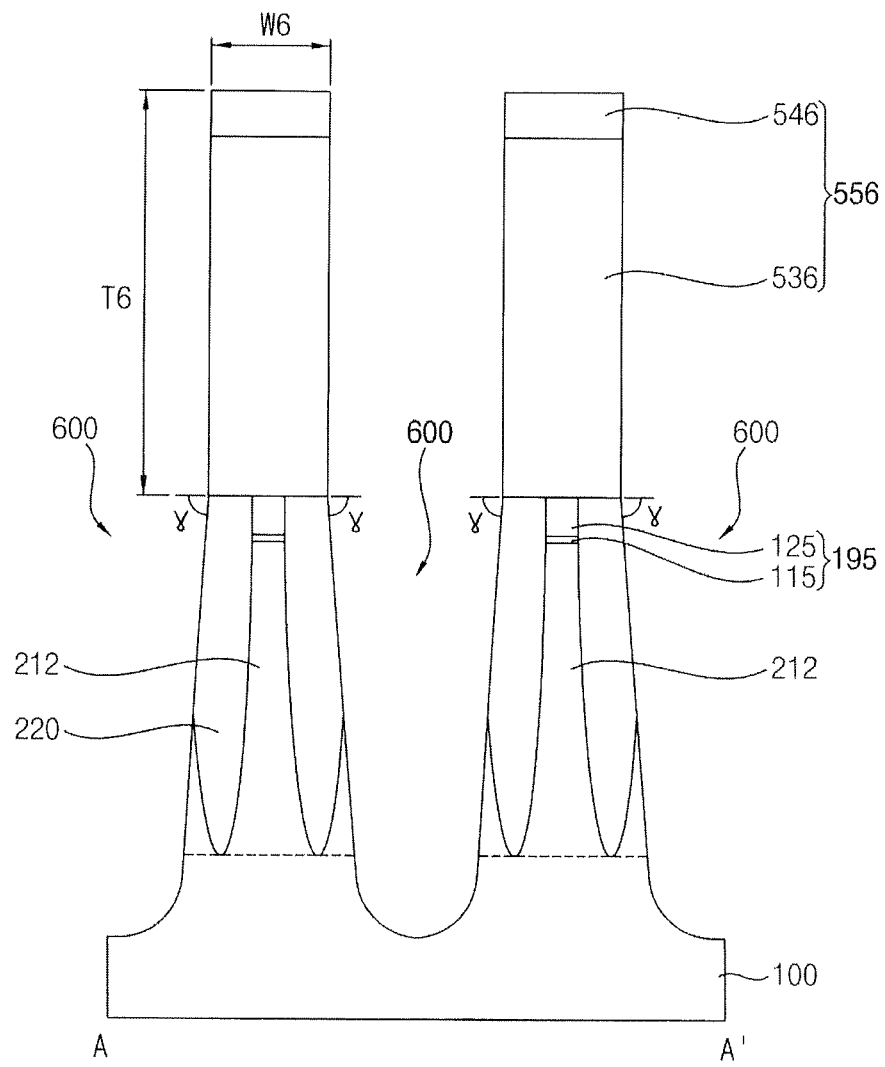
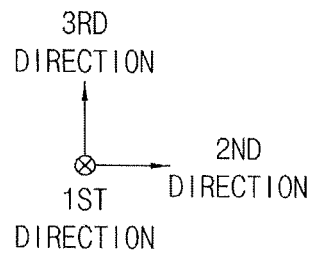

FIG. 63
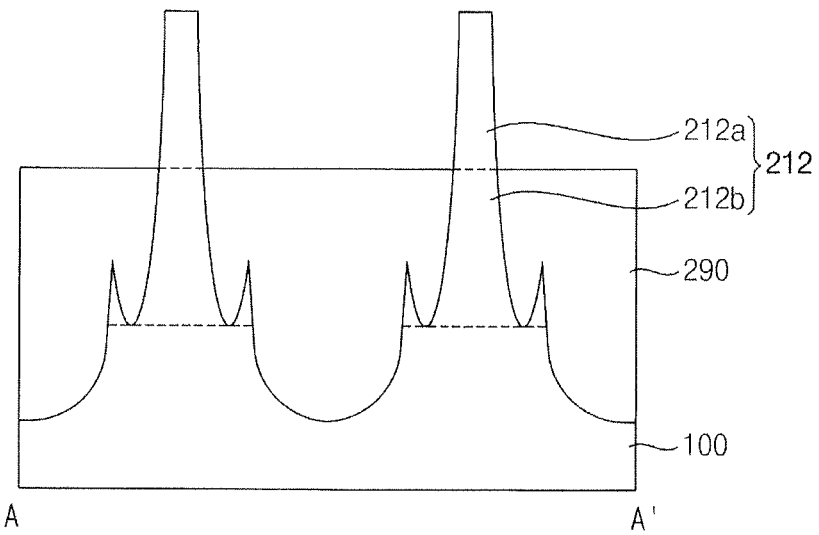
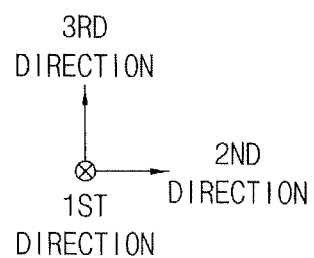

FIG. 64
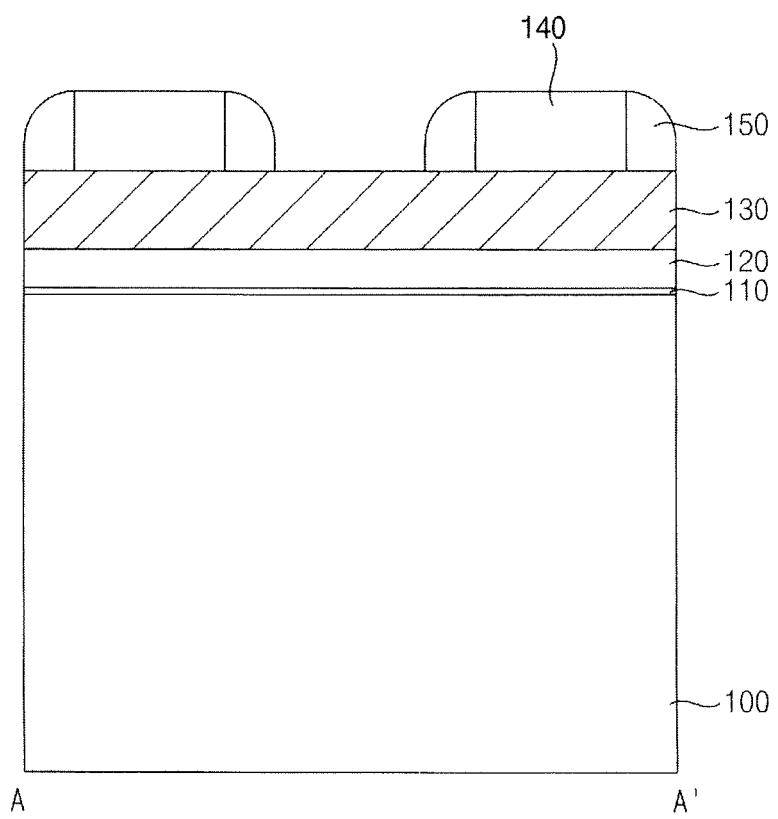
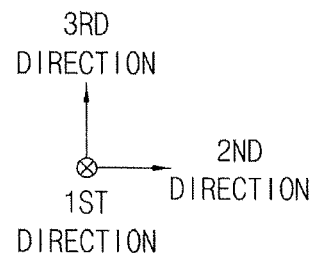

FIG. 65
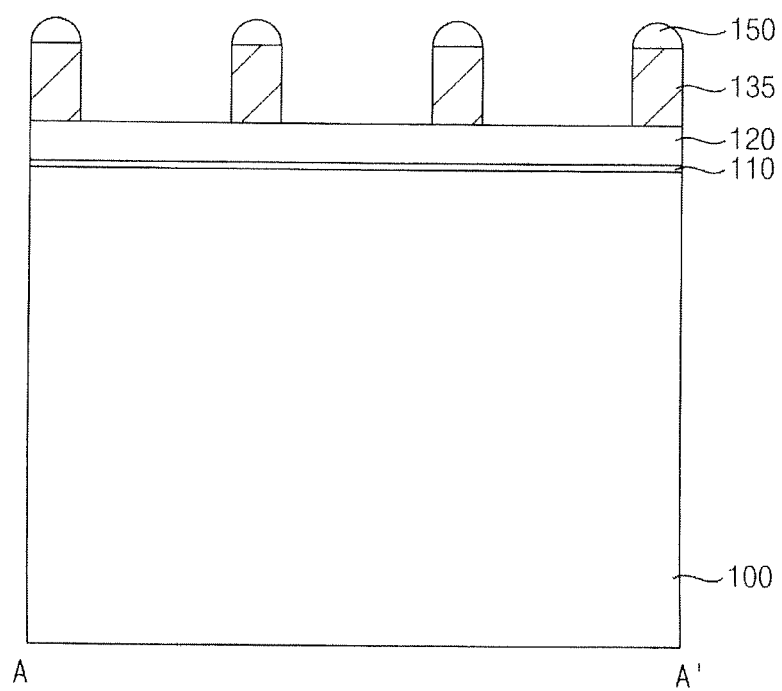
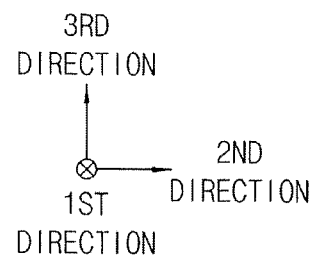

FIG. 68
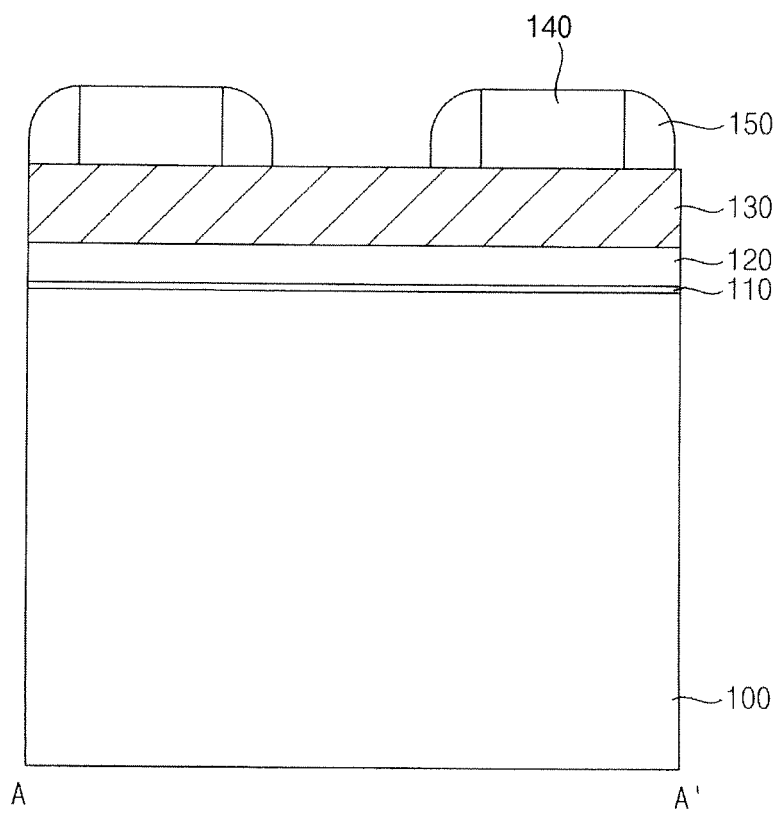
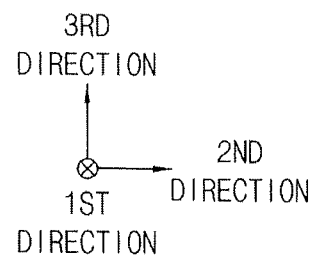

FIG. 69
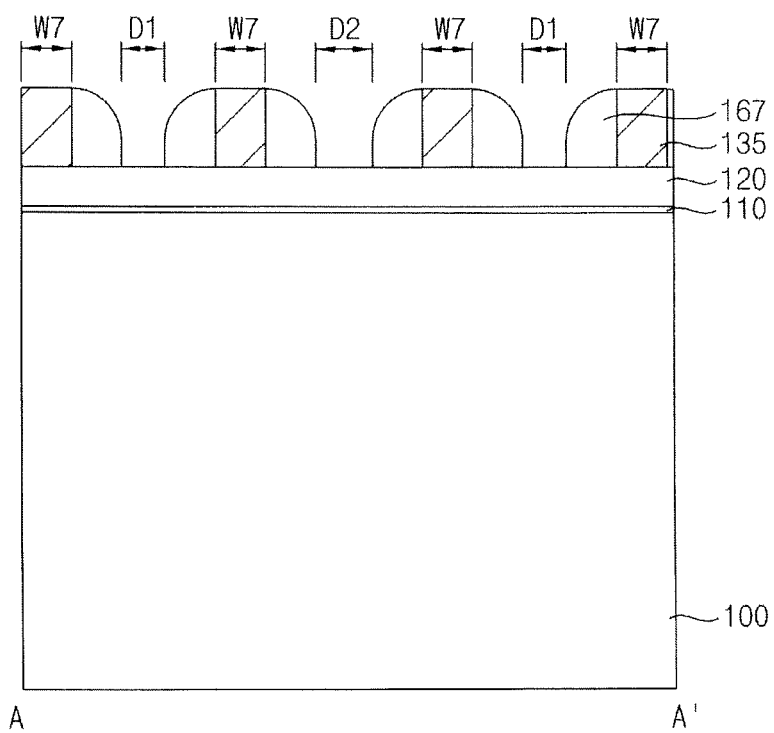
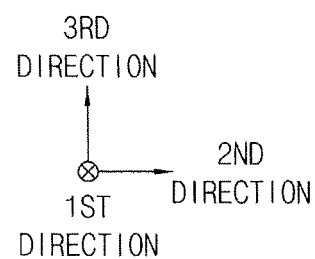

FIG. 73
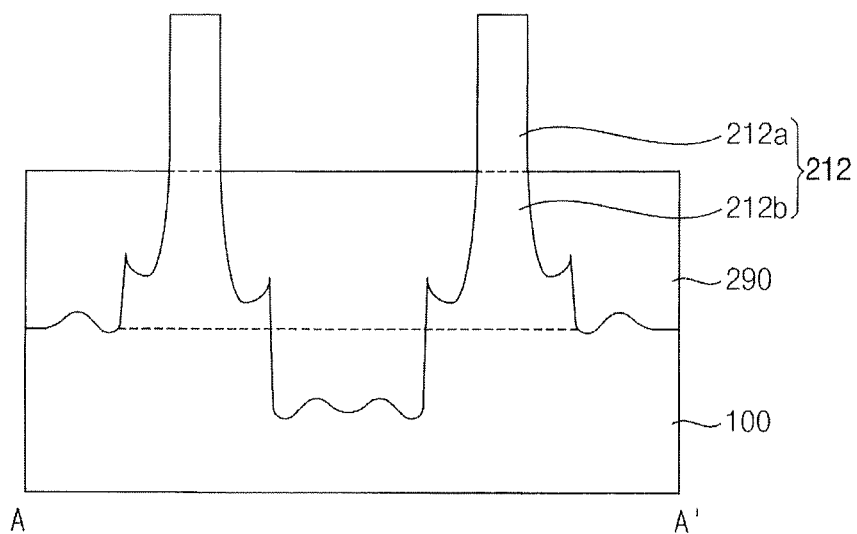
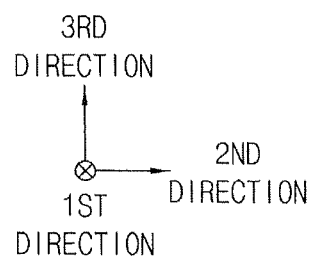

FIG. 75
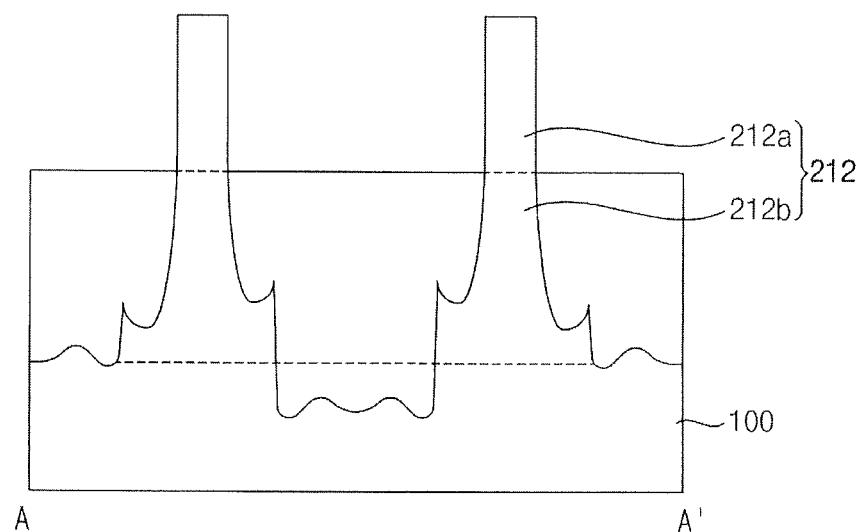
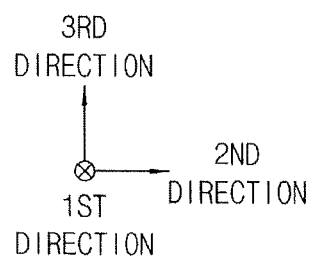

FIG. 78
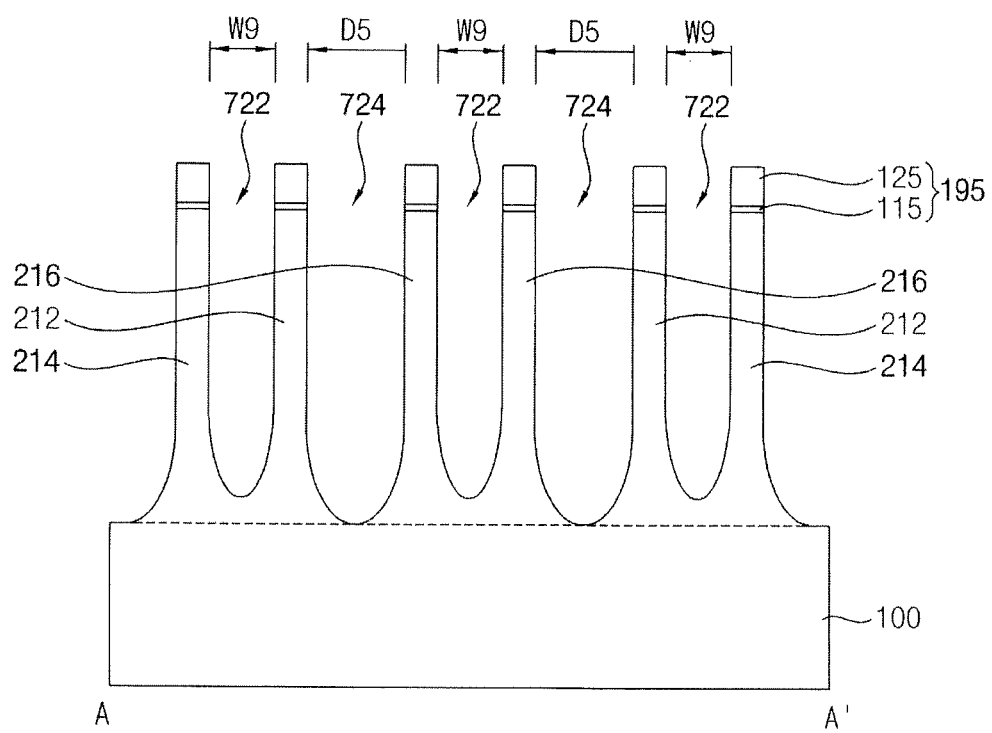
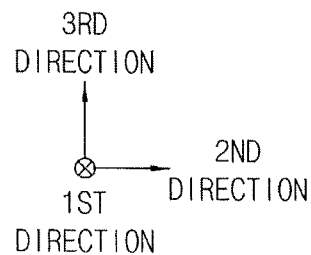

FIG. 82
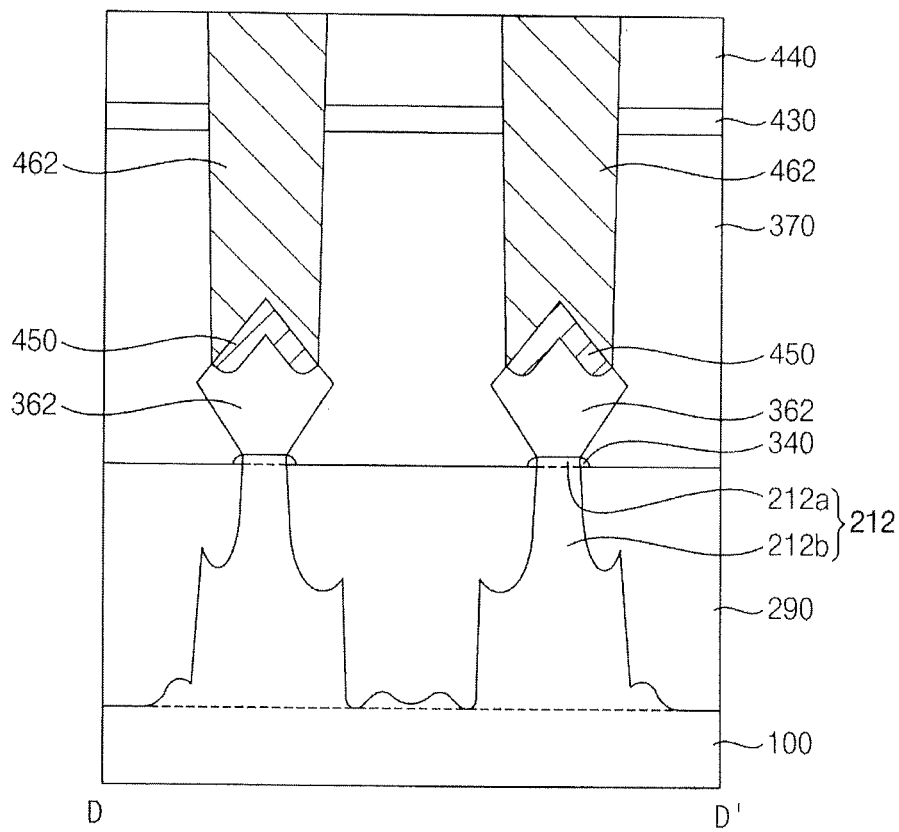
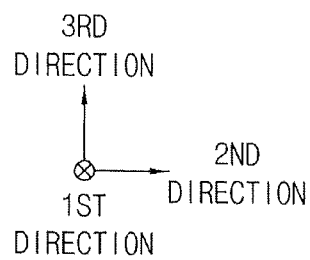

METHODS OF MANUFACTURING SEMICONDUCTOR DEVICES BY ETCHING ACTIVE FINS USING ETCHING MASKS

CROSS-REFERENCE TO RELATED APPLICATION

The present application is a divisional of U.S. patent application Ser. No. 15/658,964 filed with the U.S. Patent and Trademark Office on Jul. 25, 2017 and claims priority under 35 USC § 119 to Korean Patent Application No. 10-2017-0028130, filed on Mar. 6, 2017 in the Korean Intellectual Property Office (KIPO), the contents of which are herein incorporated by reference in their entirety.

BACKGROUND

1. Technical Field

Example embodiments relate to a semiconductor device and a method of manufacturing the same. More particularly, example embodiments relate to a semiconductor device including finFETs and a method of manufacturing the same.

2. Description of the Related Art

A finFET may include an active fin, a gate structure on the active fin, and a source/drain layer on a portion of the active fin adjacent the gate structure. The source/drain layer may be formed by a selective epitaxial growth (SEG) process. Due to the difficulty of the patterning process, the source/drain layer may be formed not on a single active fin but on a plurality of active fins, and thus the area of a semiconductor device including the finFET may increase.

SUMMARY

In accordance with example embodiments, there is provided a method of manufacturing a semiconductor device. In the method, first to third active fins may be formed on a substrate. Each of the first to third active fins may extend in a first direction substantially parallel to an upper surface of the substrate, and the second active fin, the first active fin, and the third active fin may be disposed in this order in a second direction substantially parallel to the upper surface of the substrate and crossing the first direction. The second active fin may be removed using a first etching mask covering the first and third active fins. The third active fin may be removed using a second etching mask covering the first active fin and a portion of the substrate from which the second active fin is removed. A first gate structure may be formed on the first active fin. A first source/drain layer may be formed on a portion of the first active fin adjacent the first gate structure.

In accordance with example embodiments, there is provided a method of manufacturing a semiconductor device. In the method, a plurality of active fins may be formed on a substrate. Each of the plurality of active fins may extend in a first direction substantially parallel to an upper surface of the substrate, and the plurality of active fins may be spaced apart from each other by a given distance in a second direction substantially parallel to the upper surface of the substrate and substantially perpendicular to the first direction. The active fins may be etched using a first etching mask covering a first active fin and a second active fin of the plurality of active fins. The second active fin may be adjacent a first side of the first active fin. The active fins may be etched using a second etching mask covering the first active fin, a portion of the second active fin, and a portion of the substrate corresponding to at least one of the plurality of active fins that may be adjacent a second side of the first active fin and removed using the first etching mask. First and second gate structures may be formed. The first gate structure may extend in the second direction on the first active fin, and the second gate structure may extend in the second direction on the first active fin and the portion of the second active fin. First and second source/drain layers may be formed. The first source/drain layer may be on a portion of the first active fin adjacent the first gate structure, and the second source/drain layer may be on a portion of the first active fin adjacent the second gate structure and the portion of the second active fin.

In accordance with example embodiments, there is provided a method of manufacturing a semiconductor device. In the method, first to third active fins may be formed on a substrate. Each of the first to third active fins may extend in a first direction substantially parallel to an upper surface of the substrate, and the second active fin, the first active fin, and the third active fin may be disposed in this order in a second direction substantially parallel to the upper surface of the substrate and crossing the first direction. The second active fin may include first and second portions disposed in the second direction and contacting each other. The third active fin may be removed using a first etching mask covering the first and second active fins. The second active fin may be partially removed using a second etching mask exposing only a portion of the first portion of the second active fin adjacent the second portion of the second active fin. A gate structure may be formed on the first and second active fins. A first source/drain layer may be formed on portions of the first and second active fins adjacent the gate structure.

In accordance with example embodiments, there is provided a method of manufacturing a semiconductor device. In the method, active fins may be formed on a substrate. Each of the active fins may extend in a first direction substantially parallel to an upper surface of the substrate, and the active fins may be disposed in a second direction substantially parallel to the upper surface of the substrate and crossing the first direction. The active fins may be etched using an etching mask covering a first active fin of the active fins. At least a portion of a lower portion of a second active fin of the active fins adjacent the first active fin may remain after etching the active fins. A surface of the at least the portion of the lower portion of the second active fin may be removed. A gate structure may be formed on the first active fin. A source/drain layer may be formed on a portion of the first active fin adjacent the gate structure.

In accordance with example embodiments, there is provided a method of manufacturing a semiconductor device. In the method, first to third active fins may be formed on a substrate. Each of the first to third active fins may extend in a first direction substantially parallel to an upper surface of the substrate, and the second active fin, the first active fin, and the third active fin may be disposed in this order in a second direction substantially parallel to the upper surface of the substrate and crossing the first direction. A first distance between the first and third active fins may be greater than a second distance between the first and second active fins. The second active fin may include first and second portions disposed in the second direction and contacting each other. The third active fin and the first portion of the second active fin may be removed using an etching mask covering the first active fin and the second portion of the second active fin. A distance from a first edge of the etching mask between the first and third active fins to a first sidewall of the first active fin may be greater than a distance from a second edge of the etching mask between the first and second active fins to a second sidewall of the first active fin. A first gate structure may be formed on the first active fin. A first source/drain layer may be formed on a portion of the first active fin adjacent the first gate structure.

In accordance with example embodiments, there is provided a method of manufacturing a semiconductor device. In the method, active fins may be formed on a substrate. Each of the active fins may extend in a first direction substantially parallel to an upper surface of the substrate, and the active fins may be disposed in a second direction substantially parallel to the upper surface of the substrate and crossing the first direction. The active fins may be etched using an etching mask covering a first active fin of the active fins. A distance between the first active fin and a second active fin adjacent a first sidewall of the first active fin may be greater than distances between other ones of the active fins. A first distance from a first edge of the etching mask between the first and second active fins to the first sidewall of the first active fin may be greater than a second distance from the first edge of the etching mask to a sidewall of the second active fin opposite the sidewall of the first active fin. A gate structure may be formed on the first active fin. A source/drain layer may be formed on a portion of the first active fin adjacent the gate structure.

In accordance with example embodiments, there is provided a method of manufacturing a semiconductor device. In the method, a circuit of the semiconductor device may be designed. A critical path may be determined by a timing analysis on the circuit. The semiconductor device may be fabricated on a substrate according to the designed circuit. Each of first transistors included in the critical path may be commonly formed on a plurality of active fins, while at least one of second transistors not included in the critical path may be formed on only one of the plurality of active fins.

In accordance with example embodiments, there is provided a semiconductor device. The semiconductor device may include a first active fin, a second active fin, a first gate structure, a second gate structure, a first source/drain layer, and a second source/drain layer. The first active fin may extend in a first direction to a first length on a substrate, and may include first and second protrusions at lower portions of first and second sidewalls thereof, respectively. The first direction may be substantially parallel to an upper surface of the substrate. The second active fin may extend in the first direction to a second length less than the first length, and may be spaced apart from the first active fin in a second direction substantially parallel to the upper surface of the substrate and crossing the first direction. The first gate structure may extend in the second direction on the first active fin. The second gate structure may extend in the second direction on the first and second active fins. The first source/drain layer may be on a portion of the first active fin adjacent the first gate structure. The second source/drain layer may be on portions of the first and second active fins adjacent the second gate structure. The first protrusion at the lower portion of the first sidewall of the first active fin opposite the second active fin may extend in the first direction at a portion of the first active fin not adjacent the second active fin in the second direction. The second protrusion at the lower portion of the second sidewall of the first active fin may extend in the first direction to the first length.

In accordance with example embodiments, there is provided a semiconductor device. The semiconductor device may include a first active fin, a second active fin, a first gate structure, and a first source/drain layer. The first active fin may extend in a first direction to a first length on a substrate. The first direction may be substantially parallel to an upper surface of the substrate. The second active fin may extend in the first direction to a second length less than the first length, and may be spaced apart from the first active fin in a second direction substantially parallel to the upper surface of the substrate and crossing the first direction. An end of the second active fin in the first direction may have a staircase shape. The first gate structure may extend in the second direction on the first active fin. The first source/drain layer may be on a portion of the first active fin adjacent the first gate structure.

In accordance with example embodiments, there is provided a semiconductor device. The semiconductor device may include a first active fin, second and third active fins, a first gate structure, a second gate structure, a first source/drain layer, a second source/drain layer, a first contact plug, and a second contact plug. The first active fin may extend in a first direction on a substrate. The first direction may be substantially parallel to an upper surface of the substrate. The second and third active fins may be spaced apart from each other in a second direction substantially parallel to the upper surface of the substrate and crossing the first direction. Each of the second and third active fins may extend in the first direction, and the second and third active fins may be spaced apart from the first active fin by substantially the same distance. The first gate structure may extend in the second direction on the first and third active fins. The second gate structure may extend in the second direction on the first and second active fins. The first source/drain layer may be on both portions of the first and third active fins adjacent the first gate structure. The second source/drain layer may be on both portions of the first and second active fins adjacent the second gate structure. The first contact plug may be on only a portion of the first source/drain layer on the first active fin. The second contact plug may be on the second source/drain layer.

In accordance with example embodiments, there is provided a semiconductor device. The semiconductor device may include a first active fin, a second active fin, a first gate structure, a second gate structure, a first source/drain layer, and a second source/drain layer. The first active fin may extend in a first direction to a first length on a substrate and having first and second protrusions at lower portions of opposite first and second sidewalls, respectively, thereof. The first direction may be substantially parallel to an upper surface of the substrate. The second active fin may extend in the first direction to a second length less than the first length, and may be spaced apart from the first active fin in a second direction be substantially parallel to the upper surface of the substrate and crossing the first direction. The first gate structure may extend in the second direction on the first active fin. The second gate structure may extend in the second direction on the first and second active fins. The first source/drain layer may be on a portion of the first active fin adjacent the first gate structure. The second source/drain layer may be on both portions of the first and second active fins adjacent the second gate structure. A first distance between the first sidewall of the first active fin and a top surface of the first protrusion in the second direction may be different from a second distance between the second sidewall of the first active fin and a top surface of the second protrusion.

In accordance with example embodiments, there is provided a semiconductor device. The semiconductor device may include a first active fin, a first gate structure, and a first source/drain layer. The first active fin may extend in a first direction on a substrate and having first and second protrusions at lower portions of respective first and second sidewalls thereof. The first direction may be substantially parallel to an upper surface of the substrate. The first and second sidewalls may be opposite in a second direction substantially parallel to the upper surface of the substrate and crossing the first direction. The first gate structure may extend in the second direction on the first active fin. The first source/drain layer may be on a portion of the first active fin adjacent the first gate structure. A first distance between the first sidewall of the first active fin and a top surface of the first protrusion in the second direction may be different from a second distance between the second sidewall of the first active fin and a top surface of the second protrusion.

In the method of manufacture the semiconductor device, a plurality of active fins except for one active fin may be removed by performing an etching process twice, each of which may use an etching mask covering the one active fin and another active fin adjacent thereto. Thus, a transistor may be formed on the one active fin. Only a transistor not included in the critical path may be formed on the one active fin, so that the deterioration of the characteristics of the circuit may be prevented.

As a result, the semiconductor device may have a high integration degree and a small area even without the deterioration of characteristics thereof.

BRIEF DESCRIPTION OF THE DRAWINGS

FIGS. 1 to 35 are plan views and cross-sectional views illustrating a method of manufacturing a semiconductor device in accordance with example embodiments;

FIGS. 36 to 38 are plan views illustrating a method of manufacturing a semiconductor device in accordance with example embodiments;

FIGS. 42 to 48 are plan views and cross-sectional views illustrating a method of manufacturing a semiconductor device in accordance with example embodiments;

FIGS. 52 to 58 are plan views and cross-sectional views illustrating a method of manufacturing a semiconductor device in accordance with example embodiments;

FIGS. 59 to 63 are a plan view and cross-sectional views illustrating a method of manufacturing a semiconductor device in accordance with example embodiments;

FIGS. 64 to 67 are cross-sectional views illustrating a method of forming an active fin in accordance with example embodiments;

FIGS. 68 to 73 are cross-sectional views illustrating a method of manufacturing a semiconductor device in accordance with example embodiments;

FIGS. 74 to 75 are cross-sectional views illustrating a method of manufacturing a semiconductor device in accordance with example embodiments; and FIGS. 76 to 83 are cross-sectional views illustrating a method of manufacturing a semiconductor device in accordance with example embodiments.

DESCRIPTION OF EMBODIMENTS

Example embodiments of the inventive concepts will be illustrated in detail with reference to drawings attached herewith.

FIGS. 1 to 35 are plan views and cross-sectional views illustrating stages of a method of manufacturing a semiconductor device in accordance with example embodiments. FIGS. 1, 6, 8, 10, 12, 14, 16, 19, 23, 27, and 31 are plan views, and FIGS. 2-5, 7, 9, 11, 13, 15, 17-18, 20-22, 24-26, 28-30, and 32-35 are cross-sectional views.

FIGS. 2-5, 7, 9, 11, 13, 15, 17, 20, 28, and 32 are cross-sectional views taken along lines A-A' of corresponding plan views, respectively, FIG. 18 is a cross-sectional view taken along a line B-B' of a corresponding plan view, FIGS. 21, 24, 29, and 33 are cross-sectional views taken along lines C-C' of corresponding plan views, respectively, FIGS. 22, 25, 30, and 34 are cross-sectional views taken along lines D-D' of corresponding plan views, respectively, and FIGS. 26 and 35 are cross-sectional views taken along lines E-E' of corresponding plan views, respectively.

Figure 1:
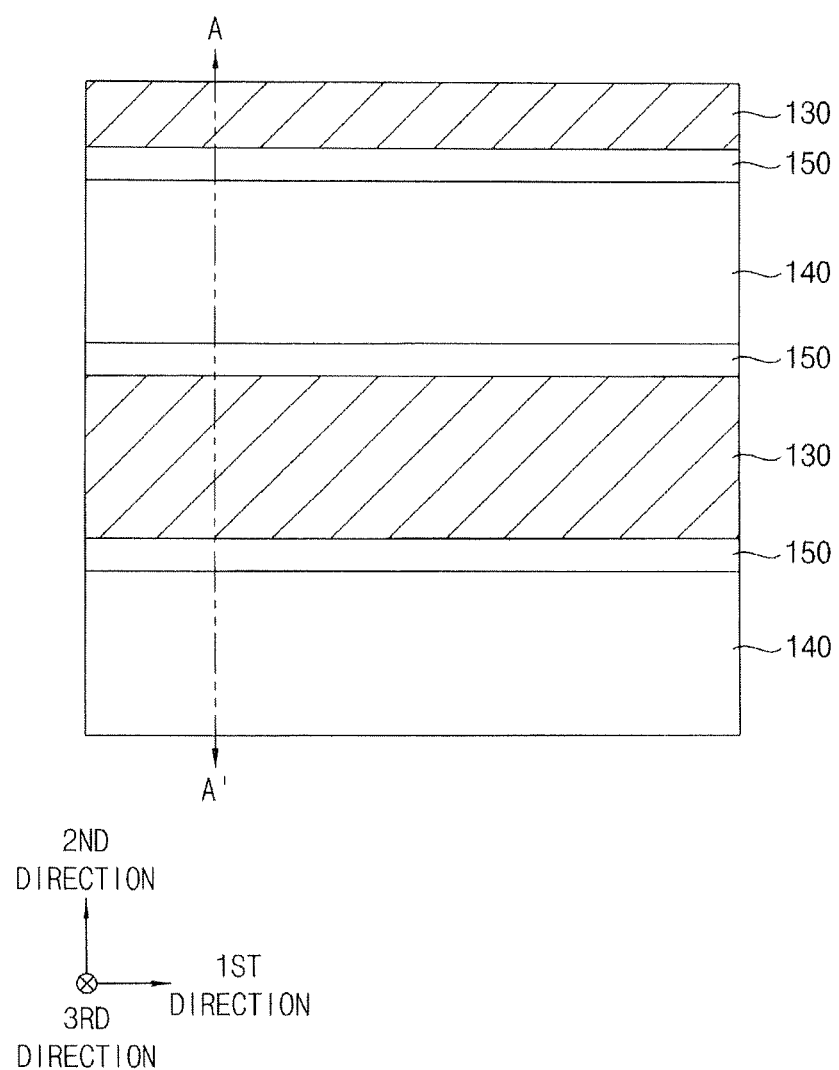
Figure 2:
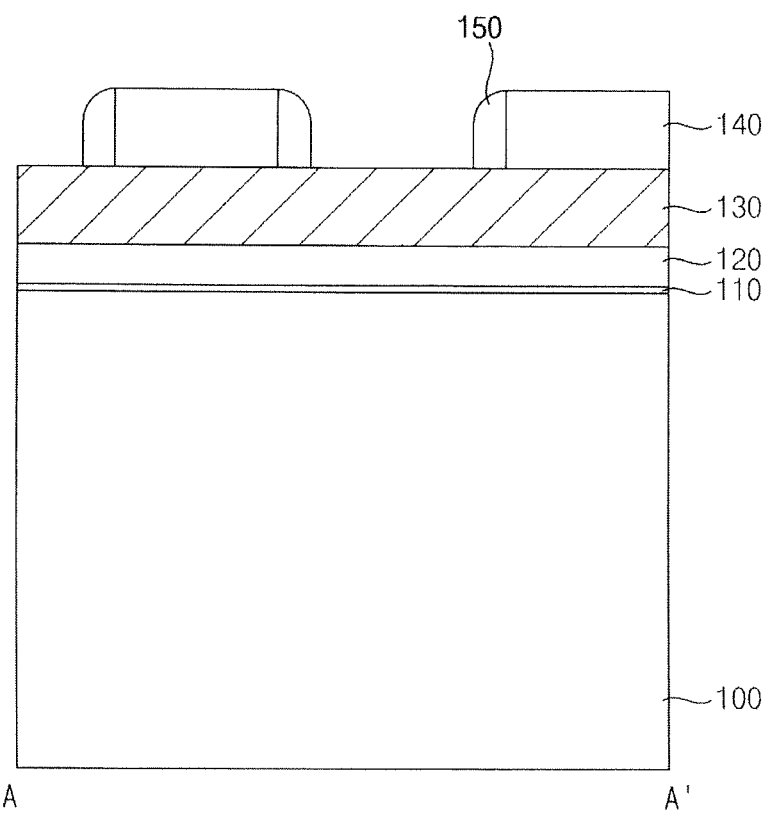

Referring to FIGS. 1 and 2, a first layer 110, a second layer 120, a third layer 130, a sacrificial pattern 140, and a first spacer 150 may be sequentially formed on a substrate 100.

The substrate 100 may include a semiconductor material, e.g., silicon, germanium, silicon-germanium, etc., or III-V semiconductor compounds, e.g., GaP, GaAs, GaSb, etc. In some embodiments, the substrate 100 may be a silicon-on-insulator (SOI) substrate, or a germanium-on-insulator (GOI) substrate.

The first layer 110 may include an oxide, e.g., silicon oxide, the second layer 120 may include a nitride, e.g., plasma enhanced silicon oxynitride (PE-SiON), the third layer 130 may include, e.g., polysilicon, the sacrificial pattern 140 may include, e.g., spin-on-hardmask (SOH), amorphous carbon layer (ACL), etc., and the first spacer 150 may include, e.g., an atomic layer deposition oxide (ALD-oxide). However, the inventive concepts may not be limited thereto. The above layers may include other materials having proper etching selectivities with respect to each other, and additional layers may be further formed between the above layers.

In example embodiments, the sacrificial pattern 140 may extend in a first direction substantially parallel to an upper surface of the substrate 100, and a plurality of sacrificial patterns 140 may be formed in a second direction, which may be substantially parallel to the upper surface of the substrate 100 and cross the first direction, to be spaced apart from each other by a given distance. In example embodiments, the first and second directions cross each other at a right angle, that is, the first and second directions may be substantially perpendicular to each other. The sacrificial pattern 140 may be formed by forming a sacrificial layer on the third layer 130, forming a photoresist pattern on the sacrificial layer, and etching the sacrificial layer using the photoresist pattern as an etching mask. The photoresist pattern may be formed by performing an exposure process and a developing process on a photoresist layer, and the exposure process may be performed using, e.g., argon fluoride (ArF) as a light source.

In example embodiments, the first spacer 150 may be formed by conformally forming a first spacer layer on the third layer 130 to cover the sacrificial pattern 140 through an atomic layer deposition (ALD) process, and anisotropically etching the first spacer layer. Thus, the first spacer 150 may be formed on each of opposite sidewalls of each of the sacrificial patterns 140, and may extend in the first direction.

In an example embodiment, a width of each of the sacrificial patterns 140 in the second direction and a thickness of the first spacer layer in a third direction, which may be substantially perpendicular to the upper surface of the substrate 100, may be adjusted so that a distance between opposite ones of the first spacers 150 in the second direction between neighboring ones of the sacrificial patterns 140 may be substantially equal to the width of each of the sacrificial patterns 140 in the second direction. For example, the thickness of the first spacer layer may be substantially the same as half of a value of a space between neighboring ones of the sacrificial patterns 140 subtracted by the width of each of the sacrificial patterns 140, and the thickness of the first spacer layer may be substantially equal to a width of the first spacer 150 in the second direction. In an example embodiment, the width of each of the sacrificial patterns 140 may be five times the width of the first spacer 150; however, the inventive concepts may not be limited thereto.

Referring to FIG. 3, after removing the sacrificial patterns 140, the third layer 130 may be etched using the first spacer 150 as an etching mask to form a third pattern 135.

The sacrificial patterns 140 may be removed by a wet etching process or a dry etching process, and the first spacer 150 may be partially or entirely removed during the etching process. In example embodiments, the third pattern 135 may extend in the first direction with a width substantially equal to the width of the first spacer 150, and a plurality of third patterns 135 may be formed in the second direction by a given distance, e.g., five times the width of the third pattern 135.

Referring to FIG. 4, a fourth layer 160 may be conformally formed on the second layer 120 to cover the third patterns 135, a fifth layer may be formed on the fourth layer 160 to sufficiently fill a first recess on the fourth layer 160, and the fifth layer may be planarized until a top surface of the fourth layer 160 may be exposed. Thus, a fifth pattern 175 may be formed between neighboring ones of the third patterns 135.

The fourth layer 160 may include, e.g., an oxide, and the fifth layer may include a material substantially the same as that of the third pattern 135, e.g., SOH, ACL, etc.

In an example embodiment, the fourth layer 160 may have a thickness substantially equal to twice the width of each of the third patterns 135, and thus a width of the fifth pattern 175 in the second direction may be substantially equal to the width of each of the third patterns 135.

Figure 5:
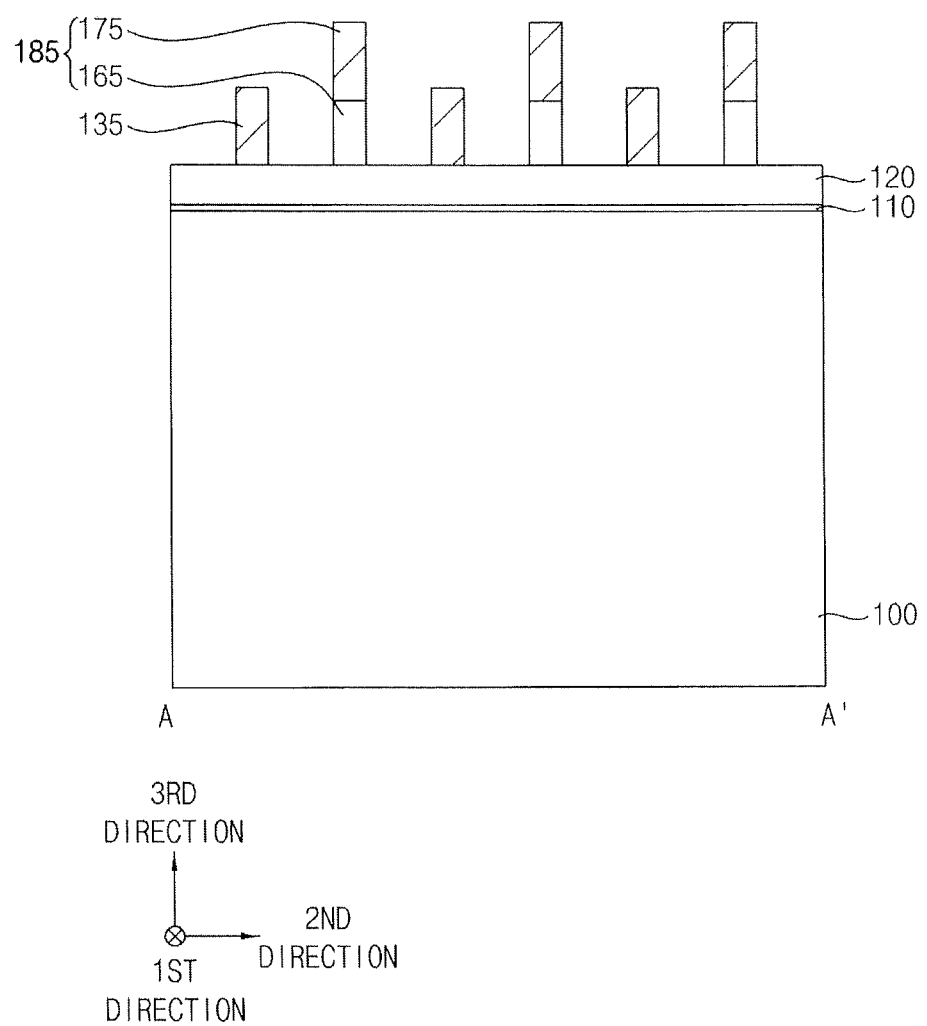

Referring to FIG. 5, the fourth layer 160 may be etched using the fifth pattern 175 as an etching mask to form a fourth pattern 165 beneath the fifth pattern 175.

Thus, a pattern structure 185 including the fourth and fifth patterns 165 and 175 sequentially stacked may be formed.

In example embodiments, each of the third pattern 135 and the pattern structure 185 may extend in the first direction, and the third pattern 135 and the pattern structure 185 may be alternately and repeated formed in the second direction to be spaced apart from each other by a given distance. In an example embodiment, a distance between the third pattern 135 and the pattern structure 185 may be substantially equal to twice the width of the third pattern 135; however, the inventive concepts may not be limited thereto.

Figure 6:
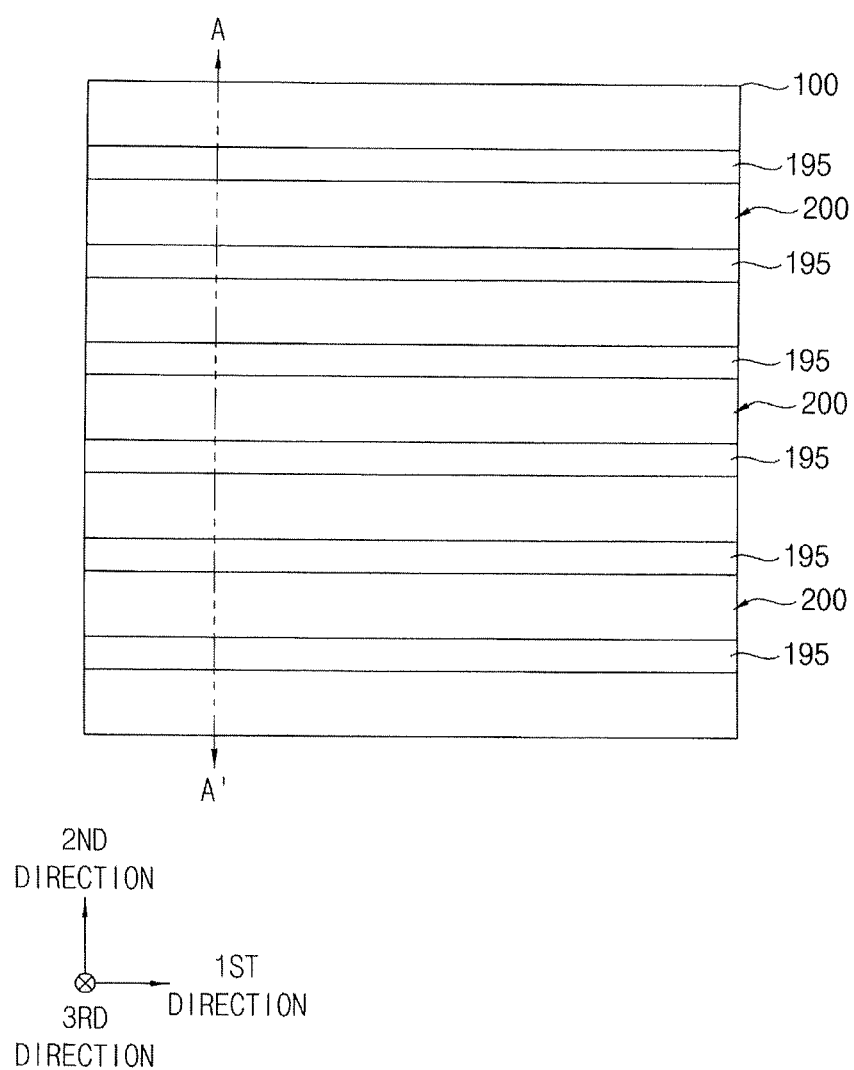

Referring to FIGS. 6 and 7, the second layer 120 and the first layer 110 may be etched using the third pattern 135 and the pattern structure 185 as an etching mask, and thus a first etching mask 195 including a first pattern 115 and a second pattern 125 sequentially stacked may be formed.

An upper portion of the substrate 100 may be etched using the first etching mask 195 to form first, second and third active fins 212, 214 and 216. Hereinafter, a lower portion of the substrate 100, that is, a lower portion at which the first to third active fins 212, 214 and 216 are not formed may be referred to simply as the substrate 100, which may be distinguished from the first to third active fins 212, 214 and 216.

In example embodiments, each of the first to third active fins 212, 214 and 216 may extend in the first direction with a given width in the second direction, and the first to third active fins 212, 214 and 216 may be disposed in the second direction to be spaced apart from each other by a given distance, e.g., twice the width of each of the first to third active fins 212, 214 and 216.

In an example embodiment, the first to third active fins 212, 214 and 216 may be disposed in the second direction, for example, in the following order: the second active fin 214, the first active fin 212, the third active fin 216, the third active fin 216, the first active fin 212, the second active fin 214. However, the inventive concepts may not be limited thereto. For example, one or a plurality of second active fins 214 may be disposed in the second direction to be adjacent to each other, and/or one or a plurality of third active fins 216 may be disposed in the second direction to be adjacent to each other, however, not a plurality of first active fins 212 may be continually disposed in the second direction to be adjacent to each other. That is, a plurality of first active fins 212 may be disposed in the second direction, however, not another first active fin 212 but the second active fin 214 or the third active fin 216 may be disposed at each of opposite sides of one first active fin 212 in the second direction. As a result, the second active fin 214 or the third active fin 216 may be interposed between neighboring ones of the first active fins 212 in the second direction.

Due to the characteristics of the etching process, each of the first to third active fins 212, 214 and 216 may not have a completely vertical sidewall, i.e., a sidewall having an angle of 90 degrees with respect to an upper surface of the substrate 100. That is, a second recess 200 between the first to third active fins 212, 214 and 216 may have a width gradually decreasing from a top toward a bottom thereof.

Figure 8:
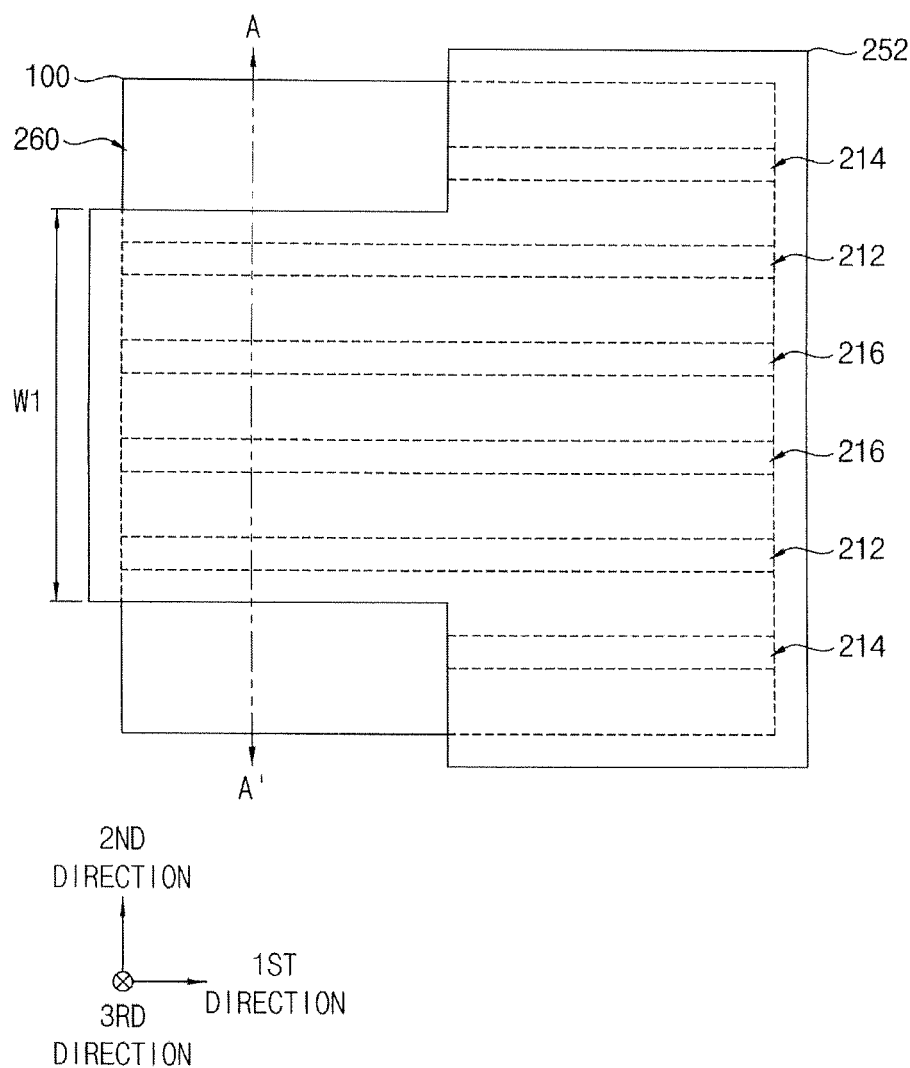
Figure 9:
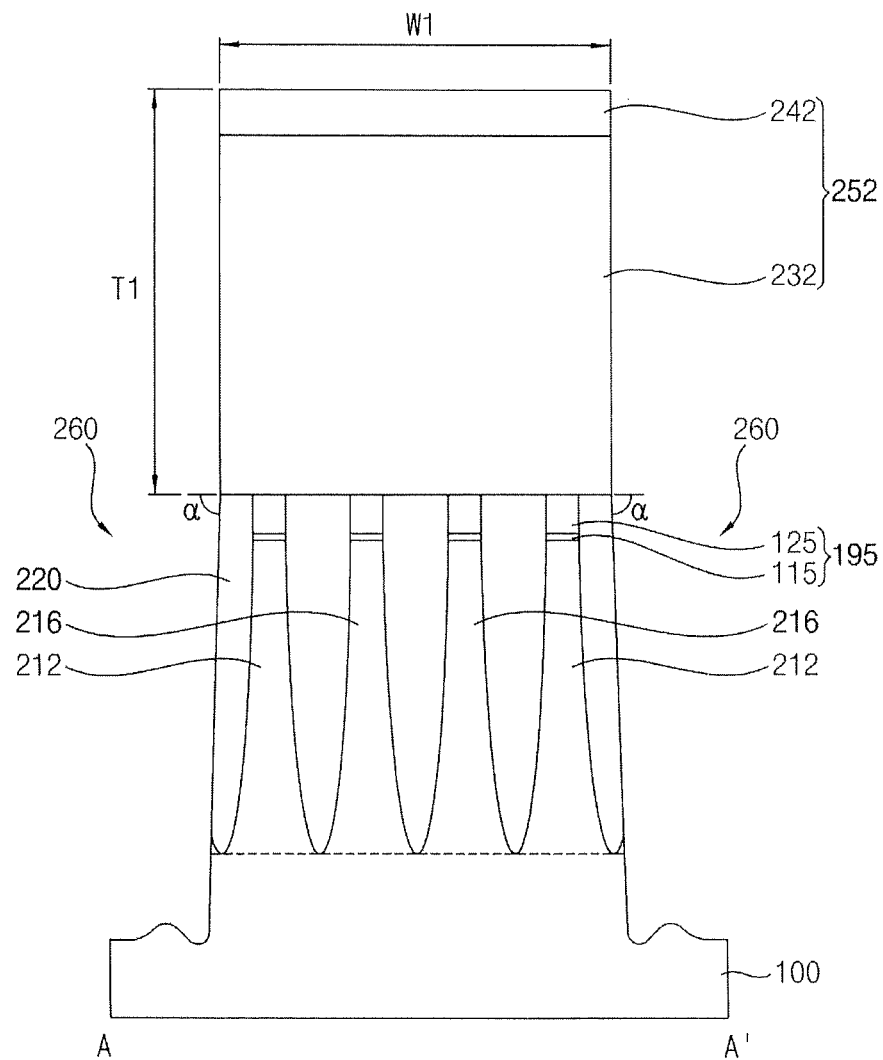

Referring to FIGS. 8 and 9, a first insulation layer 220 may be formed on the substrate 100 to cover sidewalls of the first to third active fins 212, 214 and 216 and the first etching mask 195, and the first to third active fins 212, 214 and 216 may be etched by an etching process using a second etching mask 252 to form a third recess 260.

The first insulation layer 220 may include an oxide, e.g., silicon oxide.

In an example embodiment, the second etching mask 252 may include a sixth pattern 232 and a seventh pattern 242 sequentially stacked. The sixth pattern 232 may include, e.g., ACL, SOH, etc., and the seventh pattern 242 may include a nitride, e.g., PE-SiON.

In example embodiments, the second etching mask 252 may cover the first and third active fins 212 and 216 and a portion of the second active fin 214, and further cover portions of the first insulation layer 220 adjacent thereto. Thus, a portion of the second active fin 214 and a portion of the first insulation layer 220 adjacent thereto may be removed. In example embodiments, the second active fin 214 may include first and second portions that may be disposed in the first direction and contact each other. The second etching mask 252 may cover the second portion of the second active fin 214, and thus only the first portion of the second active fin 214 may be removed in the etching process.

In example embodiments, the second etching mask 252 may cover not only the first active fin 212 but also the third active fin 216, and thus may have a first width W1 in the second direction that may not be small, for example, more than three times the width of each of the first to third active fins 212, 214 and 216. Accordingly, an aspect ratio of the second etching mask 252, that is, a ratio of a first thickness T1 with respect to the first width W1 may not be large, and thus the second etching mask 252 may not collapse.

The etching process may not be performed at 90 degrees with respect to the upper surface of the substrate 100 but may be performed at an angle of a with respect to the upper surface of the substrate 100. However, the first width W1 of the second etching mask 252 may not so small, for example, may be more than three times the width of each of the first to third active fins 212, 214 and 216, and thus a may have a high value of about 85 degrees to about 90 degrees. Thus, in the etching process, only a very small lower lateral portion of the second active fin 214 adjacent the first active fin 212, which may have, for example, a height less than one fifth of a height of the first active fin 212, may remain. The remaining lower lateral portion of the second active fin 214 may be connected to a lower lateral portion of the first active fin 212 adjacent thereto, and hereinafter, may be referred to as a first protrusion of the first active fin 212.

The etching process may be performed even on an upper portion of the substrate 100 until the second active fin 214 may be sufficiently removed, and thus a bottom of the third recess 260 may be lower than those of the first to third active fins 212, 214 and 216.

Figure 10:
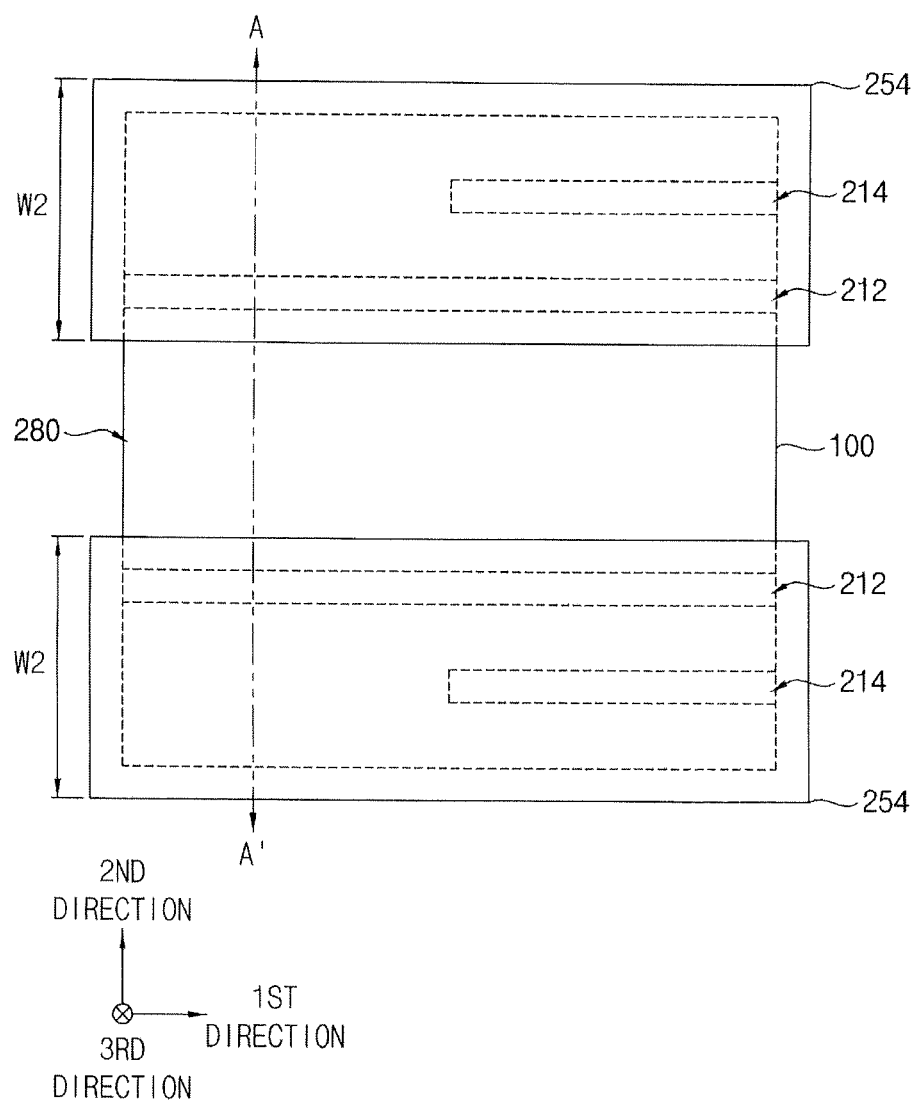
Figure 11:
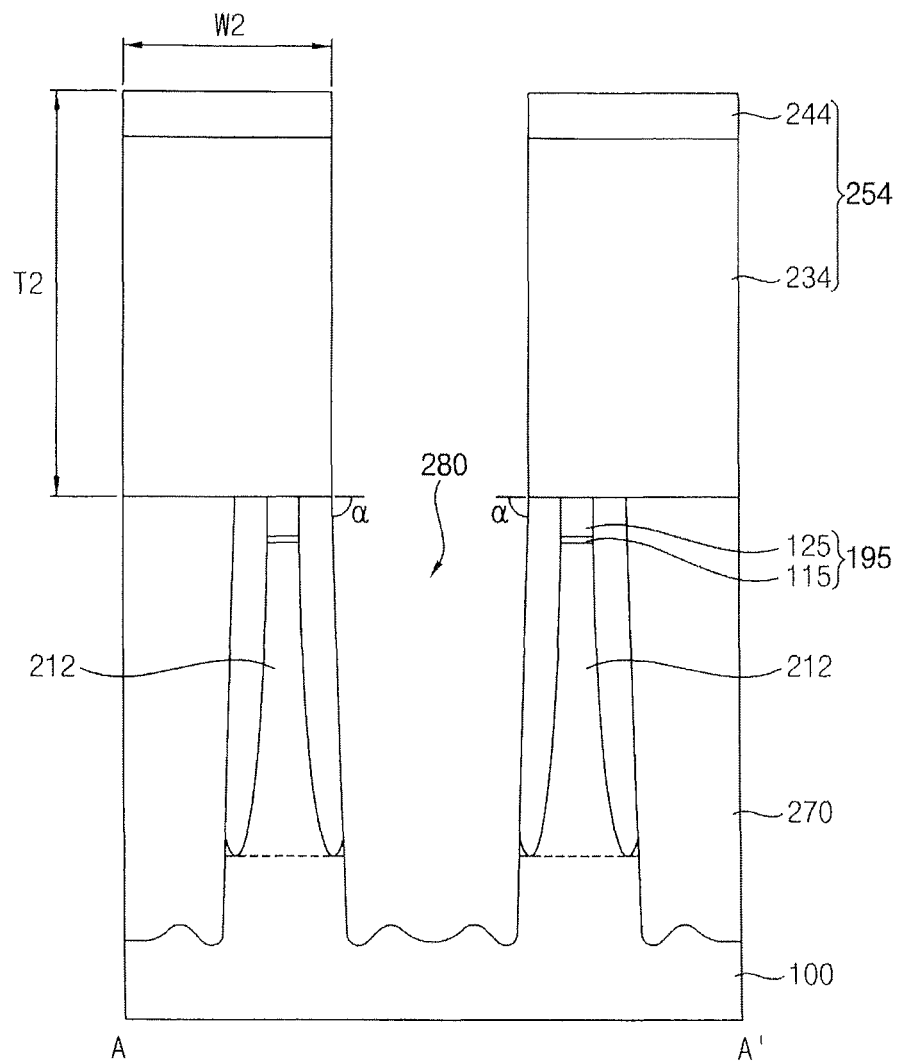

Referring to FIGS. 10 and 11, after removing the second etching mask 252, a second insulation layer 270 may be formed on the substrate 100 to fill the third recess 260, and the first etching mask 195 and the first to third active fins 212, 214 and 216 may be etched by an etching process using a third etching mask 254 to form a fourth recess 280.

The second insulation layer 270 may include an oxide, e.g., silicon oxide, and thus may be merged with the remaining first insulation layer 220 on the substrate 100.

In an example embodiment, the third mask 254 may include an eighth pattern 234 and a ninth pattern 244 sequentially stacked, which may include materials substantially the same as those of the sixth and seventh patterns 232 and 234, respectively.

In example embodiments, the third etching mask 254 may cover the first active fin 212, the second portion of the second active fin 214, and a portion of the substrate 100 from which the first portion of the second active fin 214 has been removed, and further cover portions of the second insulation layer 270 adjacent thereto. Thus, the third active fin 216 and a portion of the second insulation layer 270 adjacent thereto may be removed in the etching process.

In example embodiments, the third etching mask 254 may cover not only the first active fin 212 but also the second portion of the second active fin 214 and the portion of the substrate 100 from which the first portion of the second active fin 214 has been removed, and thus may have a second width W2 that may not be small, for example, more than three times the width of each of the first to third active fins 212, 214 and 216. Accordingly, an aspect ratio of the third etching mask 254, that is, a ratio of a second thickness T2 with respect to the second width W2 may not be large, and thus the third etching mask 254 may not collapse.

The etching process may be performed at the angle of a with respect to the upper surface of the substrate 100, which may be close to about 90 degrees. Thus, in the etching process, only a very small lower lateral portion of the third active fin 216 adjacent the first active fin 212, which may have, for example, a height less than one fifth of the height of the first active fin 212, may remain. The remaining lower lateral portion of the third active fin 216 may be connected to a lower lateral portion of the first active fin 212 adjacent thereto, and hereinafter, may be referred to as a second protrusion of the first active fin 212.

The etching process may be performed even on an upper portion of the substrate 100 until the third active fin 216 may be sufficiently removed, and thus a bottom of the fourth recess 280 may be lower than those of the first to third active fins 212, 214 and 216.

The order of the etching processes using the second and third etching masks 252 and 254 may be changed.

Figure 12:
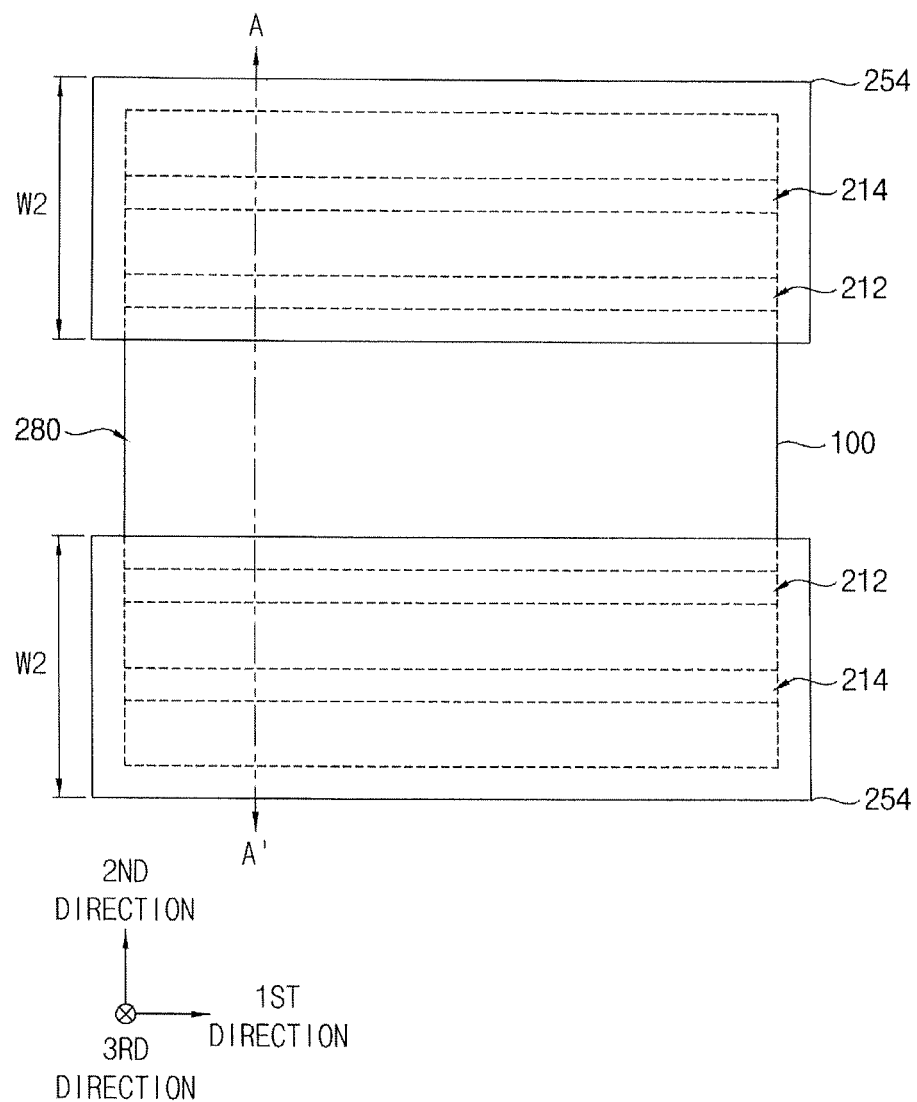
Figure 13:
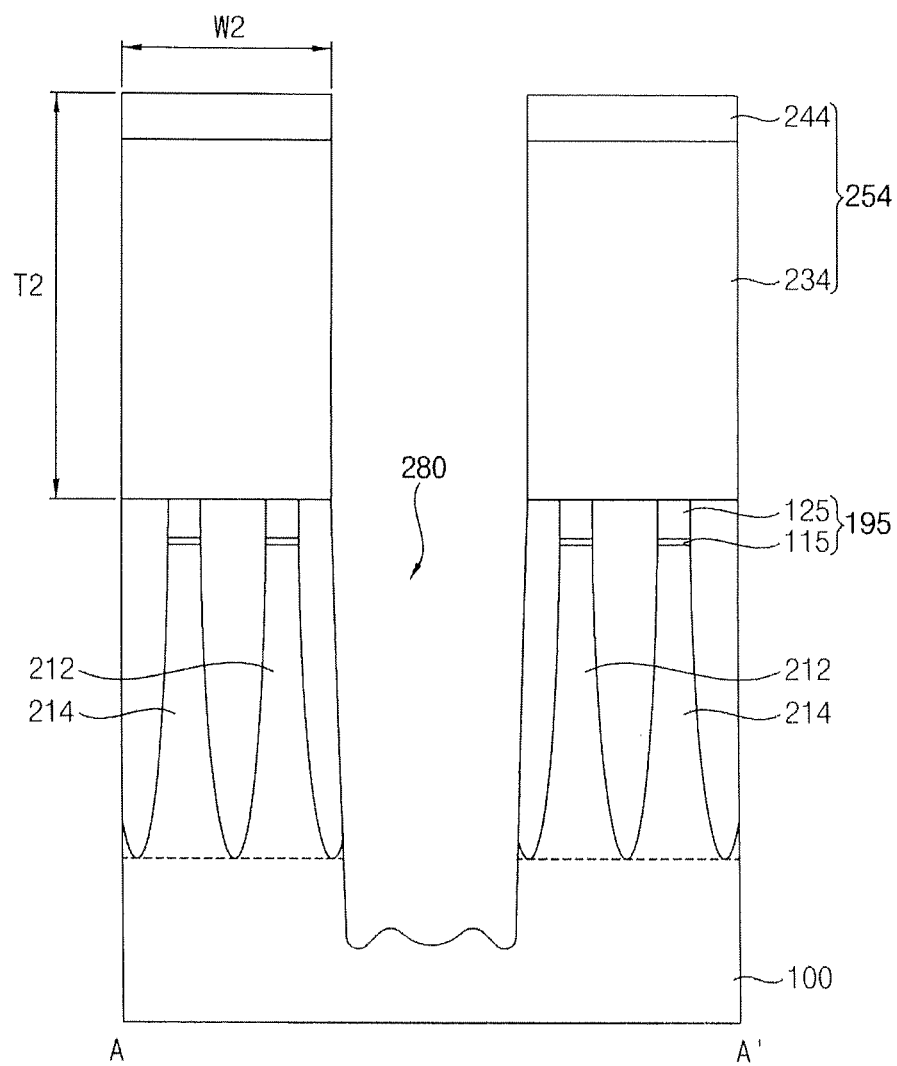

That is, referring to FIGS. 12 and 13, the etching process illustrated with reference to FIGS. 10 and 11 may be performed first.

Figure 14:
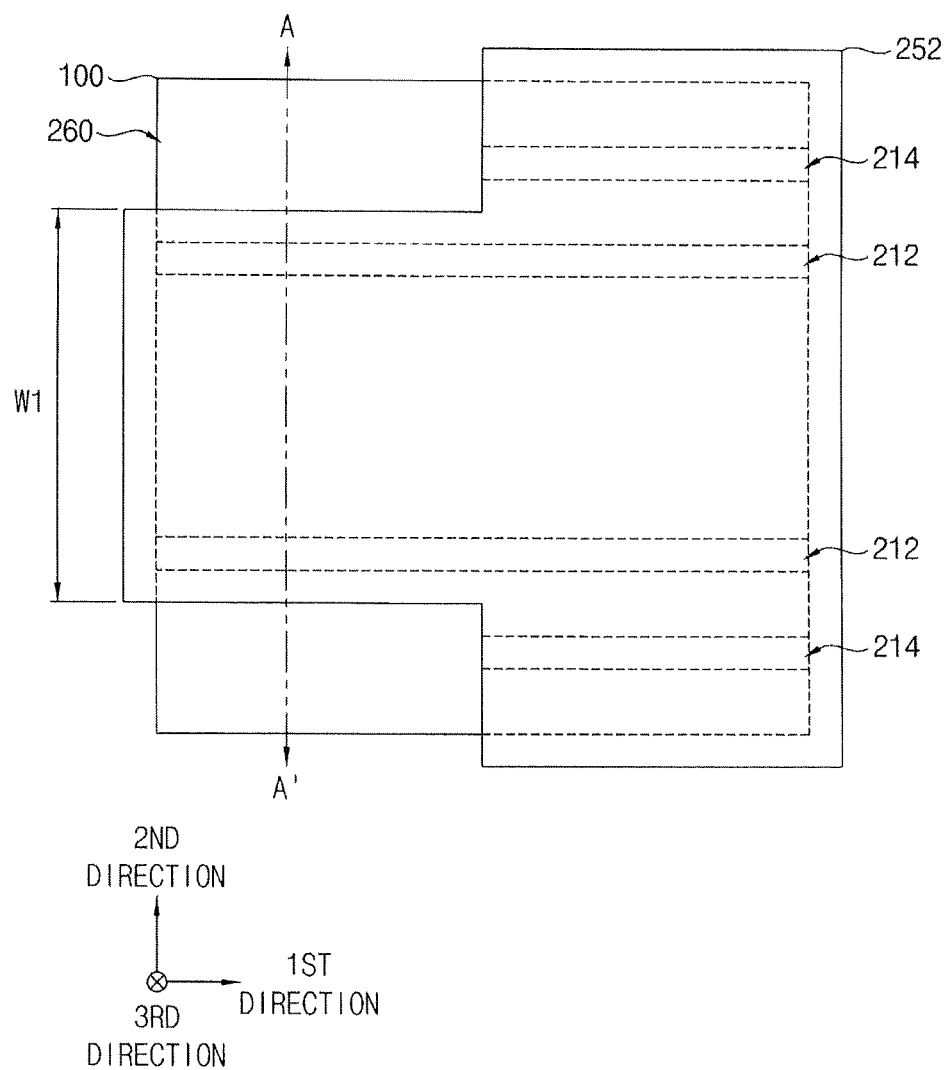
Figure 15:
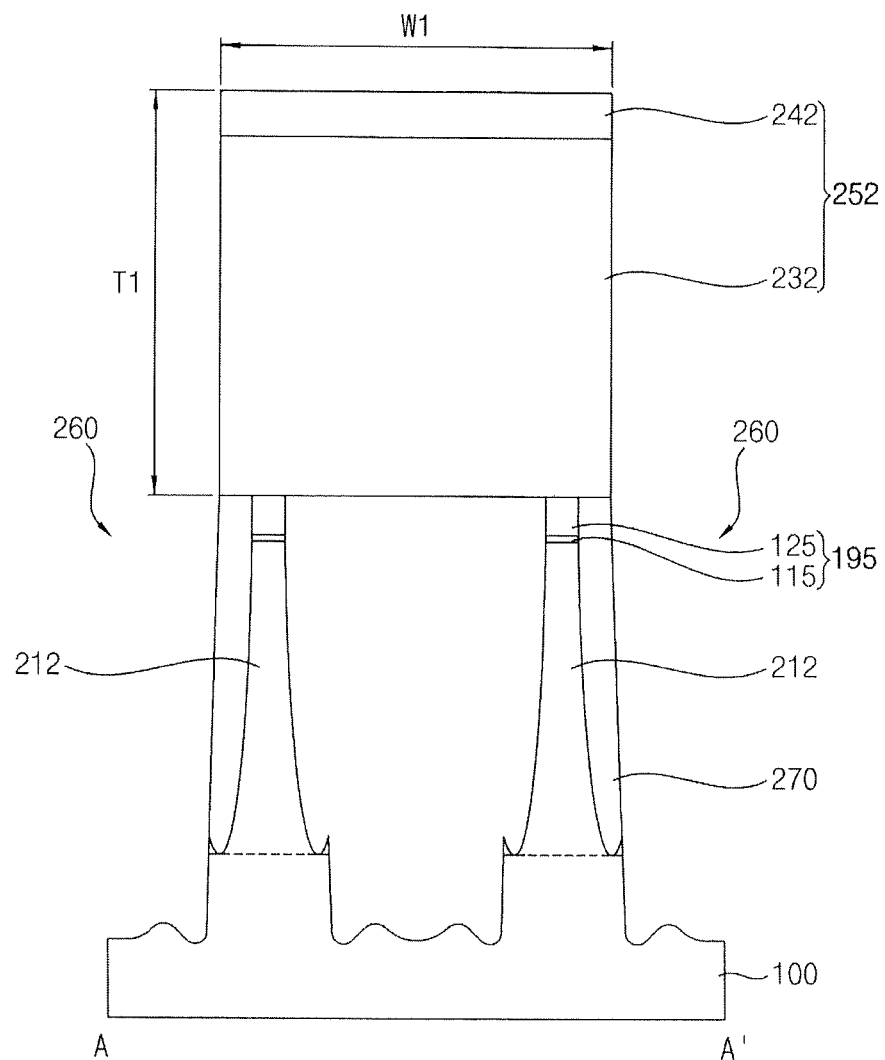

Referring to FIGS. 14 and 15, the etching process illustrated with reference to FIGS. 8 and 9 may be performed later.

Figure 16:
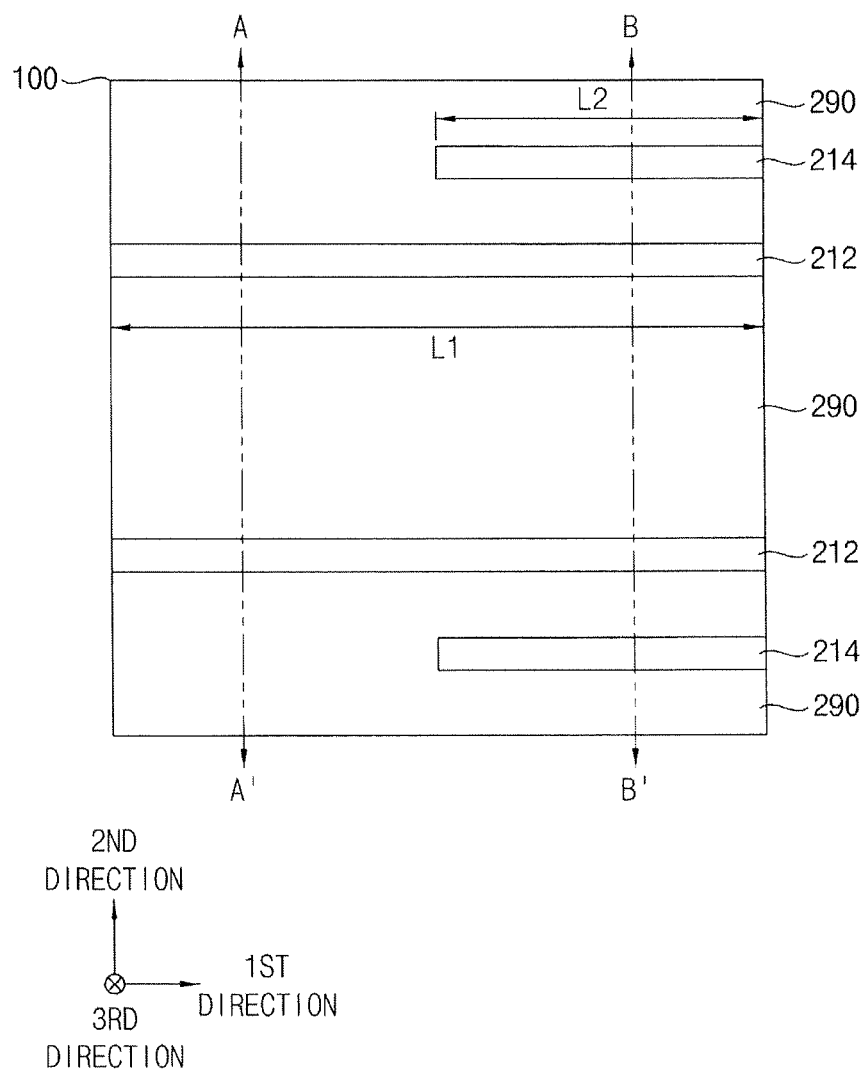

Referring to FIGS. 16 to 18, after removing the third etching mask 254, a third insulation layer 290 may be formed to fill the fourth recess 280, and an upper portion of the third insulation layer 290 may be removed until upper portions of the first and second active fins 212 and 214 may be exposed.

The third insulation layer 290 may include an oxide, e.g., silicon oxide, and thus may be merged with the remaining second insulation layer 270 on the substrate 100. Hereinafter, the third insulation layer 290 may be also referred to as an isolation pattern 290.

The first active fin 212 may be defined with a first lower active pattern 212b whose sidewall may be covered by the isolation pattern 290, and a first upper active pattern 212a not covered by the isolation pattern 290 but protruding therefrom. The second active fin 214 may be defined with a second lower active pattern 214b whose sidewall may be covered by the isolation pattern 290, and a second upper active pattern 214a not covered by the isolation pattern 290 but protruding therefrom. The second upper and lower active patterns 214a and 214b may be disposed only at the second portion of the second active fin 214.

In example embodiments, the first active fin 212 may extend in the first direction to a first length L1, and the second active fin 214 may be spaced apart from the first active fin 212 in the second direction and may extend in the first direction to a second length L2 less than the first length L1.

Figure 19:
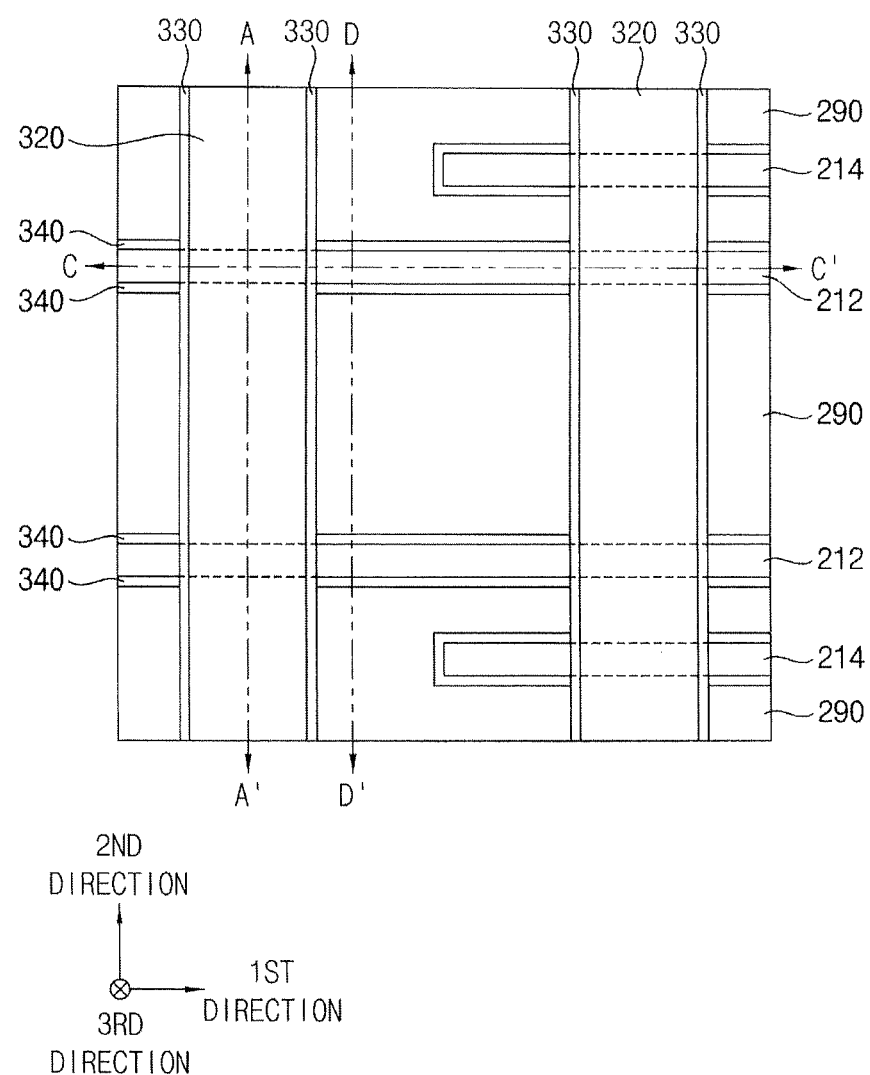
Figure 21:
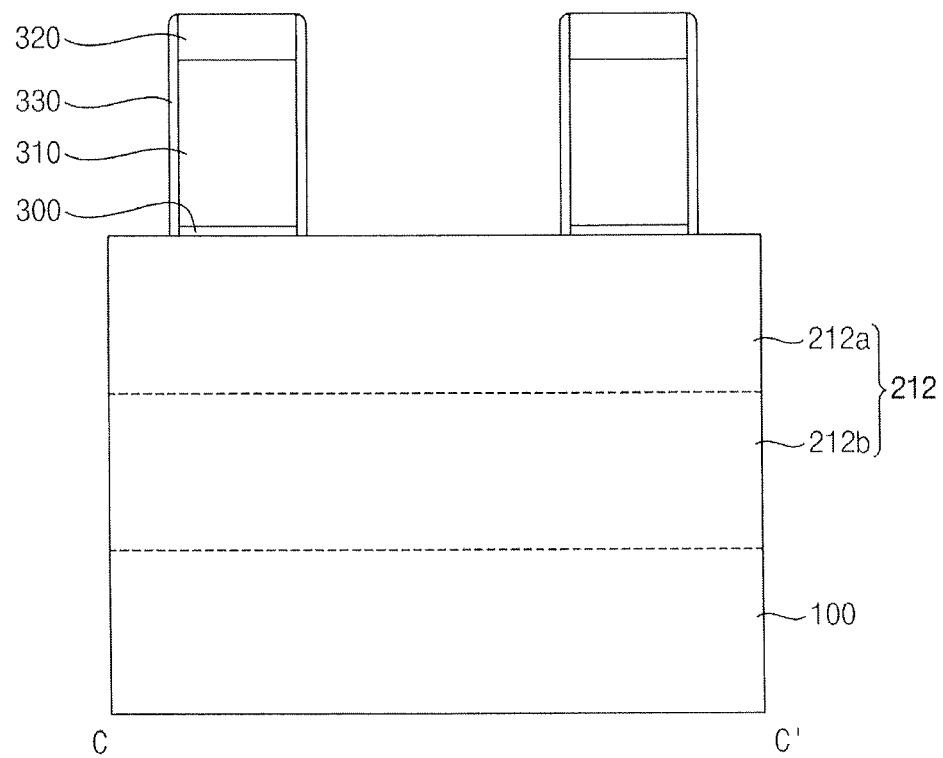
Figure 23:
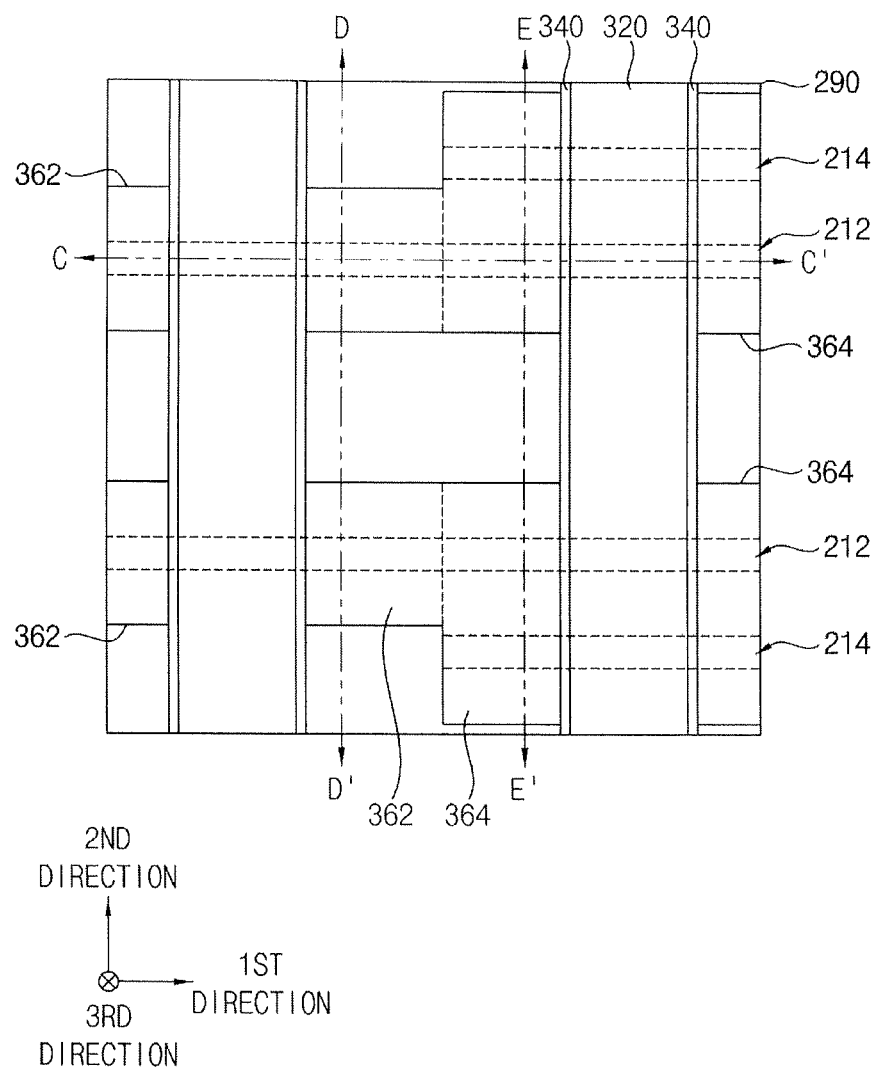
Figure 27:
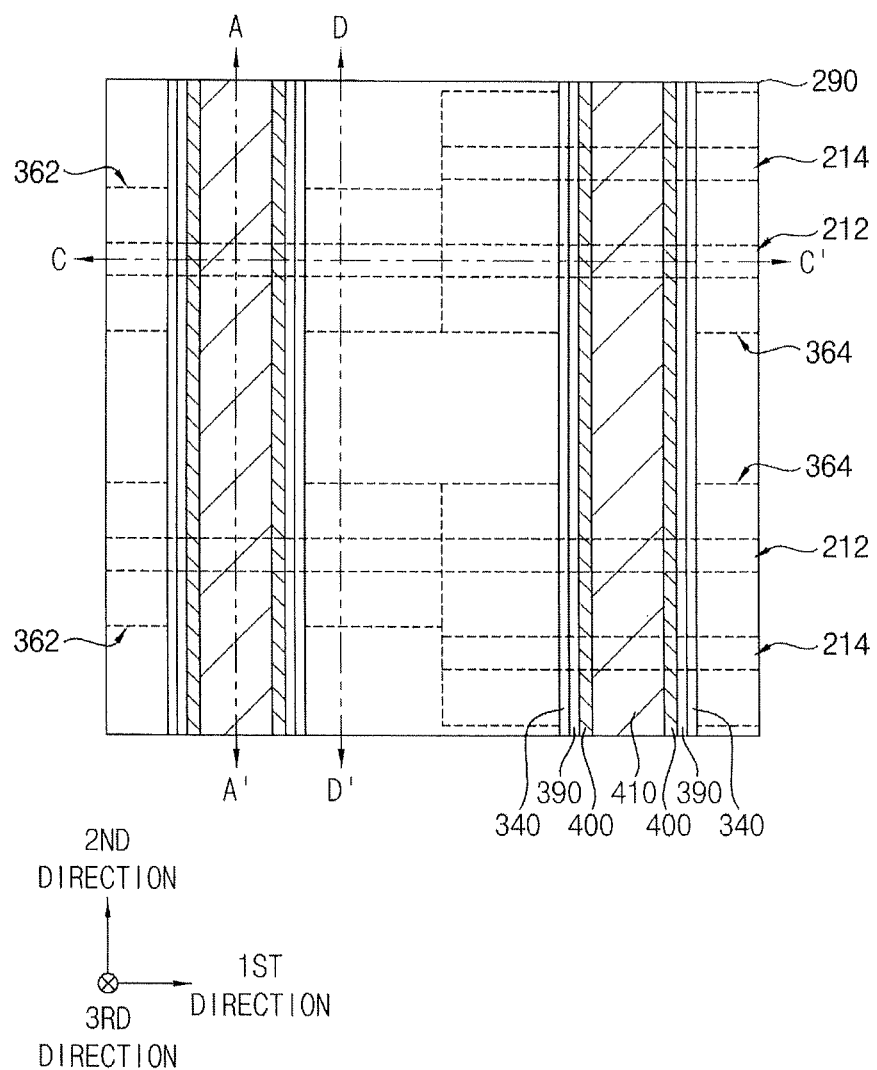
Figure 31:
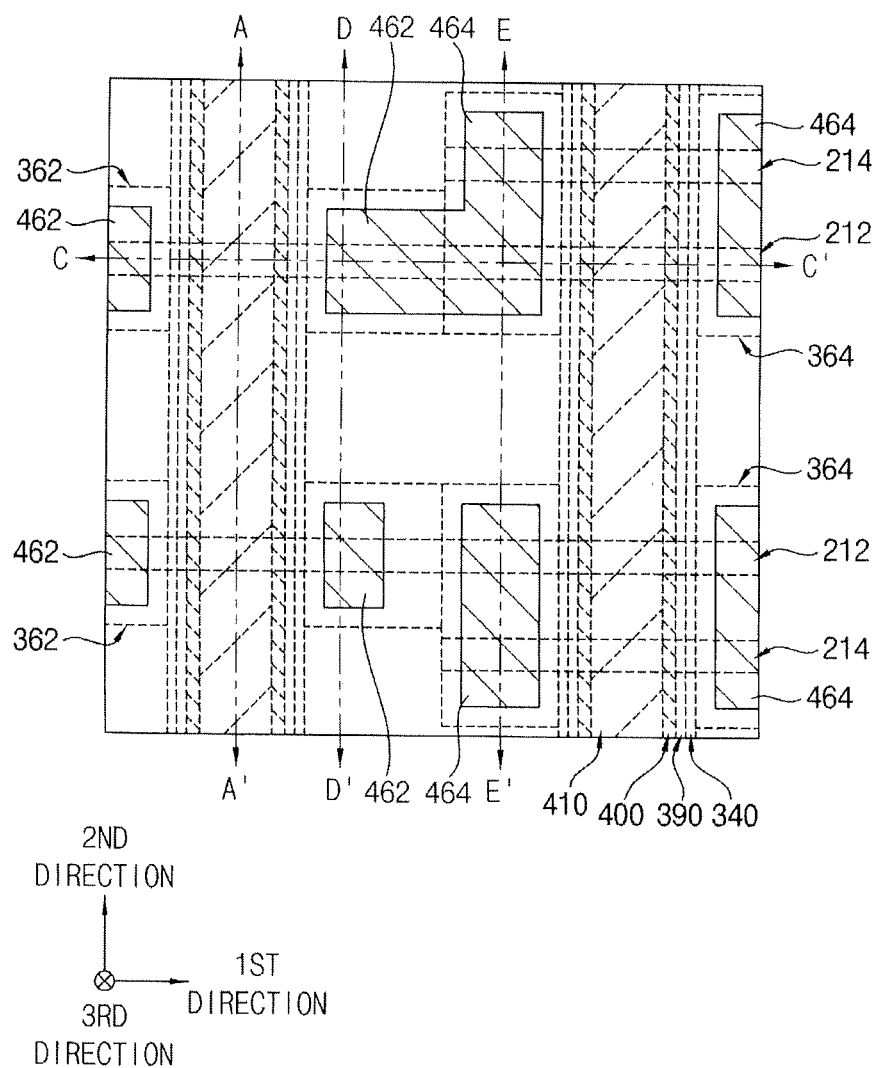

Referring to FIGS. 19 to 21, a dummy gate structure may be formed on the substrate 100.

In an embodiment, the dummy gate structure may be formed by sequentially forming a dummy gate insulation layer, a dummy gate electrode layer and a dummy gate mask layer on the first and second active fins 212 and 214 and the isolation pattern 290, patterning the dummy gate mask layer to form a dummy gate mask 320, and sequentially etching the dummy gate electrode layer and the dummy gate insulation layer using the dummy gate mask 320 as an etching mask.

Thus, the dummy gate structure may include a dummy gate insulation pattern 300, a dummy gate electrode 310 and the dummy gate mask 320 sequentially stacked on the substrate 100.

The dummy gate insulation layer may be formed by a chemical vapor deposition (CVD) process, an atomic layer deposition (ALD) process, etc. Alternatively, the dummy gate insulation layer may be formed by a thermal oxidation process, and in this case, the dummy gate insulation layer may be formed only on the first and second active fins 212 and 214.

In example embodiments, the dummy gate structure may extend in the second direction, and a plurality of dummy gate structures may be formed in the first direction. The dummy gate structure may include a first dummy gate structure extending on the first active fin 212 and a portion of the isolation pattern 290 adjacent thereto and a second dummy gate structure extending on the first and second active fins 212 and 214 and portions of the isolation pattern 290 adjacent thereto.

A gate spacer 330 may be formed on a sidewall of the dummy gate structure.

The gate spacer 330 may be formed by forming a gate spacer layer on the first and second active fins 212 and 214 and the isolation pattern 290 to cover the dummy gate structure, and anisotropically etching the gate spacer layer. The gate spacer 330 may be formed on each of opposite sidewalls of the dummy gate structure in the first direction, and a fin spacer 340 may be also formed on each of opposite sidewalls of the first and second upper active patterns 212a and 214a in the second direction.

Referring to FIGS. 23 to 26, upper portions of the first and second active fins 212 and 214 adjacent the first and second dummy gate structures may be etched to form fifth recesses 350, and first and second source/drain layers 362 and 364 may be formed to fill the fifth recesses 350.

In an embodiment, a dry etching process may be performed using the first and second dummy gate structures and the gate spacer 330 as an etching mask to remove the upper portions of the first and second active fins 212 and 214 so that the fifth recesses 350 may be formed. When the fifth recesses 350 are formed, the fin spacer 340 adjacent the first and second active fins 212 and 214 may be mostly removed, however, a lower portion of the fin spacer 340 may remain.

In FIG. 24, only upper portions of the first and second active patterns 212a and 214a in the first and second active fins 212 and 214 are removed to form the fifth recesses 350, and thus bottoms of the fifth recesses 350 are higher than upper surfaces of the first and second lower active patterns 212b and 214b, however, the inventive concepts may not be limited thereto.

In example embodiments, the first and second source/drain layers 362 and 364 may be formed by a selective epitaxial growth (SEG) process using upper surfaces of the first and second active fins 212 and 214 exposed by the fifth recesses 350 as a seed.

In example embodiments, as the SEG process is performed, a single crystalline silicon-germanium layer may be formed to serve as each of the first and second source/drain layers 362 and 364. In an embodiment, a p-type impurity source gas may be also used to form a single crystalline silicon-germanium layer doped with p-type impurities serving as each of the first and second source/drain layers 362 and 364. Each of the first and second source/drain layers 362 and 364 may serve as a source/drain region of a positive-channel metal oxide semiconductor (PMOS) transistor.

Each of the first and second source/drain layers 362 and 364 may grow in a vertical direction and in a horizontal direction to fill the fifth recess 350, and may contact a sidewall of the gate spacer 330.

In example embodiments, the source/drain layers growing on the respective first and second active fins 212 and 214 may be merged with each other, which may be referred to as the second source/drain layer 364, hereinafter, while the source/drain layer growing only on the first active fin 212 may be referred to as the first source/drain layer 362.

In an embodiment, the first and second source/drain layers 362 and 364 serving as the source/drain region of the PMOS transistor have been illustrated, however, the inventive concepts may not be limited thereto, and each of the first and second source/drain layers 362 and 364 may also serve as a source/drain region of a negative-channel metal oxide semiconductor (NMOS) transistor.

In an embodiment, a single crystalline silicon carbide layer or a single crystalline silicon layer may be formed as each of the first and second source/drain layers 362 and 364. In the SEG process, an n-type impurity source gas may be also used to form a single crystalline silicon carbide layer doped with n-type impurities or a single crystalline silicon layer doped with n-type impurities.

Referring to FIGS. 27 to 30, a fourth insulation layer 370 may be formed on the substrate 100 to cover the dummy gate structure, the gate spacer 330, the fin spacer 340, and the first and second source/drain layers 362 and 364, and may be planarized until the dummy gate electrode 310 of the dummy gate structure may be exposed.

In the planarization process, the dummy gate mask 320 may be also removed, and an upper surface of the gate spacer 330 may be removed. A space between the second source/drain layer 364 and the isolation pattern 290 may not be filled with the fourth insulation layer 370, and thus an air gap (375, refer to FIG. 35) may be formed.

The exposed dummy gate electrode 310 and the dummy gate insulation pattern 300 thereunder may be removed to form a first opening exposing an inner sidewall of the gate spacer 330 and upper surfaces of the first and second active fins 212 and 214, and a gate structure 420 may be formed to fill the first opening.

The gate structure 420 may be formed, for example, by following processes.

After performing a thermal oxidation process on the exposed upper surfaces of the first and second active fins 212 and 214 exposed by the first opening to form an interface pattern 380, a gate insulation layer and a work function control layer may be sequentially formed on the interface pattern 380, the isolation pattern 290, the gate spacer 330, and the fourth insulation layer 370, and a gate electrode layer may be formed on the work function control layer to sufficiently fill a remaining portion of the first opening.

The interface pattern 380 may be formed, by a CVD process or an ALD process. In an embodiment, the interface pattern 380 may be formed on the upper surfaces of the first and second active fins 212 and 214 on the upper surface of the isolation pattern 290 and the inner sidewall of the gate spacer 330.

The gate electrode layer, the work function control layer, and the gate insulation layer may be planarized until an upper surface of the fourth insulation layer 370 may be exposed to form a gate insulation pattern 390 and a work function control pattern 400 sequentially stacked on upper surfaces of the interface pattern 380 and the isolation pattern 290 and the inner sidewall of the gate spacer 330, and a gate electrode 410 filling the remaining portion of the first opening on the work function control pattern 400.

The interface pattern 380, the gate insulation pattern 390, the work function control pattern 400 and the gate electrode 410 sequentially stacked may form the gate structure 420, and the gate structure 420 together with each of the first and second source/drain layers 362 and 364 may form a PMOS transistor or an NMOS transistor according to the conductivity type of the first and second source/drain layers 362 and 364.

Hereinafter, one or ones of the gate structures 420 extending in the second direction on the first active fin 212 may be referred to as a first gate structure, and one or ones of the gate structures 420 extending in the second direction on the first and second active fins 212 and 214 may be referred to as a second gate structure.

Referring to FIGS. 31 to 35, a capping layer 430 and an insulating interlayer 440 may be sequentially formed on the fourth insulation layer 370, the gate structure 420, and the gate spacer 330, and first and second contact plugs 462 and 464 may be formed through the fourth insulation layer 440, the capping layer 430, and the insulating interlayer 440 to contact upper surfaces of the first and second source/drain layers 362 and 364, respectively.

The first and second contact plugs 462 and 464 may be formed, for example, by following processes.

Second and third openings may be formed through the fourth insulation layer 370, the capping layer 430 and the insulating interlayer 440 to expose the upper surfaces of the first and second source/drain layers 362 and 364, respectively, a first metal layer may be formed on the exposed upper surfaces of the first and second source/drain layers 362 and 364, sidewalls of the second and third openings, and the upper surface of the insulating interlayer 440, and a heat treatment process may be performed thereon to form a metal silicide pattern 450 on each of the first and second source/drain layers 362 and 364.

A first barrier layer may be formed on an upper surface of the metal silicide pattern 450, the sidewalls of the second and third openings, and the upper surface of the insulating interlayer 440, a second metal layer may be formed on the first barrier layer to fill the second and third openings, and the second metal layer and the first barrier layer may be planarized until the upper surface of the insulating interlayer 440 may be exposed.

Thus, the first and second contact plugs 462 and 464 may be formed on the metal silicide pattern 450 to fill the second and third openings, respectively. Each of the first and second contact plugs 462 and 464 may include a second metal pattern and a first barrier pattern covering a lower surface and a sidewall of the second metal pattern.

Each of the first contact plugs 462 may extend in the second direction to a given length, and a plurality of first contact plugs 462 may be formed in the first direction. Each of the second contact plugs 464 may extend in the second direction to a given length, and a plurality of second contact plugs 464 may be formed in the first direction.

A third contact plug contacting an upper surface of the gate structure 420 and wirings electrically connected to the first and second contact plugs 462 and 464 and the third contact plug may be further formed to complete manufacturing the semiconductor device.

In the method of manufacturing the semiconductor device, after forming the first to third active fins 212, 214 and 216 by a quadruple patterning technology (QPT) method, the etching processes may be performed to remove a portion of the second active fin 214 and the third active fin 216, respectively, using the second and third etching masks 252 and 254, respectively. Each of the second and third etching masks 252 and 254 may not have a large aspect ratio, and thus may not collapse during the etching processes. Each of the second and third etching masks 252 and 254 may not have a small width, and thus the underlying layers may be etched using the second and third etching masks 252 and 254 to include sidewalls having angles with respect to the upper surface of the substrate 100 close to a right angle. Accordingly, the second and third active fins 214 and 216 adjacent the first active fin 212 may be easily removed, and the first and second protrusions of the first active fin 212 may have substantially small sizes.

In the semiconductor device, the first active fin 212 may extend in the first direction to the first length L1, while the second active fin 214 may extend in the first direction to the second length L2 less than the first length L1. The first active fin 212 may include a first sidewall opposite the second active fin 214, and a second sidewall opposite the first sidewall. The first protrusion connected to a lower portion of the first sidewall of the first active fin 212 may extend in the first direction only at an area of the first active fin 212 not adjacent the second active fin 214 in the second direction, while the second protrusion connected to a lower portion of the second sidewall of the first active fin 212 may extend in the first direction to the first length L1. The second active fin 214 may include a third sidewall opposite the first active fin 212, and a fourth sidewall opposite the third sidewall. The second active fin 214 may include a third protrusion connected to a lower portion of the fourth sidewall.

A distance between the first active fins 212 may be greater than a distance between the first and second active fins 212 and 214. A lower surface of the isolation pattern 290 partially covering the sidewalls of the first and second active fins 212 and 214 on the substrate 100 may be lower at a portion thereof between the first active fins 212 than a portion thereof between the first and second active fins 212 and 214.

The semiconductor device may include the first gate structure on the first active fin 212 and the first source/drain layer 362 on a portion of the first active fin 212 adjacent the first gate structure, and a transistor including the first gate structure and the first source/drain layer 362 may be formed on one active fin. The semiconductor may further include the second gate structure on the first and second active fins 212 and 214 and the second source/drain layer 364 on both portions of the first and second active fins 212 and 214 adjacent the second gate structure, and a transistor including the second gate structure and the second source/drain layer 364 may be formed on a plurality of active fins.

In an embodiment, the semiconductor device may include the transistor on the one active fin as well as the transistor on the plurality of active fins. Thus, the integration degree of the semiconductor device may be enhanced, and the total area of the semiconductor device may be reduced.

The concepts of the method of manufacturing the semiconductor device illustrated with reference to FIGS. 1 to 35 may be extended as follows.

FIGS. 36 to 38 are plan views illustrating a method of manufacturing a semiconductor device in accordance with example embodiments.

Referring to FIG. 36, a fifth active fin 14, a fourth active fin 12, and a sixth active fin 16 each of which may extend in the first direction on the substrate 100 may be formed to be spaced apart from each other in the second direction in this order.

Referring to FIG. 37, an etching process may be performed using a fourth etching mask 22 to etch the fifth, fourth, and sixth active fins 14, 12 and 16.

Particularly, the fourth etching mask 22 may cover the fourth and sixth active fins 12 and 16, and thus the fifth active fin 14 may be removed in the etching process. The fourth etching mask 22 may cover the fourth active fin 12 and the sixth active fin 16, and thus may have a third width W3 that may not too small, for example, more than three times a width of each of the fourth to sixth active fins 12, 14 and 16. Accordingly, the fourth etching mask 22 may have an aspect ratio that may not be large, and thus may not collapse in the etching process. The etching process may be performed at an angle of about 85 degrees to about 90 degrees with respect to the upper surface of the substrate 100, and thus only a very small portion of a lower lateral portion of the fifth active fin 14 adjacent the fourth active fin 12, which may have, for example, a height less than one fifth of a height of the fourth active fin 12, may remain as a protrusion of the fourth active fin 12.

Referring to FIG. 38, an etching process may be performed using a fifth etching mask 24 to etch the fifth, fourth, and sixth active fins 14, 12 and 16.

In an embodiment, the fifth etching mask 24 may cover the fourth active fin 12 and a portion of the substrate 100 from which the fifth active fin 14 has been removed, and thus the sixth active fin 16 may be removed in the etching process. The fifth etching mask 24 may cover the fourth active fin 12 and the portion of the substrate 100 from which the fifth active fin 14 has been removed, and thus may have a fourth width W4 that may not too small, for example, more than three times the width of each of the fourth to sixth active fins 12, 14 and 16. Accordingly, the fifth etching mask 24 may have an aspect ratio that may not be large, and thus may not collapse in the etching process. The etching process may be performed at an angle of about 85 degrees to about 90 degrees with respect to the upper surface of the substrate 100, and thus only a very small portion of a lower lateral portion of the sixth active fin 16 adjacent the fourth active fin 12, which may have, for example, a height less than one fifth of the height of the fourth active fin 12, may remain as a protrusion of the fourth active fin 12.

As illustrated above, removing a plurality of active fins except for one active fin may be easily implemented by performing an etching process twice, each of which may use an etching mask covering the one active fin and another active fin adjacent thereto. However, source/drain layers each of which may be formed by a SEG process only on one active fin may have characteristic distributions that may be greater than those of source/drain layers each of which may be formed by a SEG process commonly on a plurality of active fins, and thus the circuitry including the source/drain layers each being only on the one active fin may have deteriorated characteristics.

A method of preventing or reducing the deterioration of the circuitry is illustrated with reference to FIG. 39.

Figure 39:
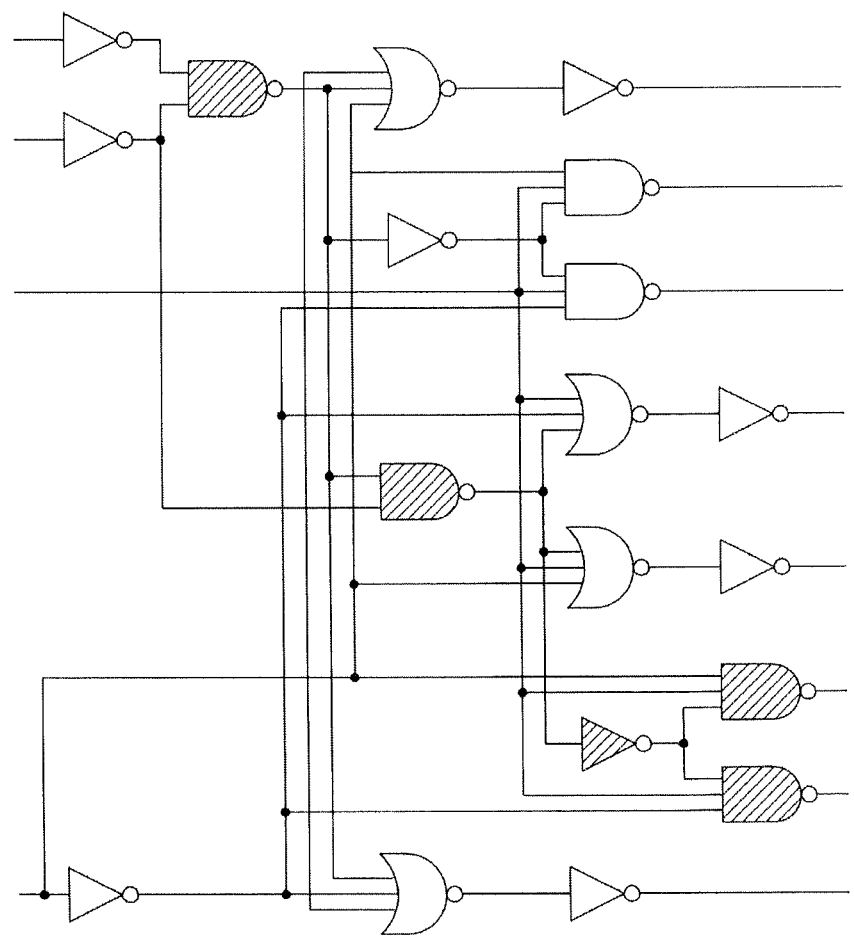
FIG. 39 is a circuit diagram illustrating a method of manufacturing a semiconductor device in accordance with example embodiments.

FIG. 39 is a circuit diagram illustrating a method of manufacturing a semiconductor device in accordance with example embodiments.

Referring to FIG. 39, after designing a circuit of the semiconductor device, a critical path may be determined by a timing analysis on the circuit.

In example embodiments, the timing analysis may be performed by an electronic design automation (EDA) tool. The critical path may be a path having a maximum delay between an input and an output in the circuit. That is, if the speed of the total circuit is influenced when speeds of specific elements are delayed, a path including the specific elements may be determined as the critical path.

Figure 40:
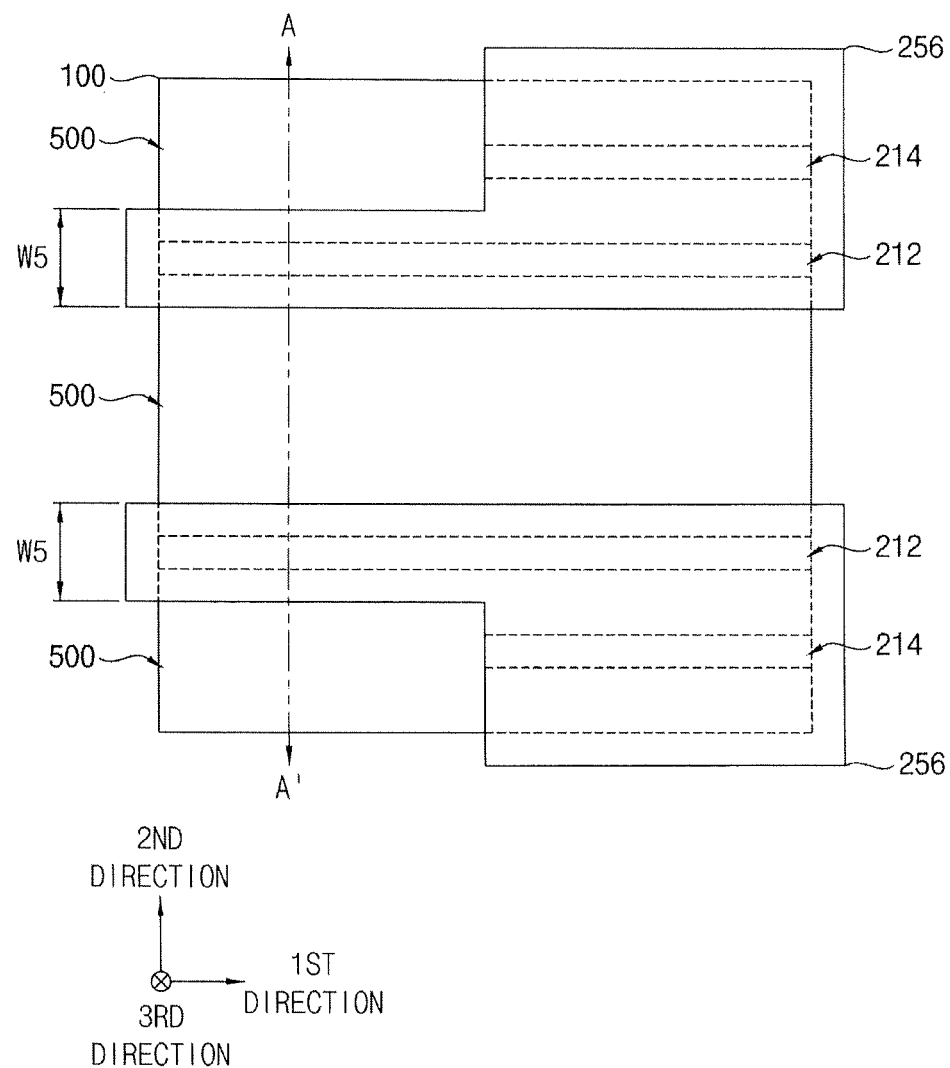
FIGS. 40 and 41 are a plan view and a cross-sectional view illustrating a method of manufacturing a semiconductor device in accordance with Comparative Example.

In FIG. 40, elements included in the critical path are shown by hatching.

The semiconductor device may be formed on a substrate according to the designed circuit. Particularly, each of first transistors included in the critical path may be formed on a plurality of active fins, while at least one of second transistors not included in the critical path may be formed only on one active fin.

That is, a source/drain layer of each of the first transistors may be formed commonly on the plurality of active fins, while a source/drain layer of the at least one of the second transistors may be formed only on the one active fin.

Accordingly, in the semiconductor device, each of elements that may not influence the operation of the circuit may be formed on one active fin. Thus, the deterioration of circuit may be prevented or reduced, and the semiconductor device may have a high integration degree and a small area.

Figure 41:
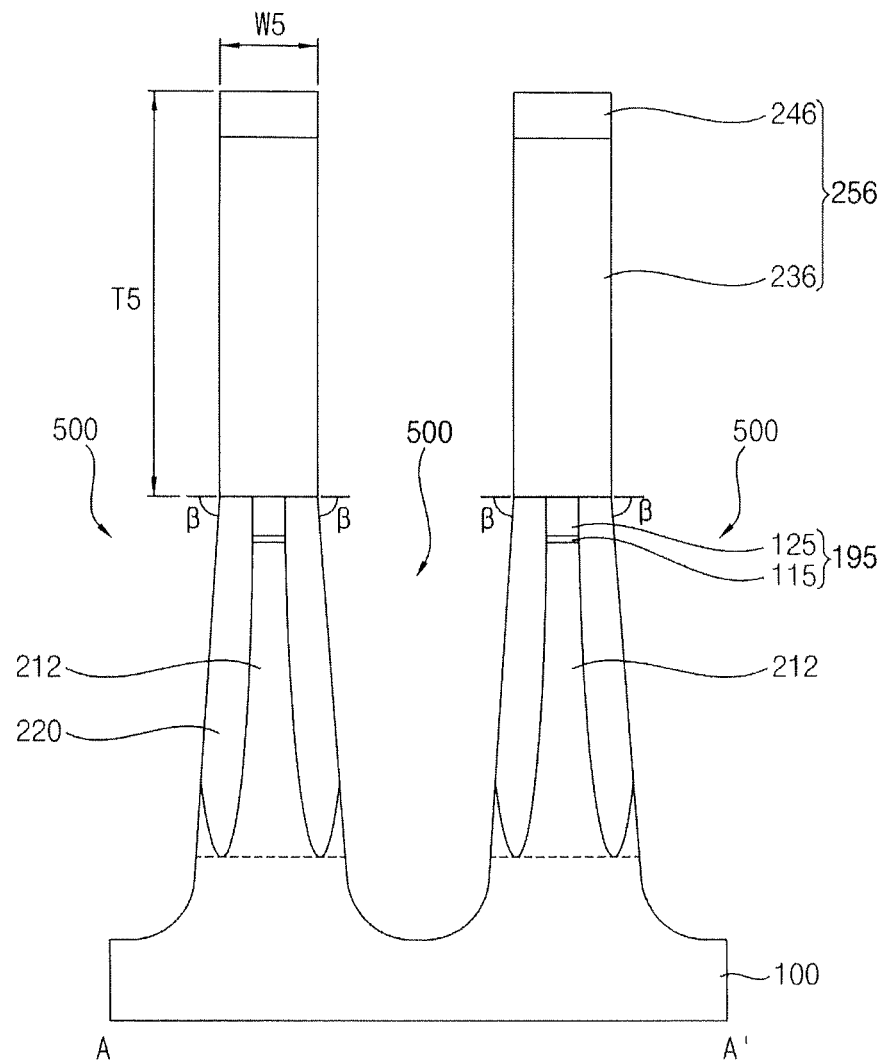

FIGS. 40 and 41 are a plan view and a cross-sectional view, respectively, illustrating a method of manufacturing a semiconductor device in accordance with Comparative Example.

Referring to FIGS. 40 and 41, an etching process may be performed using a sixth etching mask 256 to etch the first etching mask 195 and the first to third active fins 212, 214 and 216 so that a sixth recess 500 may be formed.

The sixth etching mask 256 may include a tenth pattern 236 and an eleventh pattern 246 sequentially stacked. The tenth and eleventh patterns 236 and 246 may include materials substantially the same as those of the sixth and seventh patterns 232 and 242, respectively.

The sixth etching mask 256 may cover the first active fin 212 and a portion of the second active fin 214, and further cover portions of the first insulation layer adjacent thereto. Thus, a portion of the second active fin 214, the third active fin 216, and portions of the first insulation layer 220 adjacent thereto may be removed in the etching process.

The sixth etching mask 256 may cover only the first active fin 212 at least an area of the substrate 100, and thus may have a fifth width W5 in the second direction, which may be small. Accordingly, an aspect ratio of the sixth etching mask 256, i.e., a ratio of a fifth thickness T5 with respect to the fifth width W5 may be large, and may collapse in the etching process.

Even if the sixth etching mask 256 may not collapse in the etching process, the etching process may be performed at an angle of β with respect to the upper surface of the substrate 100, which may not be close to 90 degrees. The sixth etching mask 256 may have the small fifth width W5, and thus β may be less than about 85 degrees.

Accordingly, in the etching process, a protrusion having quite a high top surface may remain at a lower lateral portion of the second active fin 214 or the third active fin 216 adjacent the first active fin 212, and the top surface of the protrusion may have a height more than about half a height of a top surface of the first active fin 212. In this case, the protrusion may not be covered by the isolation pattern 290, and thus a source/drain layer may be formed even on the protrusion during a subsequent formation process of the source/drain layer to cause problems, e.g., electric short circuit.

FIGS. 42 to 48 are plan views and cross-sectional views illustrating stages of a method of manufacturing a semiconductor device in accordance with example embodiments.

Figure 42:
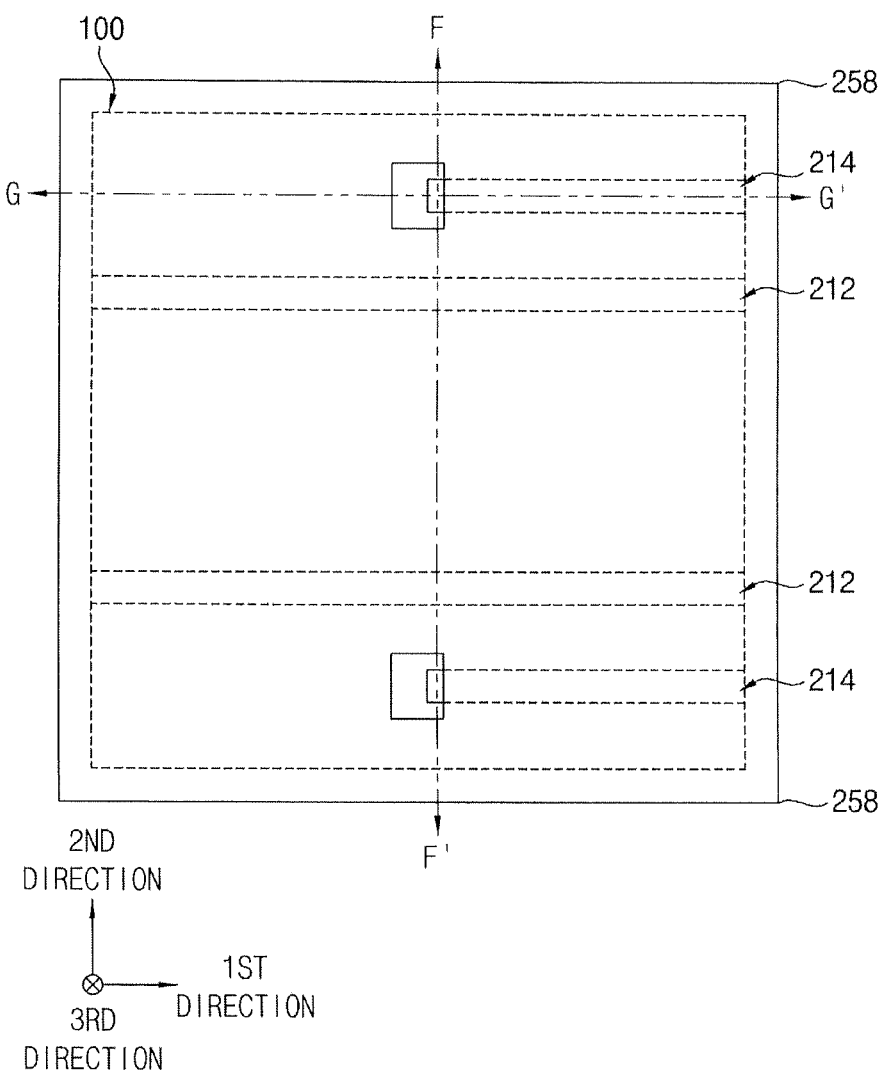
Figure 43:
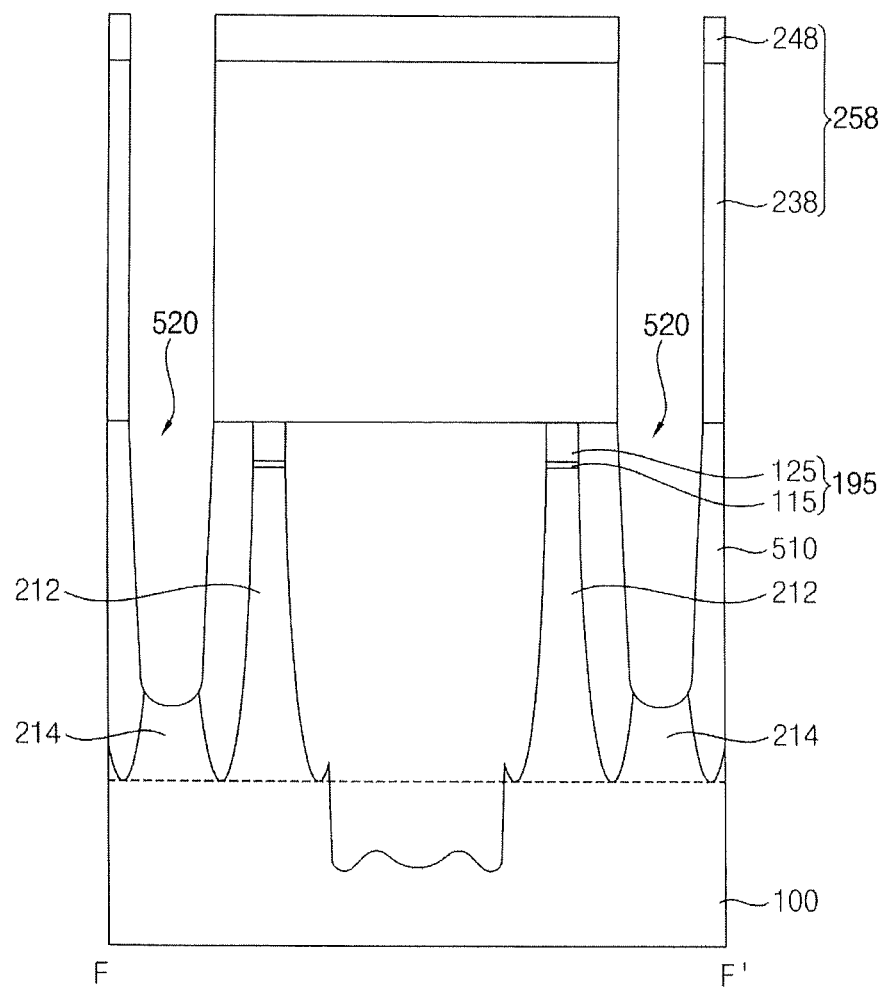
Figure 44:
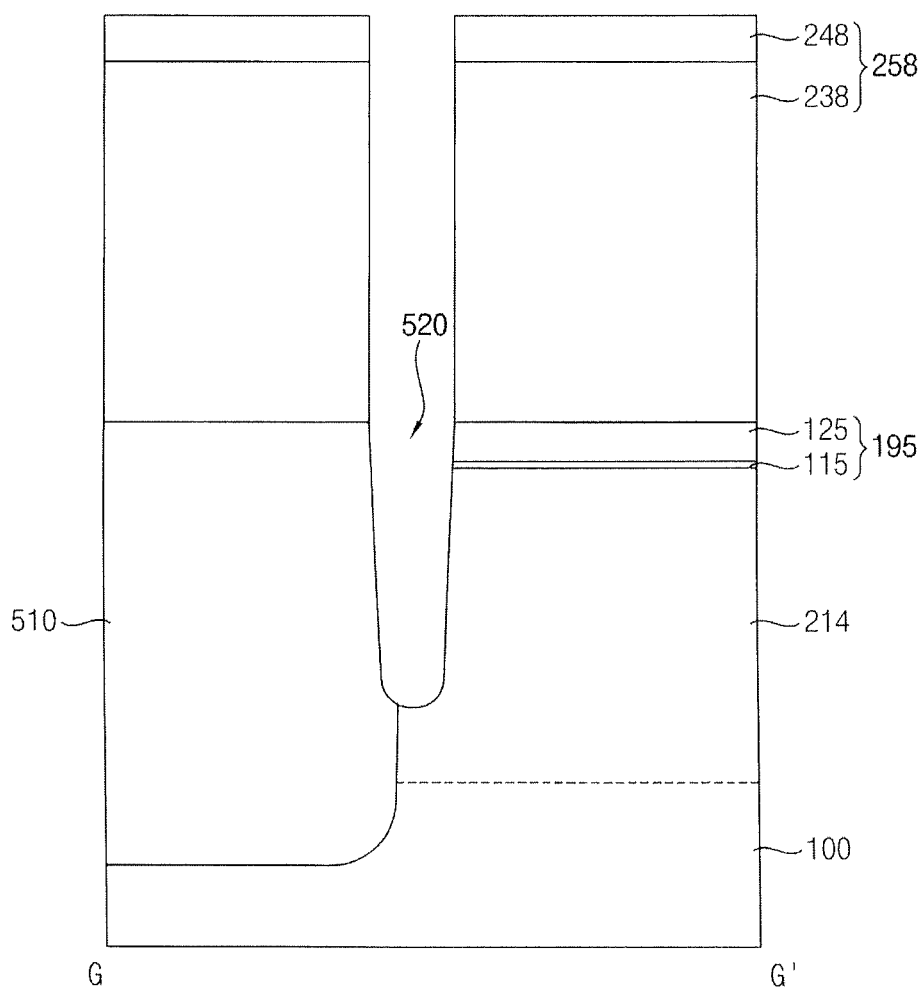
Figure 45:
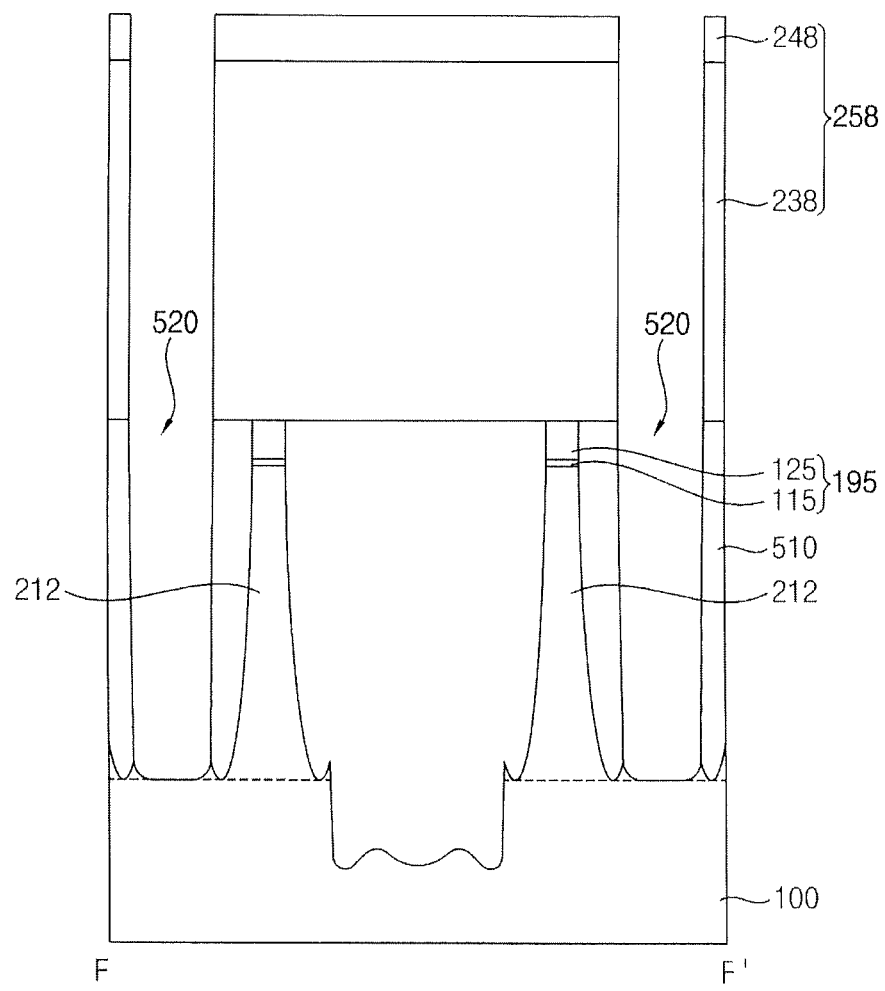
Figure 46:
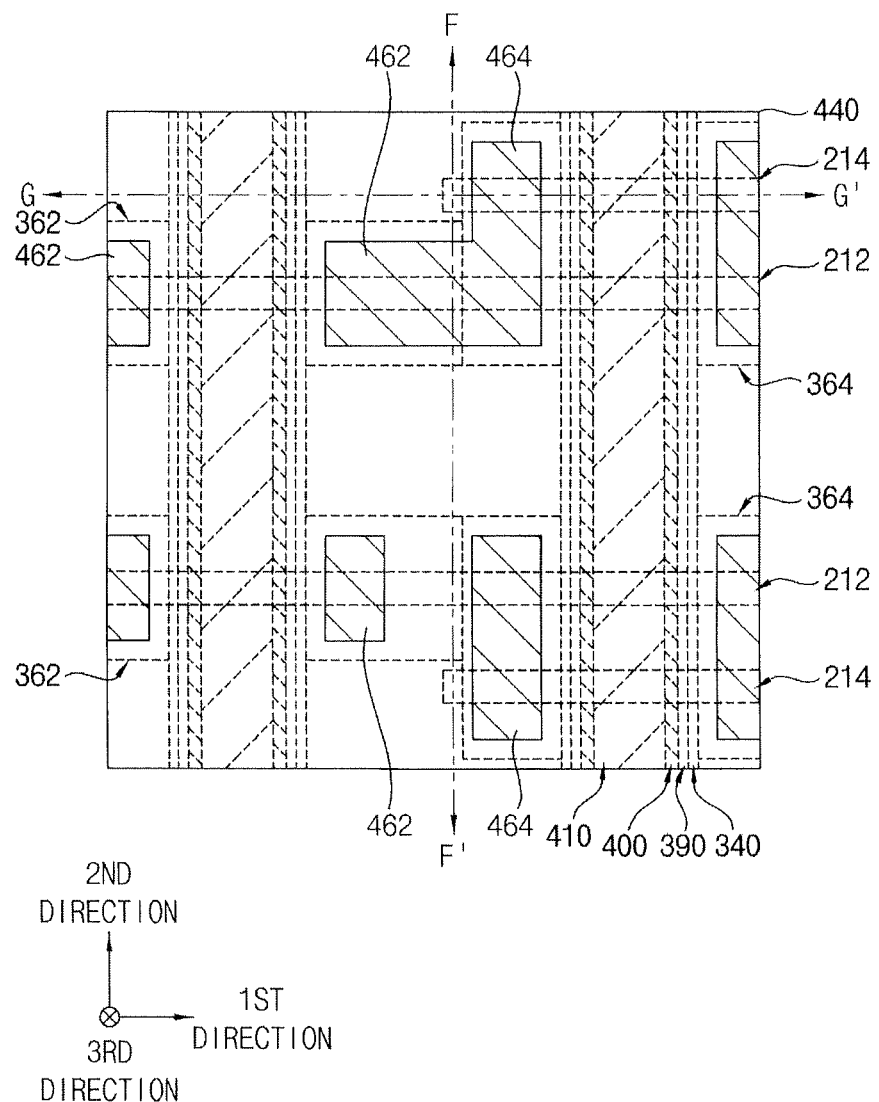
Figure 48:
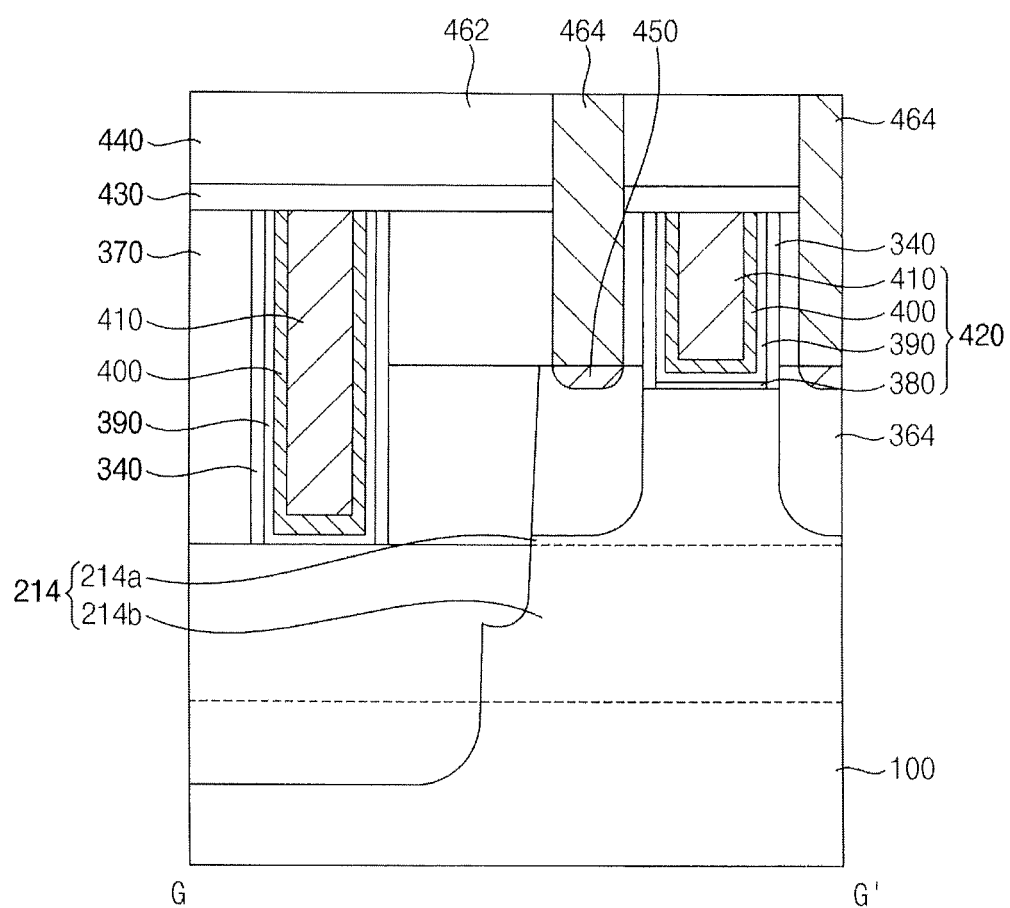

Particularly, FIGS. 42 and 46 are plan views, and FIGS. 43-45 and 47-48 are cross-sectional views. FIGS. 43, 45 and 47 are cross-sectional views taken along lines F-F' of corresponding plan views, respectively, and FIGS. 44 and 48 are cross-sectional views taken along lines G-G' of corresponding plan views, respectively.

Referring to FIGS. 42 to 44, after processes substantially the same as or similar to those illustrated with reference to FIGS. 1 to 11 are performed, the third etching mask 254 may be removed, and a fifth insulation layer 510 may be formed on the substrate 100 to fill the fourth recess 280.

An etching process may be performed using a seventh etching mask 258 to etch the first etching mask 195 and a portion of the second active fin 214, so that a seventh recess 520 may be formed.

In an example embodiment, the seventh etching mask 258 may include a twelfth pattern 238 and a thirteenth pattern 248 sequentially stacked. The twelfth and thirteenth patterns 238 and 248 may include materials substantially the same as those of the sixth and seventh patterns 232 and 242, respectively.

In example embodiments, the seventh etching mask 258 may expose an end of the second portion of the second active fin 214 in the first direction, i.e., an end of the second portion of the second active fin 214 adjacent the removed first portion of the second active fin 214, and thus the exposed end of the second portion of the second active fin 214 may be removed in the etching process.

In an example embodiment, the end of the second portion of the second active fin 214 may be partially removed by the etching process, and the end of the second portion of the second active fin 214 may partially remain. That is, the end of the second active fin 214 in the first direction may have a staircase shape.

However, the inventive concepts may not be limited thereto. For example, referring to FIG. 45, the end of the second portion of the second active fin 214 may be entirely removed by the etching process.

By the additional etching process, the end of the second active fin 214 that may not sufficiently removed by a previous etching process may be removed.

Referring to FIGS. 46 to 48, processes substantially the same as or similar to those illustrated with reference to FIGS. 16 to 35 may be performed to complete manufacturing the semiconductor device.

However, the second source/drain layer 364 may not be formed on the end of the second portion of the second active fin 214 at least partially removed in the previous etching process.

In the semiconductor device, the remaining end of the second active fin 214 in the first direction may be sufficiently removed, and thus the semiconductor device may have improved characteristics.

Figure 49:
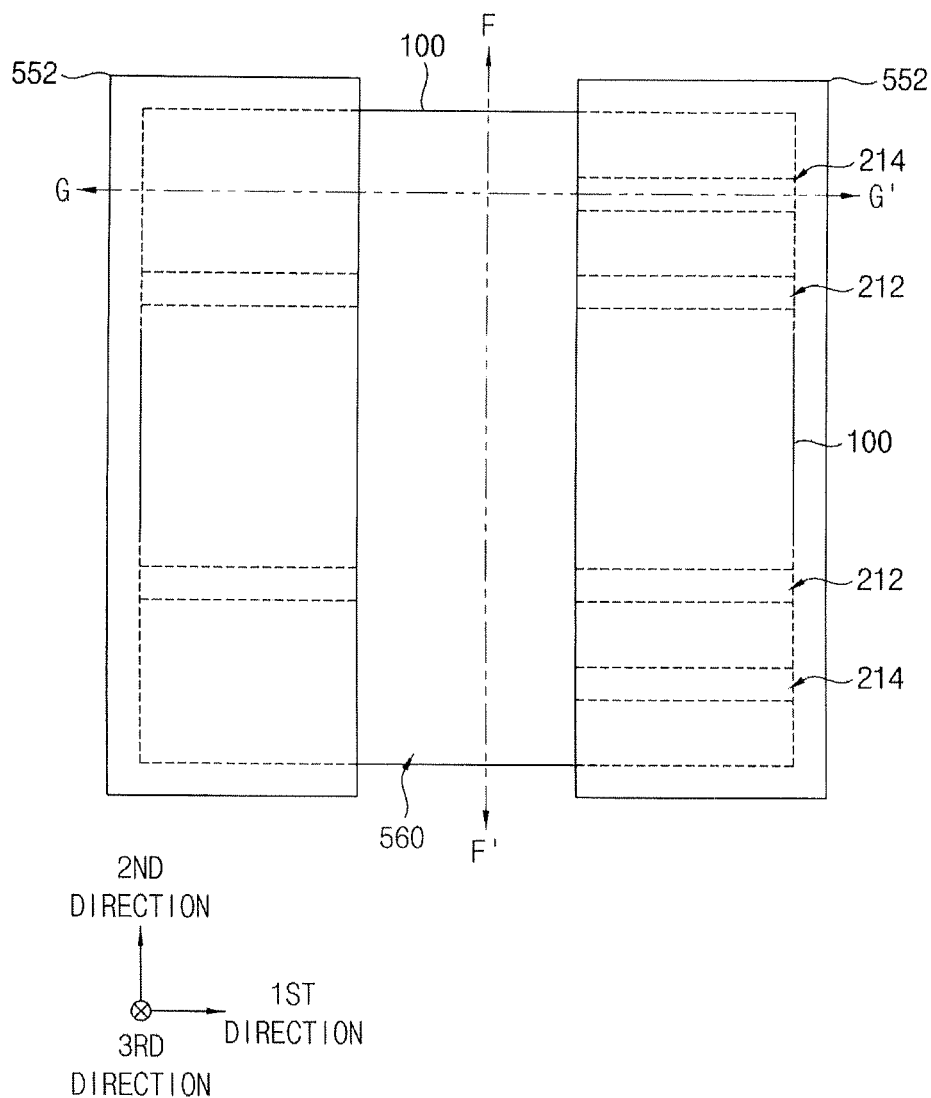
FIGS. 49 to 51 are a plan view and cross-sectional views illustrating a method of manufacturing a semiconductor device in accordance with example embodiments.
Figure 50:
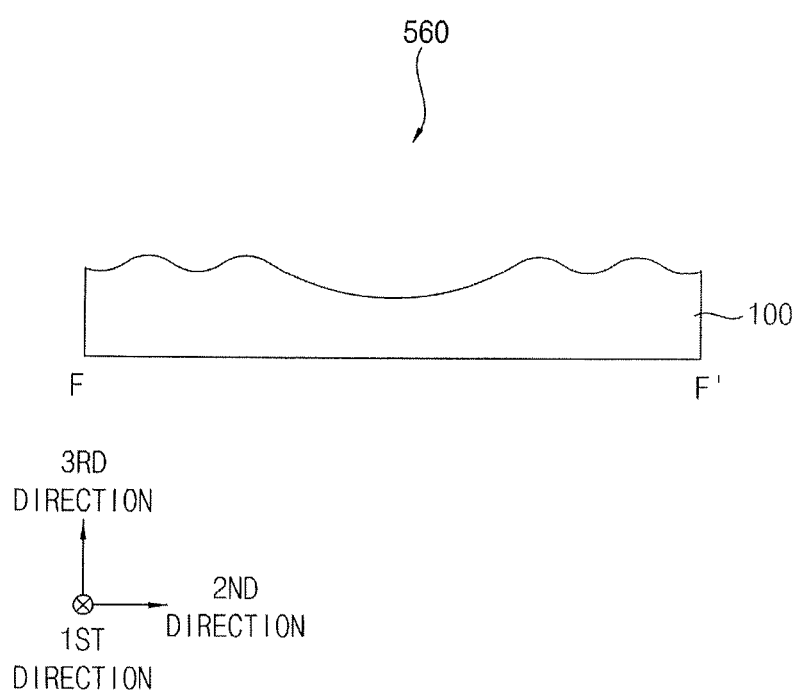
Figure 51:
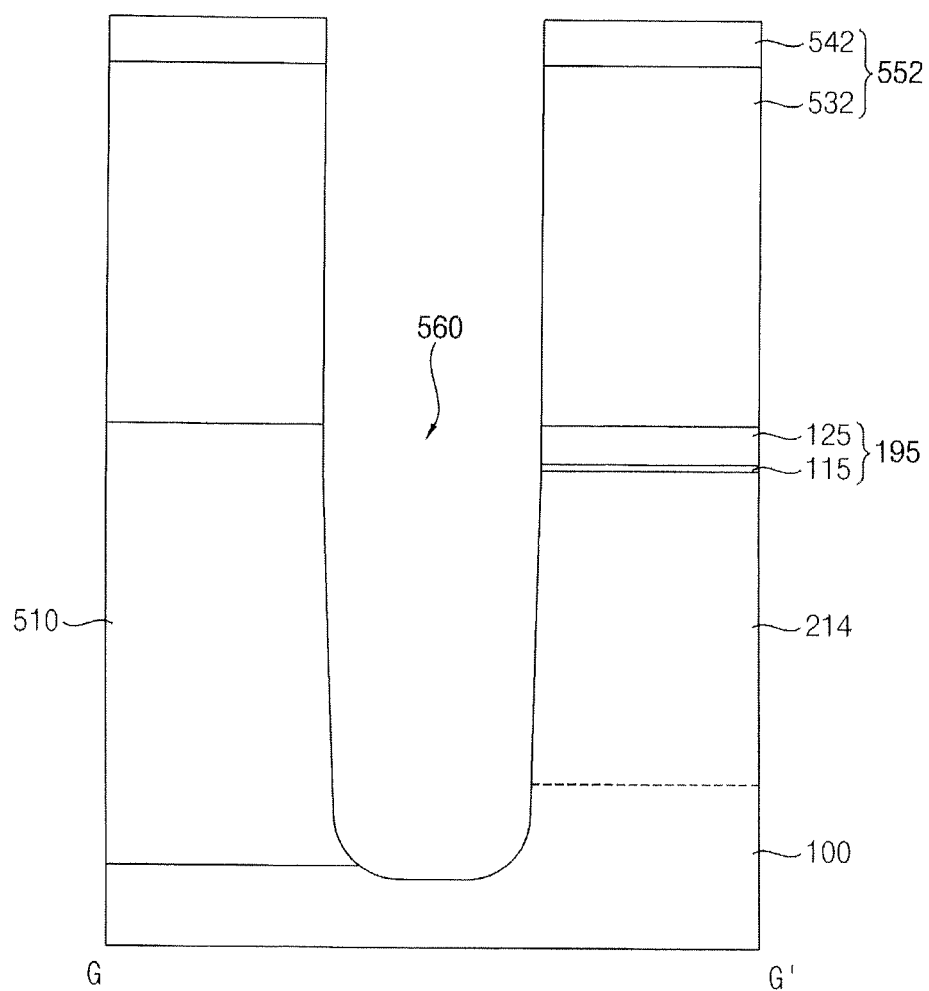

FIGS. 49 to 51 are a plan view and cross-sectional views illustrating a method of manufacturing a semiconductor device in accordance with example embodiments.

Particularly, FIG. 49 is a plan view, FIG. 50 is a cross-sectional view taken along a line F-F' of FIG. 49, and FIG. 51 is a cross-sectional view taken along a line G-G' of FIG. 49.

Referring to FIGS. 49 to 51, after processes substantially the same as or similar to that illustrated with reference to FIGS. 1 to 11 are performed, the third etching mask 254 may be removed, and the fifth insulation layer 510 may be formed on the substrate 100 to fill the fourth recess 280.

An etching process may be performed using an eighth etching mask 552 to etch the first etching mask 195 and portions of the first and second active fins 212 and 214, so that an eighth recess 560 may be formed.

In an example embodiment, the eighth etching mask 552 may include a fourteenth pattern 532 and a fifteenth pattern 542 sequentially stacked. The fourteenth and fifteenth patterns 532 and 542 may include materials substantially the same as those of the sixth and seventh patterns 232 and 242, respectively.

In example embodiments, the eighth etching mask 552 may expose a central portion of the first active fin 212 in the first direction and an end of the second portion of the second active fin 214 adjacent the central portion of the first active fin 212, which may be removed by the etching process.

By the additional etching process, the end of the second active fin 214 that has not been sufficiently removed by a previous etching process may be removed, as the method illustrated with reference to FIGS. 42 to 48. However, in the method illustrated with reference to FIGS. 42 to 48, the additional etching process may be performed to remove only the end of the second active fin 214, while in the method illustrated with reference to FIGS. 49 to 51, when the first and second active fins 212 and 214 are partially cut according to the original layouts thereof, the position of the cut portion of the first and second active fins 212 and 214 in a cutting process may be controlled so that the end of the second active fin 214 may be also removed in the cutting process.

In the semiconductor device, the end of the second active fin 214 in the first direction may be sufficiently removed, and thus the semiconductor device may have improved characteristics.

FIGS. 52 to 58 are plan views and cross-sectional views illustrating a method of manufacturing a semiconductor device in accordance with example embodiments.

Figure 52:
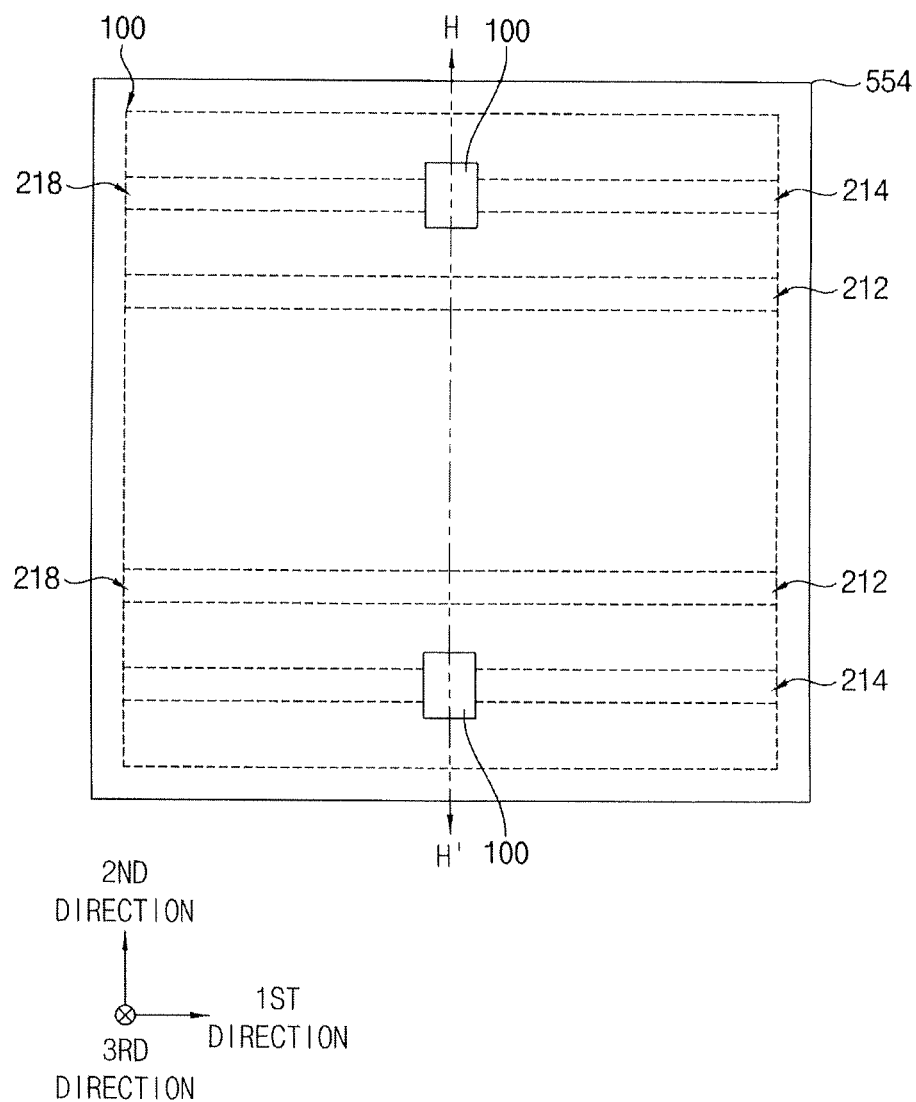
Figure 53:
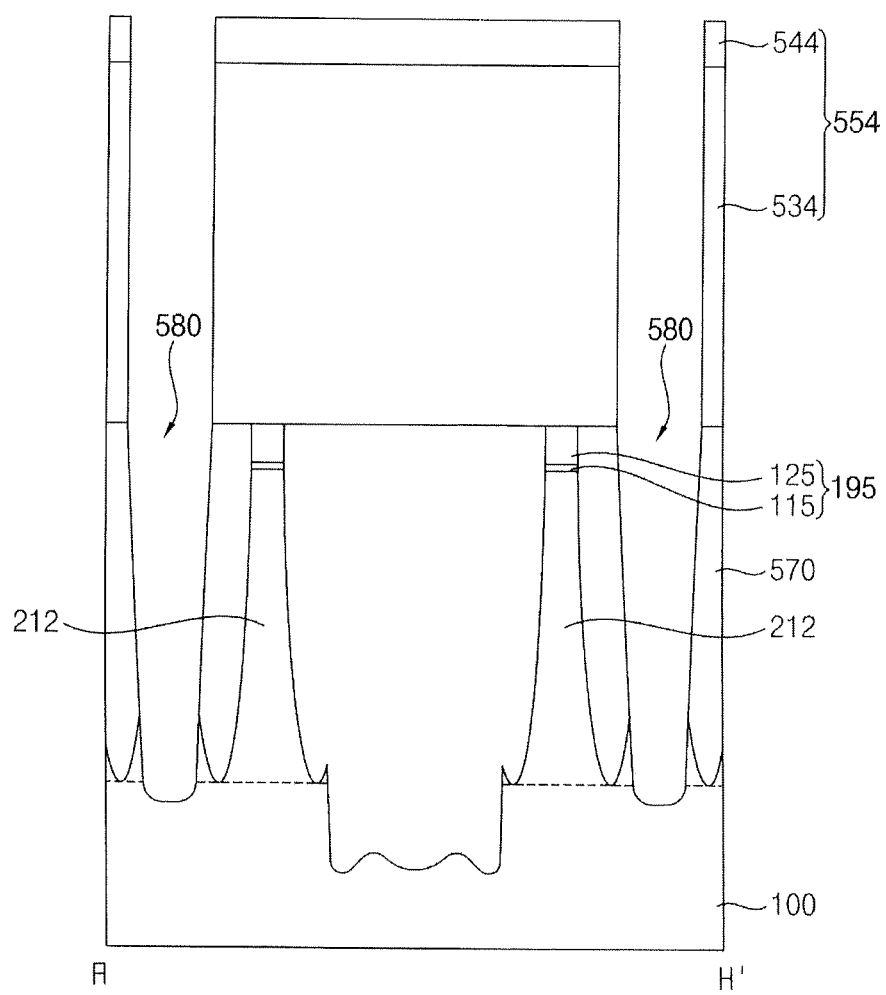
Figure 54:
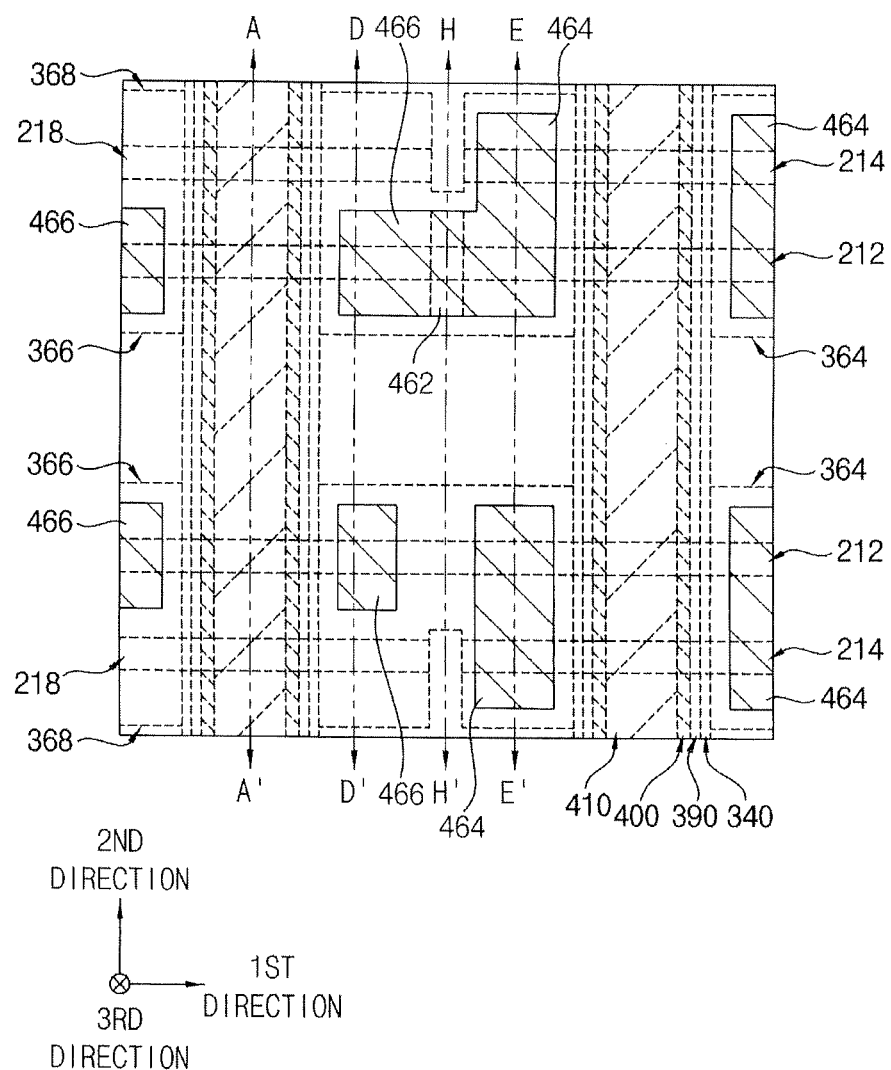

FIGS. 52 and 54 are plan views, and FIGS. 53 and 55-58 are cross-sectional views.

FIG. 55 is a cross-sectional view taken along a line A-A' of a corresponding plan view, FIG. 56 is a cross-sectional view taken along a line D-D' of a corresponding plan view, FIG. 57 is a cross-sectional view taken along a line E-E' of a corresponding plan view, and FIGS. 53 and 58 are cross-sectional views taken along lines H-H' of corresponding plan views, respectively.

Referring to FIGS. 52 and 53, after processes substantially the same as or similar to that illustrated with reference to FIGS. 1 to 7 are performed, the second etching mask 252 may be removed, and a sixth insulation layer 570 may be formed on the substrate 100 to fill the third recess 260.

An etching process may be performed using a ninth etching mask 554 to etch the first etching mask 195 and a portion of the second active fin 214, so that a ninth recess 580 may be formed.

In an example embodiment, the ninth etching mask 554 may include a sixteenth pattern 534 and a seventeenth pattern 544 sequentially stacked. The sixteenth and seventeenth patterns 534 and 544 may include materials substantially the same as those of the sixth and seventh patterns 232 and 242, respectively.

In example embodiments, the ninth etching mask 554 may partially expose the first portion of the second active fin 214 contacting the second portion of the second active fin 214, which may be removed in the etching process.

Referring to FIGS. 54 to 58, processes substantially the same as or similar to those illustrated with reference to FIGS. 16 to 35 may be performed to complete manufacturing the semiconductor device.

In an embodiment, a third source/drain layer 366 may be formed on a portion of the first active fin 212 adjacent the first portion of the second active fin 214 in the second direction, and a fourth source/drain layer 368 may be formed on the first portion of the second active fin 214 to be merged with the third source/drain layer 366.

A fourth contact plug 466 may be formed on the third source/drain layer 366, however, no contact plug may be formed on the fourth source/drain layer 368.

In the semiconductor device, even if the first portion of the second active fin 214 may not serve as an active element, in the present embodiment, the first portion of the second active fin 214 may not be entirely removed but only partially removed. However, no contact plug may be formed on the fourth source/drain layer 368, and thus no electrical signal may be applied thereto.

FIGS. 59 to 63 are a plan view and cross-sectional views illustrating a method of manufacturing a semiconductor device in accordance with example embodiments.

Figure 59:
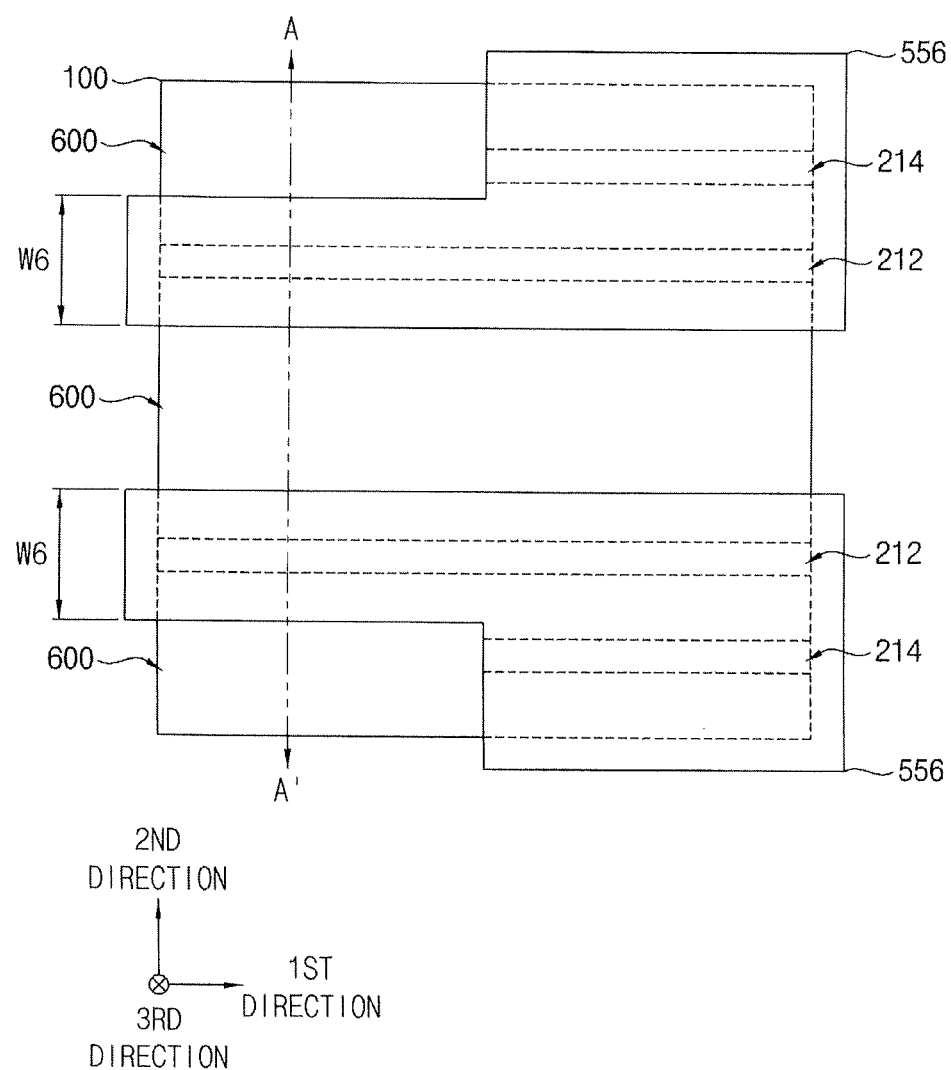

FIG. 59 is a plan view, and FIGS. 60 to 63 are cross-sectional views taken along lines A-A' of FIG. 59, respectively.

Referring to FIGS. 59 and 60, processes substantially the same as or similar to those illustrated with reference to FIGS. 40 and 41 may be performed.

In an embodiment, a tenth etching mask 556 instead of the sixth etching mask 256 may be performed to etch the first etching mask 195 and the first to third etching masks 212, 214 and 216, so that a tenth recess 600 may be formed.

The tenth etching mask 556 may include an eighteenth pattern 536 and a nineteenth pattern 546 sequentially stacked. The eighteenth and nineteenth patterns 536 and 546 may include materials substantially the same as those of the sixth and seventh patterns 232 and 242, respectively.

The tenth etching mask 556 may cover the first active fin 212 and a portion of the second active fin 214, and further cover portions of the first insulation layer 220 adjacent thereto. Thus, a portion of the second active fin 214, the third active fin 216, and portions of the first insulation layer 220 adjacent thereto may be removed in the etching process.

In example embodiments, the tenth etching mask 556 may have a sixth width W6 in the second direction greater than the fifth width W5 of the sixth etching mask 256. Even if the tenth etching mask 556 covers only the first active fin 212 at least an area of the substrate 100 as the sixth etching mask 256, a first edge of the tenth etching mask 556 between the first and second active fins 212 and 214 may not be located at a center of a space therebetween but located at a position closer to the second active fin 214, and a second edge of the tenth etching mask 556 between the first and third active fins 212 and 216 may not be located at a center of a space therebetween but located at a position closer to the third active fin 216.

Accordingly, an aspect ratio of the tenth etching mask 556, i.e., a ratio of a sixth thickness T6 with respect to the sixth width W6 may not be large, and thus the tenth etching mask 556 may not collapse.

The etching process using the tenth etching mask 556 may be performed at an angle of γ, which may have a value of about 85 degrees to about 90 degrees because the sixth width W6 of the tenth etching mask 556 may not be too small, for example, more than three times the width of each of the first to third active fins 212, 214 and 216.

In an embodiment, the first and second edges of the tenth etching mask 556 may be close to the second and third active fins 214 and 216, respectively. Protrusions each having quite a high top surface may remain at a lower lateral portion of the second active fin 214 or the third active fin 216 adjacent the first active fin 212. The top surface of each of the protrusions may have a height more than about half a height of a top surface of the first active fin 212.

Figure 61:
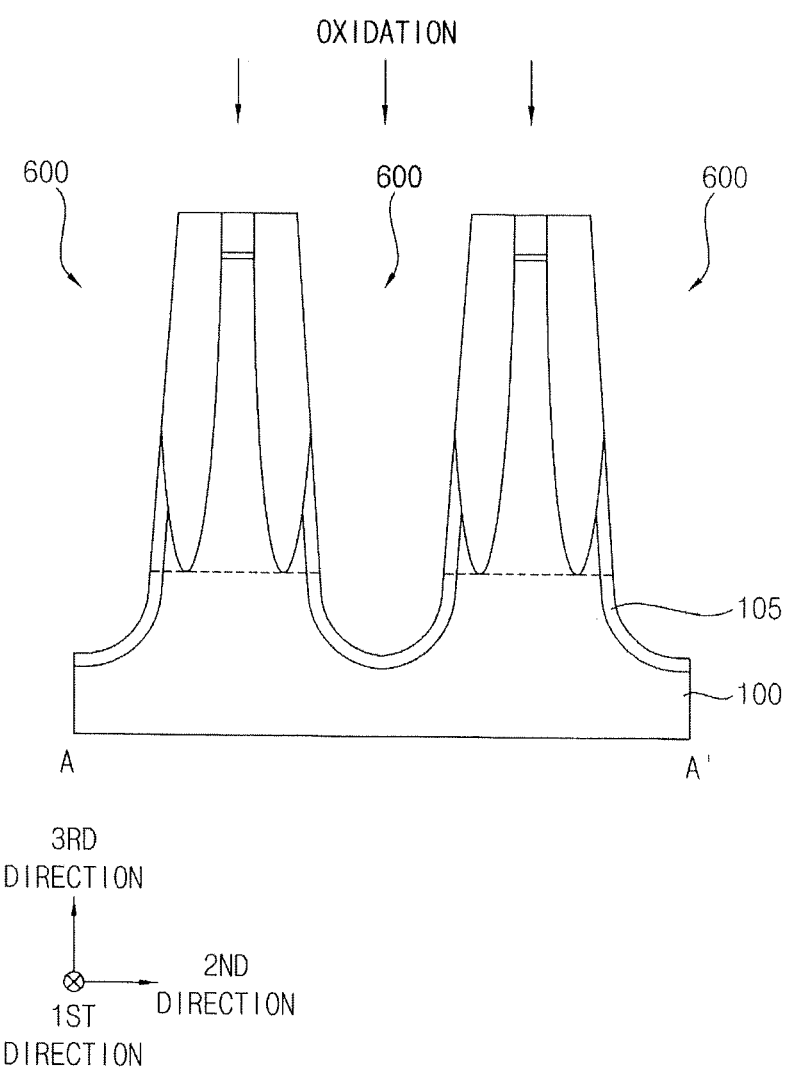

However, referring to FIG. 61, after removing the tenth etching mask 556, an oxidation process may be performed on the protrusions and an upper portion of the substrate 100 exposed by the tenth recess 600.

Thus, surfaces of the protrusions and the upper portion of the substrate 100 may be transformed into an oxide layer 105, e.g., a silicon oxide layer, and the top surface of each of the protrusions may be lowered.

Figure 62:
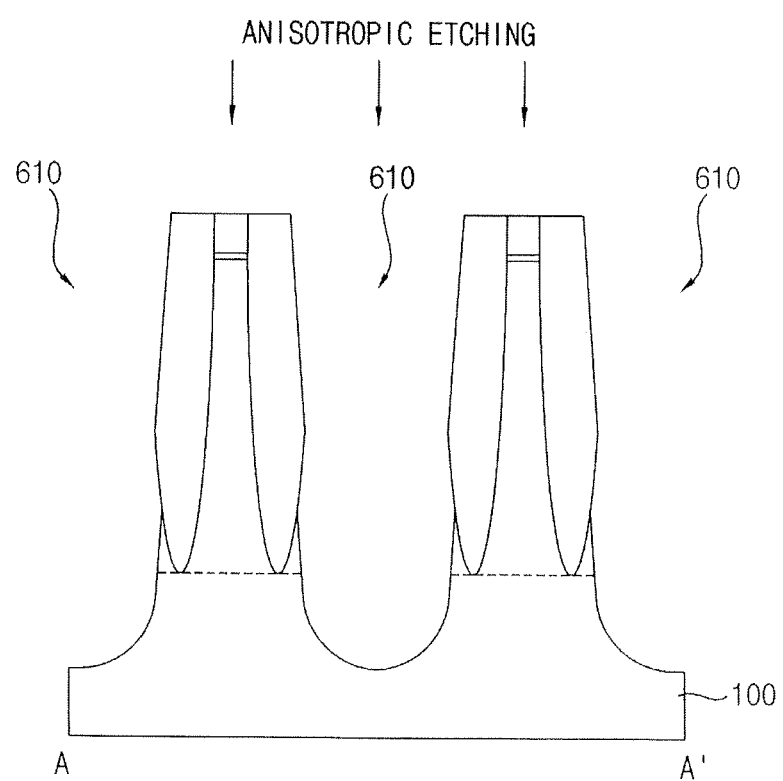

Referring to FIG. 62, after removing the tenth etching mask 556, an anisotropic etching process may be performed on the protrusions and an upper portion of the substrate 100 exposed by the tenth recess 600 according to an embodiment.

Thus, the surfaces of the protrusions and the upper portion of the substrate 100 may be etched, and the top surface of each of the protrusions may be lowered.

The anisotropic etching process may include, e.g., a wet etching process.

Referring to FIG. 63, processes substantially the same as or similar to that illustrated with reference to FIGS. 16 to 18 may be performed.

The oxide layer 105 may be merged with the isolation pattern 290 on the substrate 100, and protrusions remaining at the lower sidewalls of the first active fin 212 may have top surfaces that may not be too high.

FIGS. 64 to 67 are cross-sectional views illustrating a method of forming an active fin in accordance with example embodiments. This method may be a modification of the QPT method illustrated with reference to FIGS. 1 to 7.

Referring to FIG. 64, processes substantially the same as or similar to those illustrated with reference to FIGS. 1 and 2 may be performed.

In an embodiment, the width of each of the sacrificial patterns 140 may be, for example, three times the width of the first spacer 150, and the distance between opposite first spacers 150 between neighboring ones of the sacrificial patterns 140 may be also three times the width of the first spacer 150.

Referring to FIG. 65, processes substantially the same as or similar to those illustrated with reference to FIG. 3 may be performed.

Thus, the third pattern 135 may extend in the first direction with a width substantially equal to the width of the first spacer 150, and a plurality of third patterns 135 may be formed in the second direction to be spaced apart from each other by a given distance, e.g., three times the width of the third pattern 135.

Figure 66:
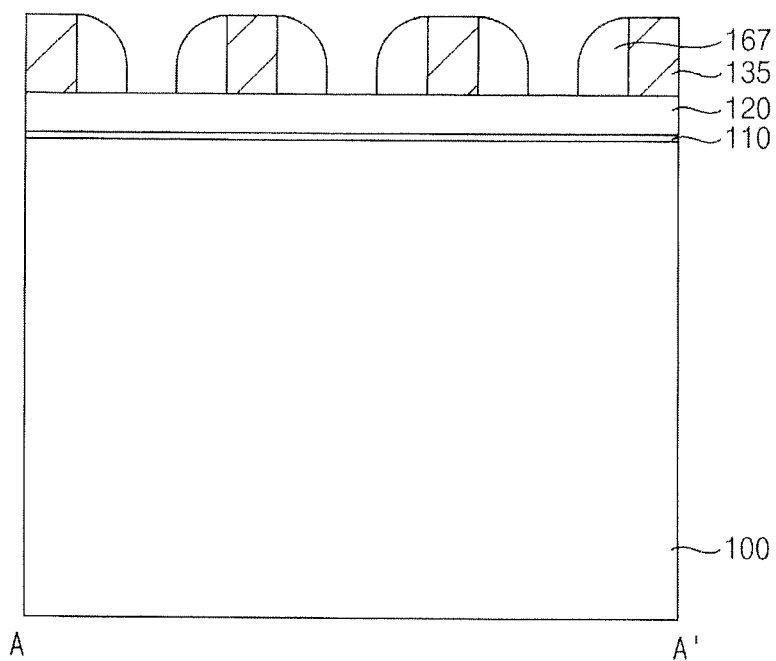

Referring to FIG. 66, after removing first spacer 150, a second spacer 167 may be formed on each of opposite sidewalls of the third pattern 135.

In example embodiments, the second spacer 167 may be formed by conformally forming a second spacer layer on the second layer 120 to cover the third pattern 135 through an ALD process, and anisotropically etching the second spacer layer. Thus, the second spacer 167 may be formed on each of the opposite sidewalls of the third pattern 135, and may extend in the first direction.

In an example embodiment, the second spacer 167 may have a width substantially equal to that of the third pattern 135, and the second spacers 167 opposite with each other between neighboring ones of the third patterns 135 may be spaced apart from each other by the width of the third pattern 135.

Figure 67:
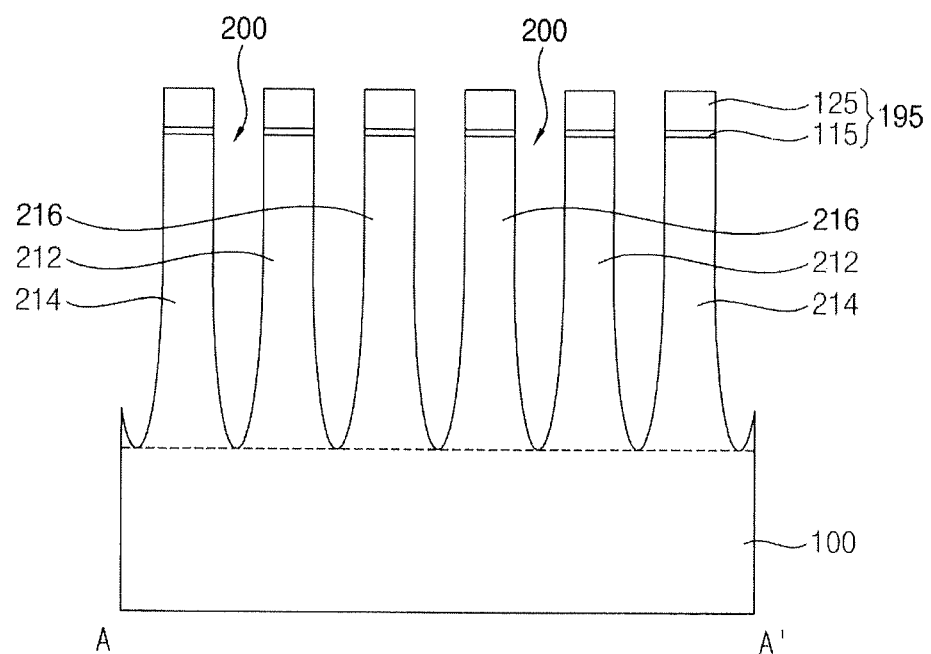

Referring to FIG. 67, after removing the third patterns 135, processes substantially the same as or similar to those illustrated with reference to FIGS. 5 to 7 may be performed.

In an embodiment, the second layer 120 and the first layer 110 may be etched using the second spacer 167 as an etching mask to form the first etching mask 195, and an upper portion of the substrate 100 may be etched using the first etching mask 195 to form the first to third active fins 212, 214 and 216.

In example embodiments, each of the first to third active fins 212, 214 and 216 may extend in the first direction with a given width in the second direction, and a plurality of first to third active fins 212, 214 and 216 may be formed to be spaced apart from each other by a given distance, e.g., by the width thereof.

In the QPT method illustrated with reference to FIGS. 1 to 7, the first to third active fins 212, 214 and 216 may be spaced apart from each other by twice the width of each of the first to third active fins 212, 214 and 216, while in the QPT method illustrated with reference to FIGS. 64 to 67, the first to third active fins 212, 214 and 216 may be spaced apart from each other by the width of each of the first to third active fins 212, 214 and 216.

Even in accordance with the QPT method illustrated with reference to FIGS. 1 to 7, the width of the sacrificial pattern 140, the distance between the sacrificial patterns 140, and the thickness of the fourth layer 160 may be adjusted so that the first to third active fins 212, 214 and 216 may be formed to be spaced apart from each other by the width of each of the first to third active fins 212, 214 and 216.

FIGS. 68 to 73 are cross-sectional views illustrating stages of a method of manufacturing a semiconductor device in accordance with example embodiments. This method may include processes substantially the same as or similar to those illustrated with reference to FIGS. 64 to 67.

Referring to FIG. 68, processes substantially the same as or similar to those illustrated with reference to FIG. 64 may be performed.

However, the width of each of the sacrificial patterns 140 may be less than three times the width of the first spacer 150, and thus the distance between opposite first spacers 150 between neighboring ones of the sacrificial patterns 140 may be less or more than three times the width of the first spacer 150 according to the position of the first spacer 150.

Referring to FIG. 69, processes substantially the same as or similar to those illustrated with reference to FIGS. 64 and 65 may be performed.

Thus, the third pattern 135 may extend in the first direction with a seventh width W7 substantially equal to the width of the first spacer 150, and the second spacer 167 on each of opposite sidewalls of the third pattern 135 may extend in the first direction with a width substantially equal to the seventh width W7 of the third pattern 135. However, opposite second spacers 167 between neighboring ones of the third patterns 135 may be spaced apart from each other by a first distance D1 less than the seventh width W7 or by a second distance D2 greater than the seventh width W7.

Figure 70:
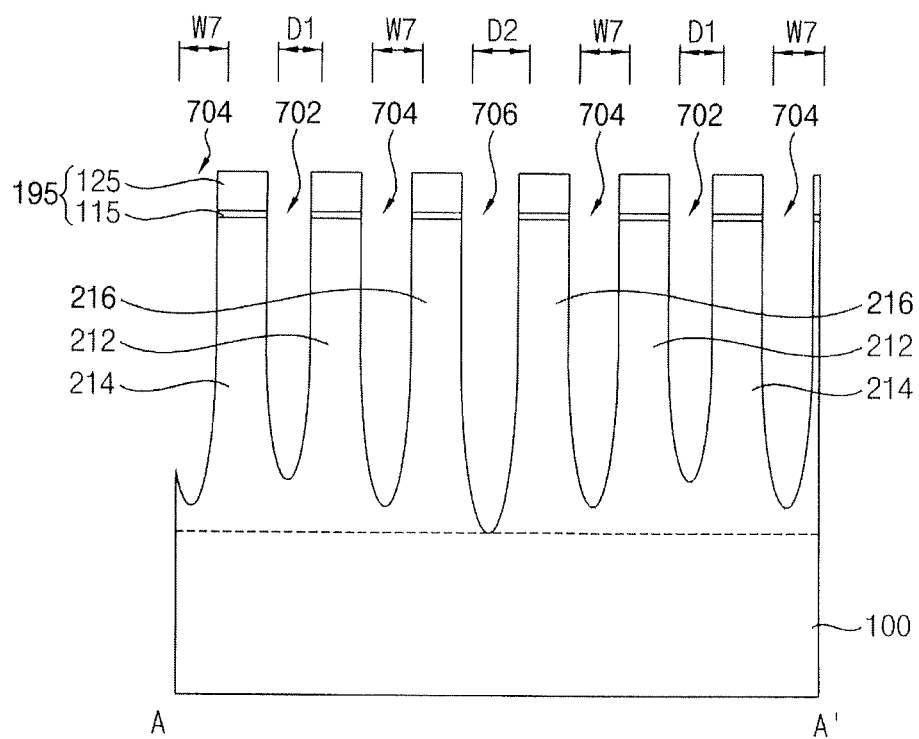

Referring to FIG. 70, processes substantially the same as or similar to those illustrated with reference to FIG. 67 may be performed, and thus the first to third active fins 212, 214 and 216 and eleventh to thirteenth recesses 702, 704 and 706 may be formed.

In example embodiments, each of the first to third active fins 212, 214 and 216 may extend in the first direction with a given width, i.e., the seventh width W7 in the second direction, however, the first to third active fins 212, 214 and 216 may be spaced apart from each other by varying distances. The eleventh to thirteenth recesses 702, 704 and 706 may have different widths from each other, i.e., the first distance D1, the seventh width W7, and the second distance D2, respectively. Accordingly, the first and second active fins 212 and 214 may be spaced apart from each other by the first distance D1, the first and third active fins 212 and 216 may be spaced apart from each other by the seventh width W7, and the third active fins 216 may be spaced apart from each other by the second distance D2.

In an example embodiment, the eleventh to thirteenth recesses 702, 704 and 706 may have depths in proportional to the widths thereof. Thus, the thirteenth recess 706, the twelfth recess 704, and the eleventh recess 702 may have depths decreasing in this order.

Figure 71:
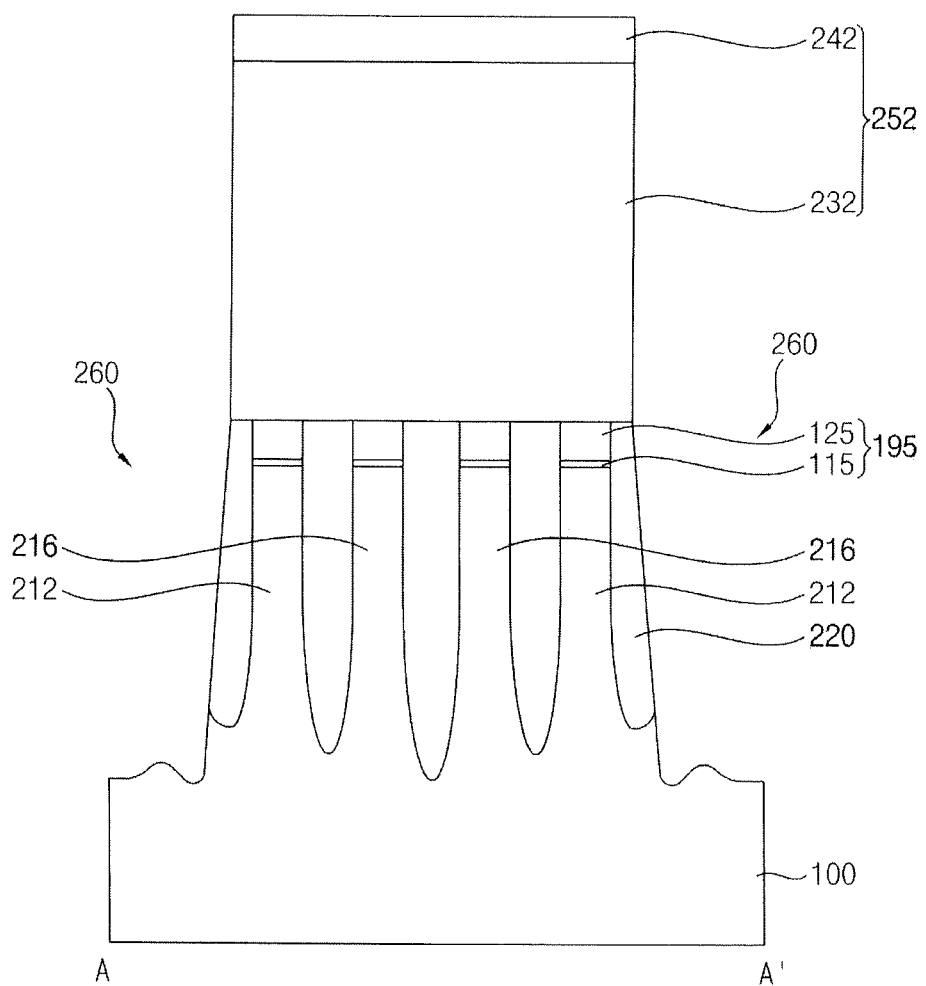

Referring to FIG. 71, processes substantially the same as or similar to those illustrated with reference to FIGS. 8 and 9 may be performed to partially etch the second active fin 214.

Figure 72:
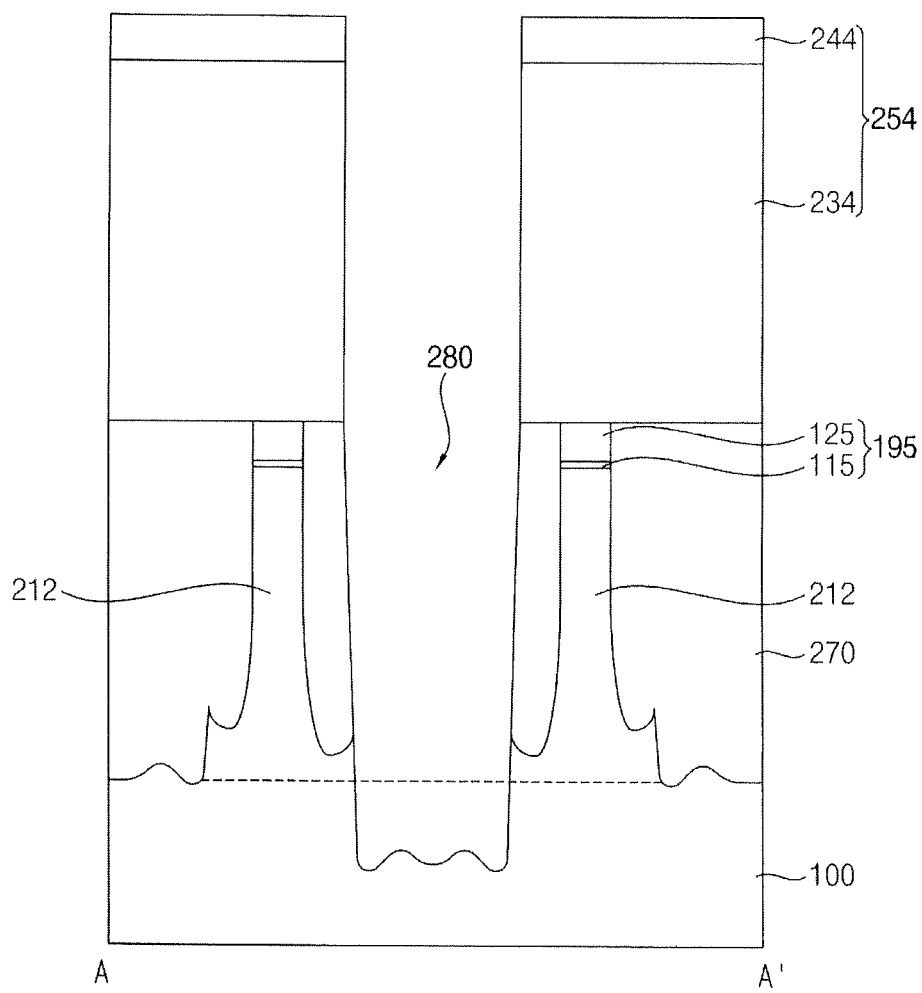

Referring to FIG. 72, processes substantially the same as or similar to those illustrated with reference to FIGS. 10 and 11 may be performed to partially etch the third active fin 216.

However, according to the depths of the eleventh to thirteenth recesses 702, 704 and 706 between the first to third active fins 212, 214 and 216, top surfaces of the first and second protrusions at the respective first and second sidewalls of the first active fin 212 may have different heights. In an example embodiment, the top surface of the first protrusion at a lower portion of the first sidewall of the first active fin 212 opposite the second active fin 214 may be higher than the top surface of the second protrusion at a lower portion of the second sidewall of the first active fin 212.

Referring to FIG. 73, processes substantially the same as or similar to those illustrated with reference to FIGS. 16 to 17 may be performed.

A lower surface of the isolation pattern 290 at a portion thereof between the first active fins 212 may be lower than a lower surface of the isolation pattern 290 at a portion thereof between the first and second active fins 212 and 214.

Figure 74:
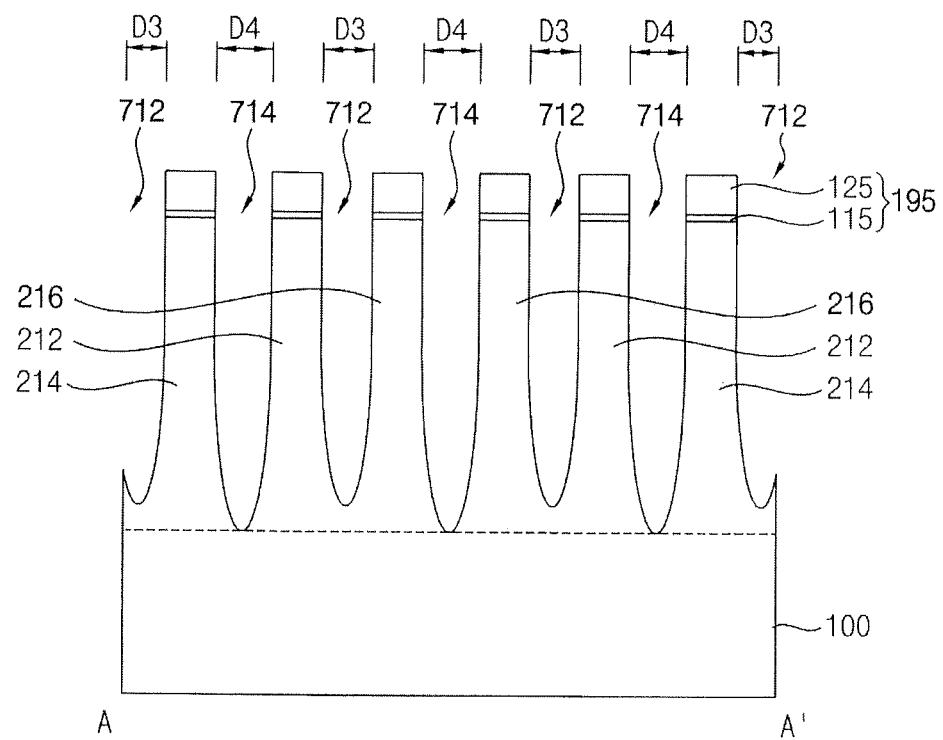

FIGS. 74 to 75 are cross-sectional views illustrating a method of manufacturing a semiconductor device in accordance with example embodiments. This method may include processes substantially the same as or similar to those illustrated with reference to FIGS. 68 to 73.

Referring to FIG. 74, processes substantially the same as or similar to those illustrated with reference to FIGS. 68 to 70 may be performed, and thus the first to third active fins 212, 214 and 216 and fourteenth to fifteenth recesses 712 and 714 may be formed.

The fourteenth and fifteenth recesses 712 and 714 may have different widths from each other, i.e., third and fourth distances D3 and D4, respectively. Thus, the first and second active fins 212 and 214 may be spaced apart from each other by the fourth distance D4, the first and third active fins 212 and 216 may be spaced apart from each other by the third distance D3, and the third active fins 216 may be spaced apart from each other by the fourth distance D4.

In an example embodiment, the fifteenth recess 714 may have a depth greater than that of the fourteenth recess 712.

Referring to FIG. 75, processes substantially the same as or similar to those illustrated with reference to FIGS. 71 to 73 may be performed to etch a portion of the second active fin 214 and the third active fin 216.

In example embodiments, the top surfaces of the first and second protrusions at the respective first and second sidewalls of the first active fin 212 may have different heights from each other. In an example embodiment, the top surface of the first protrusion at a lower portion of the first sidewall of the first active fin 212 opposite the second active fin 214 may be lower than the top surface of the second protrusion at a lower portion of the second sidewall of the first active fin 212.

In example embodiments, a lower surface of the isolation pattern 290 at a portion thereof between the first active fins 212 may be lower than a lower surface of the isolation pattern 290 at a portion thereof between the first and second active fins 212 and 214.

FIGS. 76 to 83 are cross-sectional views illustrating a method of manufacturing a semiconductor device in accordance with example embodiments. This method may include processes substantially the same as or similar to those illustrated with reference to FIGS. 1 to 35 or FIGS. 40 to 41.

Figure 76:
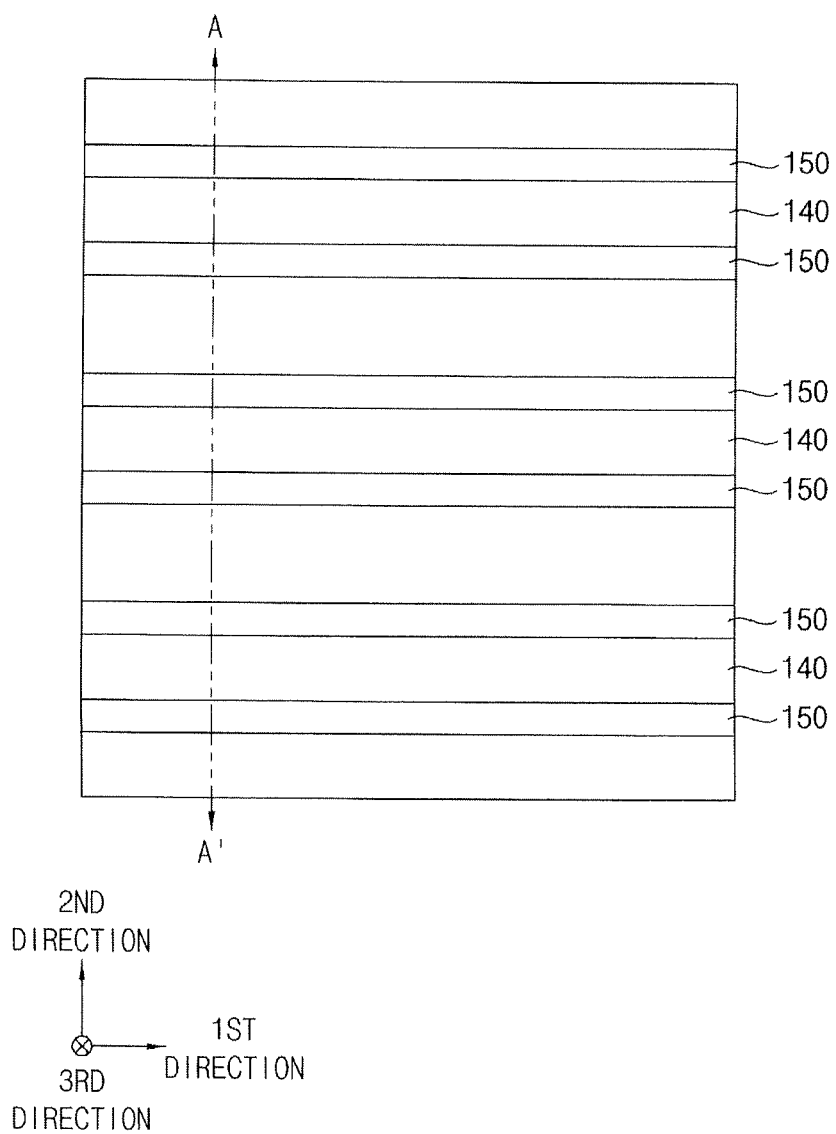
Figure 77:
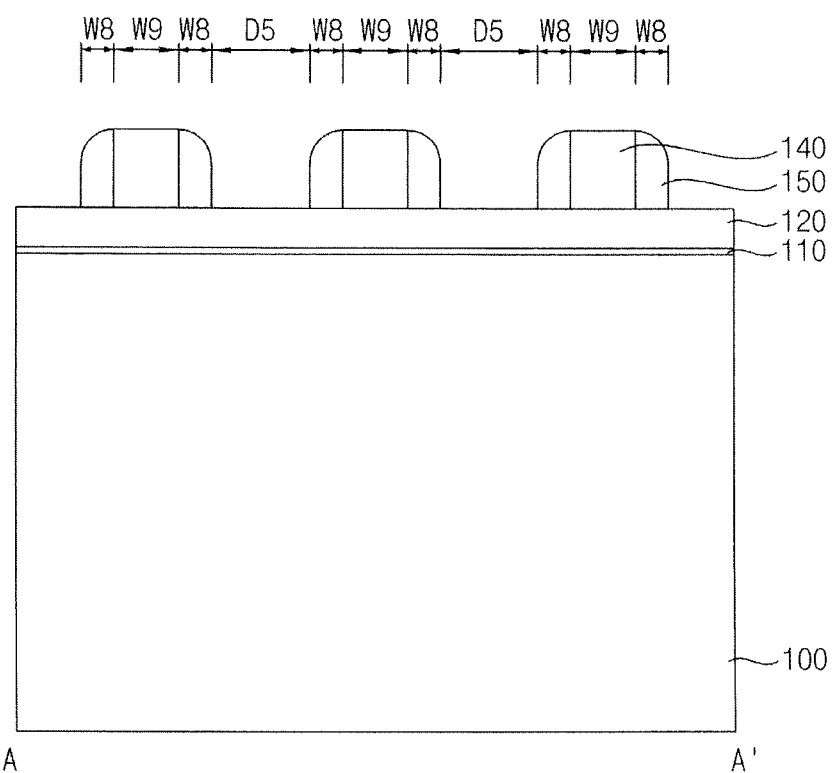

Referring to FIGS. 76 and 77, processes substantially the same as or similar to those illustrated with reference to FIGS. 1 and 2 may be performed.

However, the third layer 130 may not be formed, and thus the first layer 110, the second layer 120, the sacrificial pattern 140, and the first spacer 150 may be sequentially formed on the substrate 100.

In example embodiments, the width of each of the sacrificial patterns 140 and the thickness of the first spacer layer in the third direction, i.e., the width of the first spacer 150 in the second direction may be adjusted so that the width of each of the sacrificial patterns 140 in the second direction may be less than the distance between opposite first spacers 150 between neighboring ones of the sacrificial patterns 140. For example, each of the sacrificial patterns 140 may have a ninth width W9 substantially equal to twice an eighth width W8 of the first spacer 150, and the sacrificial patterns 140 may be spaced apart from each other by a distance substantially equal to five times the eighth width W8. Accordingly, opposite first spacers 150 between neighboring ones of the sacrificial patterns 140 may be spaced apart from each other by a fifth distance D5 substantially equal to three times the eighth width W8.

In example embodiments, the sacrificial pattern 140 may be formed by forming a sacrificial layer on the second layer 120, forming a photoresist pattern on the sacrificial layer, and etching the sacrificial layer using the photoresist pattern as an etching mask. The photoresist pattern may be formed by an exposure process and a developing process on a photoresist layer, and the exposure process may be performed using extreme ultra violet (EUV) as a light source.

Referring to FIG. 78, processes substantially the same as or similar to those illustrated with reference to FIGS. 6 and 7 may be performed, and thus the first to third active fins 212, 214 and 216 and sixteenth to seventeenth recesses 722 and 724 may be formed.

The sixteenth and seventeenth recesses 722 and 724 may have different widths from each other, e.g., the ninth width W9 and the fifth distance D5. Accordingly, the first and second active fins 212 and 214 may be spaced apart from each other by the ninth width W9, the first and third active fins 212 and 216 may be spaced apart from each other by the fifth distance D5, and the third active fins 216 may be spaced apart from each other by the ninth width W9.

In an example embodiment, the seventeenth recess 724 may have a depth greater than that of the sixteenth recess 722.

Figure 79:
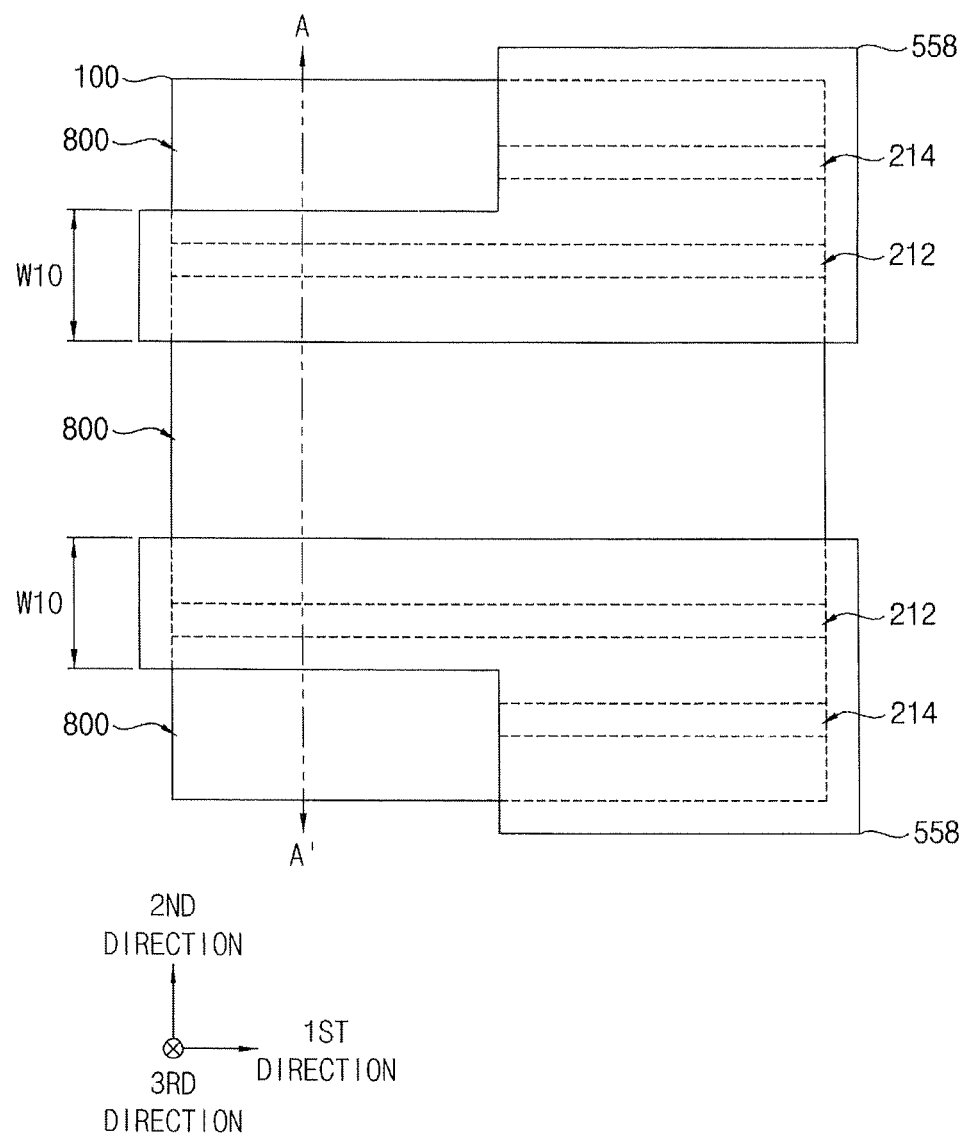
Figure 80:
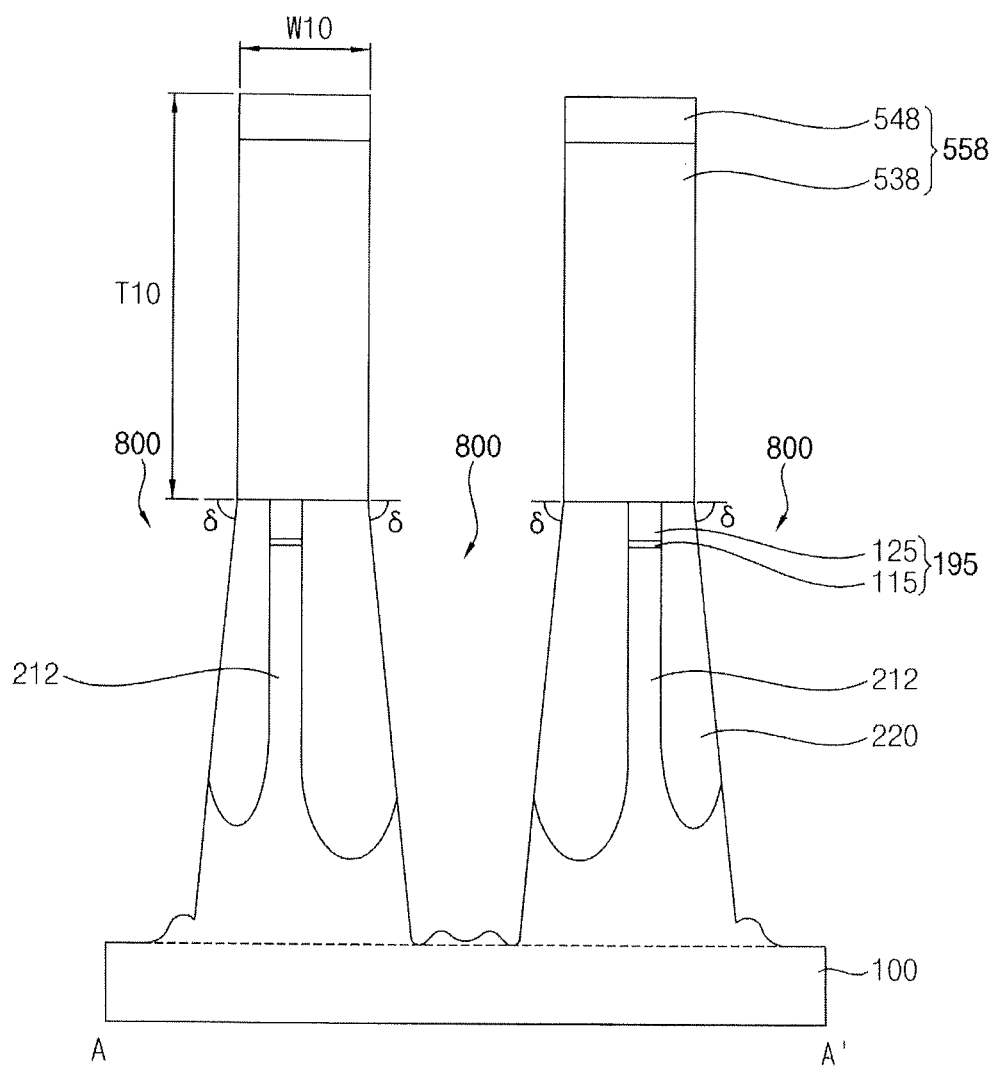

Referring to FIGS. 79 to 80, processes substantially the same as or similar to those illustrated with reference to FIGS. 40 and 41 may be performed.

However, an etching process may be performed using an eleventh etching mask 558 to etch the first etching mask 195 and the first to third active fins 212, 214 and 216, so that an eighteenth recess 800 may be formed.

The eleventh etching mask 558 may include a twentieth pattern 538 and a twenty-first pattern 548 sequentially stacked. The twentieth and twenty-first patterns 538 and 548 may include materials substantially the same as those of the sixth and seventh patterns 232 and 242, respectively.

The eleventh etching mask 558 may cover the first active fin 212 and a portion of the second active fin 214, and further cover portions of the first insulation layer 220 adjacent thereto. Thus, a portion of the second active fin 214, the third active fin 216, and portions of the first insulation layer 220 adjacent thereto may be removed in the etching process.

In example embodiments, the eleventh etching mask 558 may have a tenth width W10 greater than the fifth width W5 of the sixth etching mask 256. Even if the eleventh etching mask 558 cover only the first active fin 212 at least an area of the substrate 100 as the sixth etching mask 256, the distance between the first and third active fins 212 and 216, i.e., the fifth distance D5 may be greater than the distance between the first and second active fins 212 and 214, i.e., the ninth width W9, and thus the tenth width W10 from a first edge of the eleventh etching mask 558 between the first and second active fins 212 and 214 to a second edge of the eleventh etching mask 558 between the first and third active fins 212 and 216 may not be too small, for example, more than three times the width of each of the first to third active fins 212, 214 and 216.

Accordingly, an aspect ratio of the eleventh etching mask 558, i.e., a ratio of a tenth thickness T10 with respect to the tenth width W10 may not be large, and thus the eleventh etching mask 558 may not collapse.

The etching process using the eleventh etching mask 558 may be performed at an angle of δ, which may have a value of about 85 degrees to about 90 degrees because the tenth width W10 of the eleventh etching mask 558 may not be too small.

Figure 81:
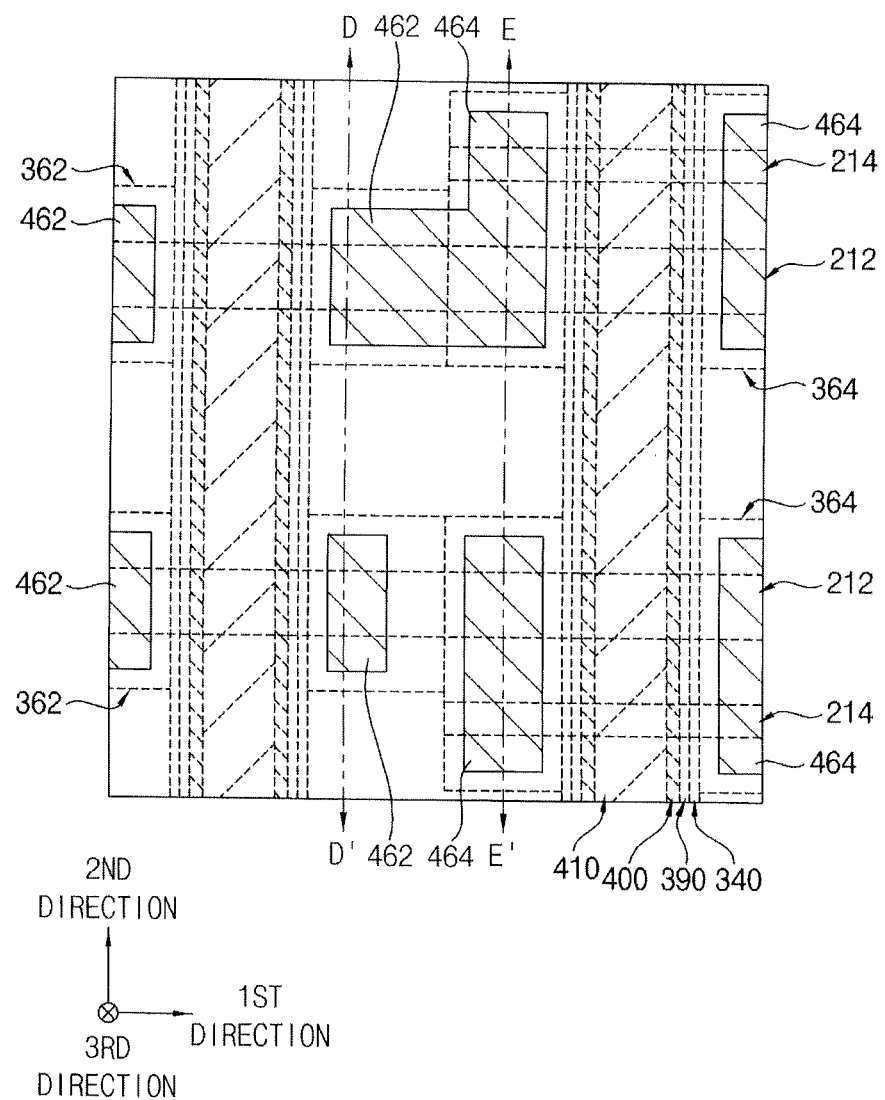
Figure 83:
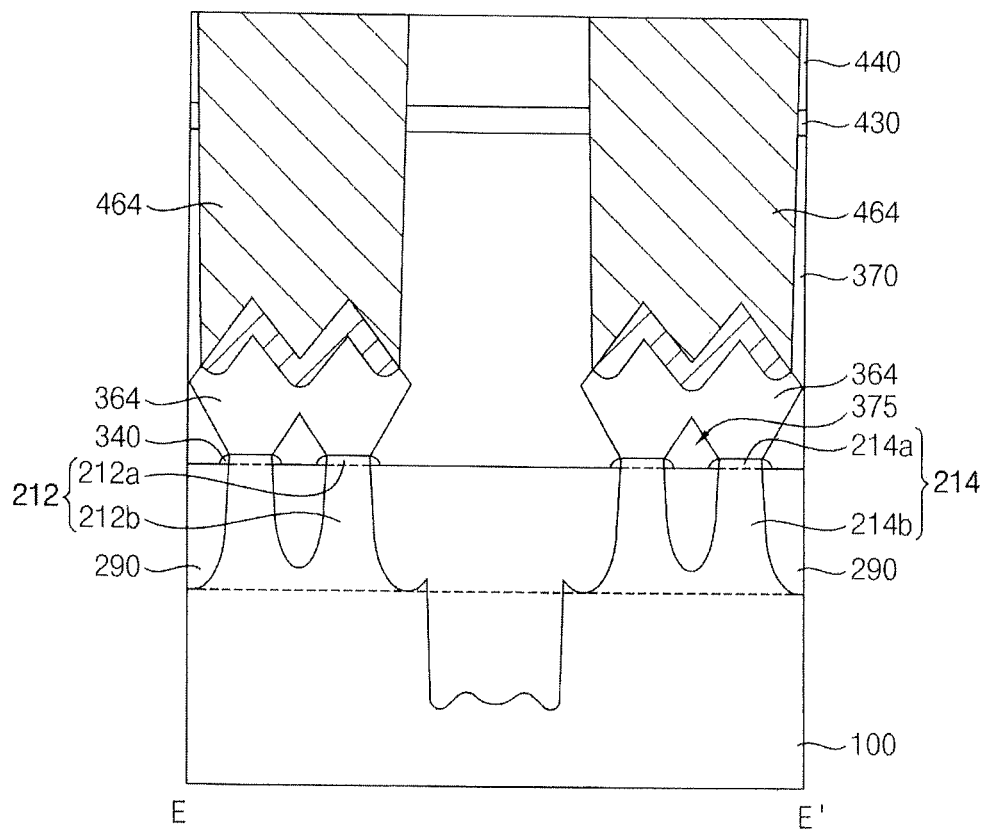

Referring to FIGS. 81 to 83, processes substantially the same as or similar to those illustrated with reference to FIGS. 16 to 35 may be performed to complete manufacturing the semiconductor device.

As illustrated above, in the method of manufacturing the semiconductor device, the first to third active fins 212, 214 and 216 may be formed by a double patterning technology (DPT) method unlike the method illustrated with reference to FIGS. 1 to 75 including the QPT method, and the exposure process for forming the photoresist pattern may use EUV so that the sacrificial pattern 140 may be formed to have a small width.

Accordingly, the width of each of the sacrificial patterns 140 and the distance between the sacrificial patterns 140 may be easily changed, and the distance from the first active fin 212 on which the transistor may be formed to the third active fin 216 or the second active fin 214 adjacent the first active fin 212 may be increased so that the aspect ratio of the etching mask may be small and that the etching process may be easily performed.

In the semiconductor device, a distance from a top surface of the first protrusion connected to the lower portion of the first sidewall of the first active fin 212 to a corresponding portion of the first sidewall of the first active fin 212 may be different from a distance from a top surface of the second protrusion connected to the lower portion of the second sidewall of the first active fin 212 to a corresponding portion of the second sidewall of the first active fin 212. In an example embodiment, the distance from the top surface of the first protrusion connected to the lower portion of the first sidewall of the first active fin 212 opposite the second active fin 214 to the corresponding portion of the first sidewall of the first active fin 212 may be less than the distance from the top surface of the second protrusion connected to the lower portion of the second sidewall of the first active fin 212 to the corresponding portion of the second sidewall of the first active fin 212.

Additionally, the top surfaces of the first and second protrusions may have different heights from each other. In an example embodiment, the top surface of the first protrusion may be higher than the top surface of the second protrusion.

The above method of manufacturing the semiconductor device and the semiconductor device may be applied to various types of memory devices, for example, logic devices such as central processing units (CPUs), main processing units (MPUs), or application processors (APs), volatile memory devices such as DRAM devices or SRAM devices, or non-volatile memory devices such as flash memory devices, PRAM devices, MRAM devices, RRAM devices, or the like.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed:

1. A method of manufacturing a semiconductor device, the method comprising:
    forming a plurality of active fins on a substrate using a first etching mask, each of the plurality of active fins extending in a first direction substantially parallel to an upper surface of the substrate, and the plurality of active fins being spaced apart from each other by a given distance in a second direction substantially parallel to the upper surface of the substrate and substantially perpendicular to the first direction;
    etching the plurality of active fins using a second etching mask covering a first active fin and a second active fin of the plurality of active fins to remove at least one of the plurality of active fins, the second active fin being adjacent a first side of the first active fin, and the at least one of the plurality of active fins being adjacent to a second side of the first active fin;
    etching the plurality of active fins using a third etching mask covering the first active fin, a portion of the second active fin, and a portion of the substrate corresponding to the at least one of the plurality of active fins removed using the second etching mask;
    forming first and second gate structures, the first gate structure extending in the second direction on the first active fin, and the second gate structure extending in the second direction on the first active fin and the portion of the second active fin; and
    forming a first source/drain layer and a second source/drain layer, the first source/drain layer being on a portion of the first active fin adjacent the first gate structure, and the second source/drain layer being on a portion of the first active fin adjacent the second gate structure and the portion of the second active fin.

2. The method of claim 1, further comprising a plurality of first active fins including the first active fin, the plurality of first active fins being disposed in the second direction, other ones of the plurality of active fins except for the plurality of first active fins being interposed between neighboring ones of the plurality of first active fins.

3. A method of manufacturing a semiconductor device, the method comprising:
    forming a first active fin, a second active fin and a third active fin on a substrate, each of the first active fin, the second active fin and the third active fin extending in a first direction substantially parallel to an upper surface of the substrate, the second active fin, the first active fin, and the third active fin being disposed in order in a second direction substantially parallel to the upper surface of the substrate and crossing the first direction;
    removing the formed third active fin, using a first etching mask covering the formed first active fin and the formed second active fin;
    removing a middle portion of the second active fin covered by the first etching mask, using a second etching mask exposing only the middle portion between discontinuous portions of the second active fin covered by the first etching mask;
    forming a gate structure extending, in the second direction on the first active fin and one of the discontinuous portions of die second active fin; and
    forming a first source/drain layer on a first portion of the first active fin that is adjacent the gate structure and a second source/drain layer on a second portion of one of the discontinuous portions of the second active fin that is adjacent the gate structure.

4. The method of claim 3, wherein the forming the first active fin, the second active fin and the third active fin comprises forming the first active fin, the second active fin and the third active fin on the substrate to be spaced apart from each other in the second direction by a give distance, and
    wherein the method further comprises forming a another third active fin, another first active fin and another second active fin on the substrate to be spaced apart from each other in the second direction by the given distance.

5. The method of claim 3, wherein the second active fin includes a plurality of second active fins adjacent to each other in the second direction, or
    the third active fin includes a plurality of third active fins adjacent to each other in the second direction.

6. The method of claim 3, wherein the first active fin includes a plurality of first active fins disposed in the second direction, and
    wherein each of the plurality of first active fins is adjacent the second active fin or the third active fin in the second direction.

7. The method of claim 3, further comprising forming a contact plug on the formed first source/drain layer, wherein the contact plug is not formed on the second source/drain layer.

\* \* \* \* \*